US006748372B2

(12) United States Patent
Van Loo

(10) Patent No.: US 6,748,372 B2
(45) Date of Patent: Jun. 8, 2004

(54) METHODS AND APPARATUS FOR EFFICIENTLY ACCESSING SEQUENTIALLY BROADCAST DATA

(75) Inventor: James T. Van Loo, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/004,632

(22) Filed: Dec. 3, 2001

(65) Prior Publication Data
US 2002/0129124 A1 Sep. 12, 2002

Related U.S. Application Data
(60) Provisional application No. 60/257,078, filed on Dec. 19, 2000.

(51) Int. Cl.[7] .............................................. G06F 17/30
(52) U.S. Cl. .......................... 707/2; 707/10; 707/102; 711/137; 725/115
(58) Field of Search ...................... 707/1–4, 8–10, 707/200–205, 60–104.1; 709/200–203, 217–219; 711/100, 101, 111–114, 117, 118, 137; 713/200, 201; 725/37–39, 52, 143, 148, 114–117

(56) References Cited

U.S. PATENT DOCUMENTS 4,924,303 A  *  5/1990  Brandon et al. ............. 725/116
5,600,817 A  *  2/1997  Macon et al. ............... 711/137
5,805,825 A      9/1998  Danneels et al. ......... 395/200.73
5,890,160 A  *  3/1999  Hembry ................... 707/103 R
5,974,503 A  * 10/1999  Venkatesh et al. ......... 711/114

FOREIGN PATENT DOCUMENTS

WO    WO 99/62248    12/1999    ............ H04N/5/00
WO    WO 99/65230    12/1999    ............ H04N/5/00
WO    WO 00/24195     4/2000    ............ H04N/5/445

OTHER PUBLICATIONS

Mikesell, Leslie "New spong–server feature'event' update message", http://monsters.org/pipermail/spong/2000–January/000174.html, Jan. 27, 2000.*
Pekowsky, S. et al., "The Set–Top Box as a Multi–Media Terminal", IEEE Transactions on Consumer Electronics, IEEE Inc., New York, vol. 44, No. 3, Jun. 1998, pp. 833–840

* cited by examiner

Primary Examiner—Greta Robinson
Assistant Examiner—Harold E. Dodds, Jr.
(74) Attorney, Agent, or Firm—Beyer Weaver & Thomas, LLP

(57) ABSTRACT

The disclosure presents an apparatus, system, and method for file access for difficult domains, such as data broadcast, where the time to access a file can be considerable. The invention interposes a file access object between the client and the platform that is both scalable and interoperable. The invention decomposes file access into four (application visible) interfaces that scale between a most basic access (such as, for example, a simple load function) to the most expressive access (such as, a retrieve function).

9 Claims, 52 Drawing Sheets

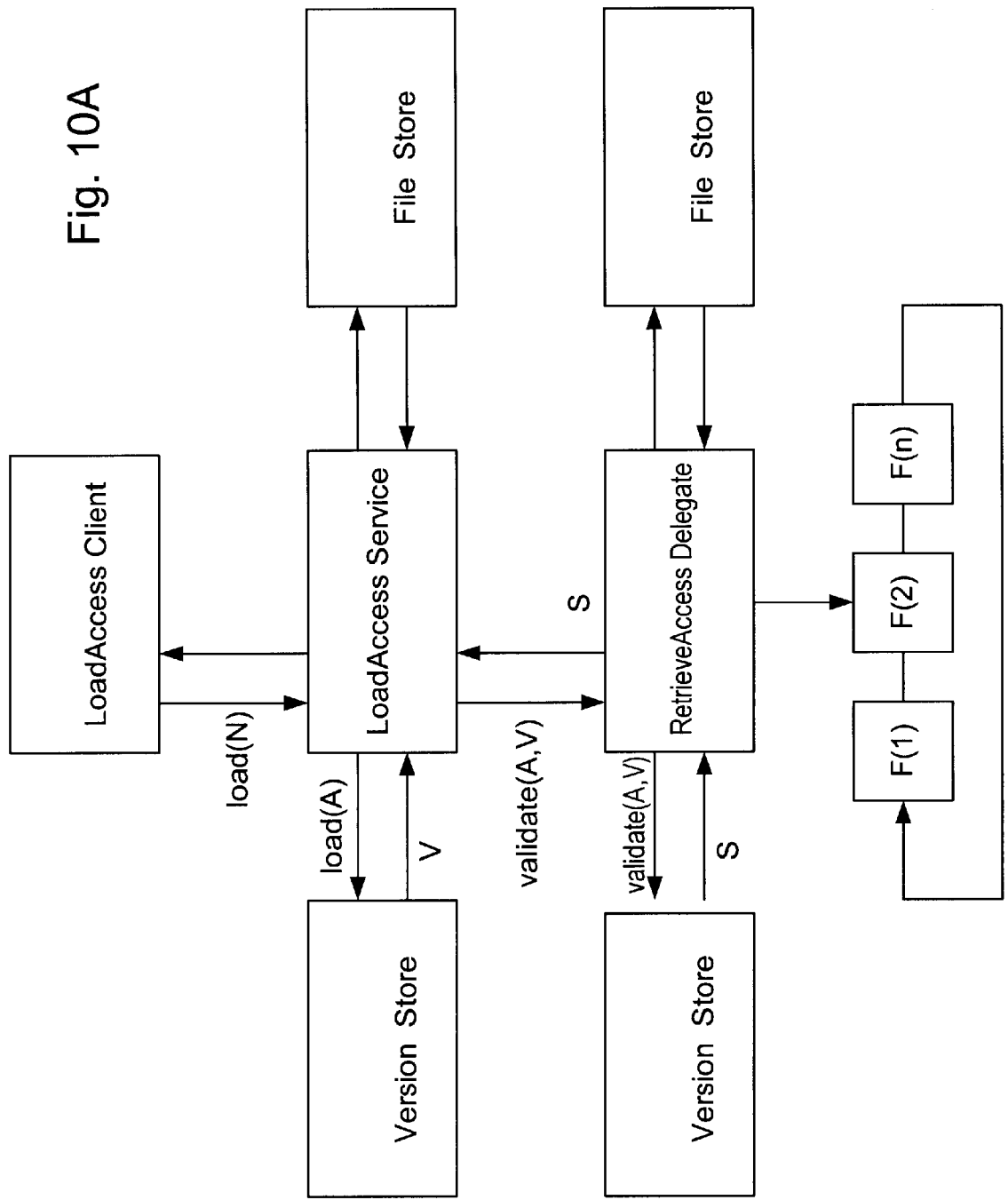

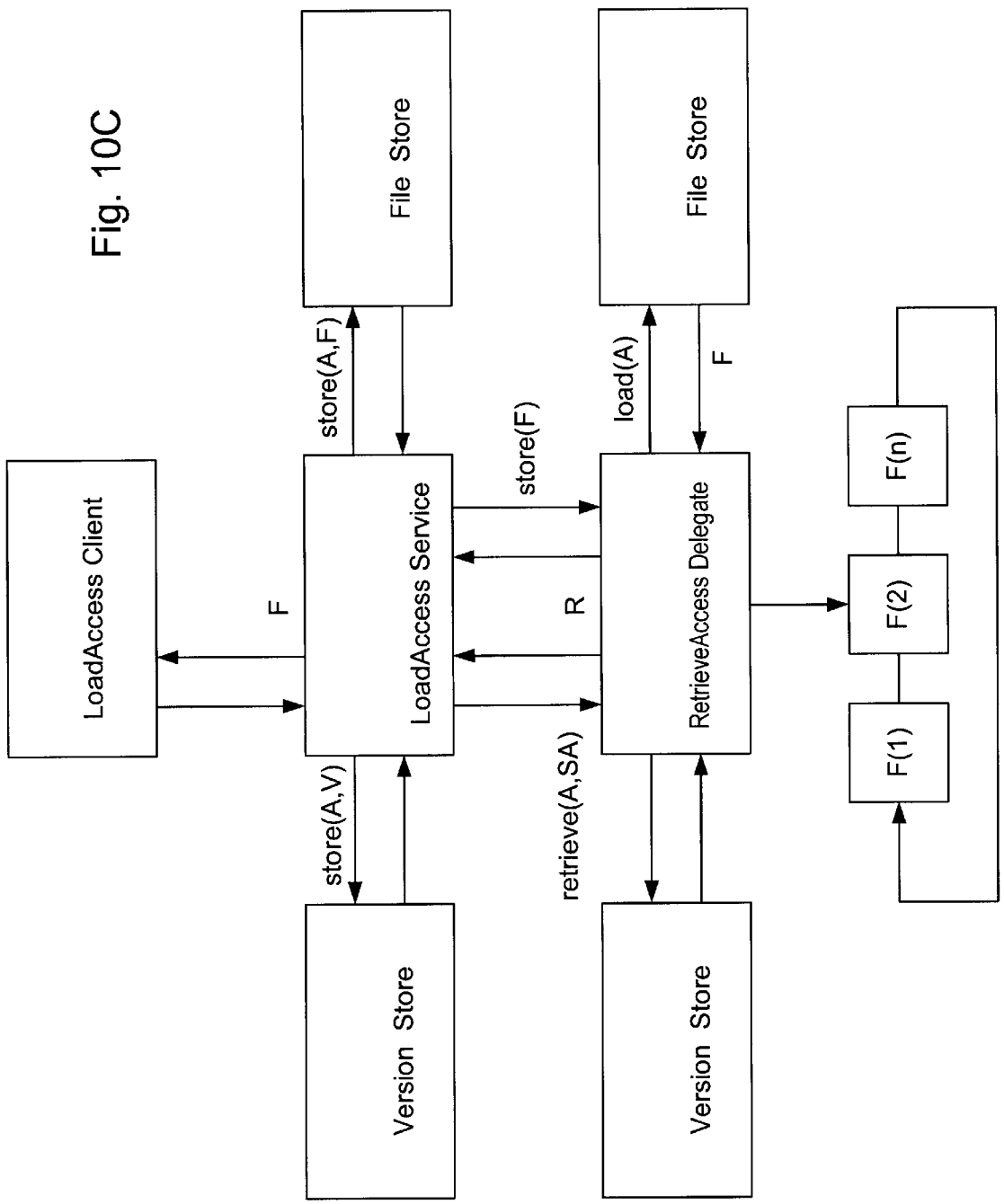

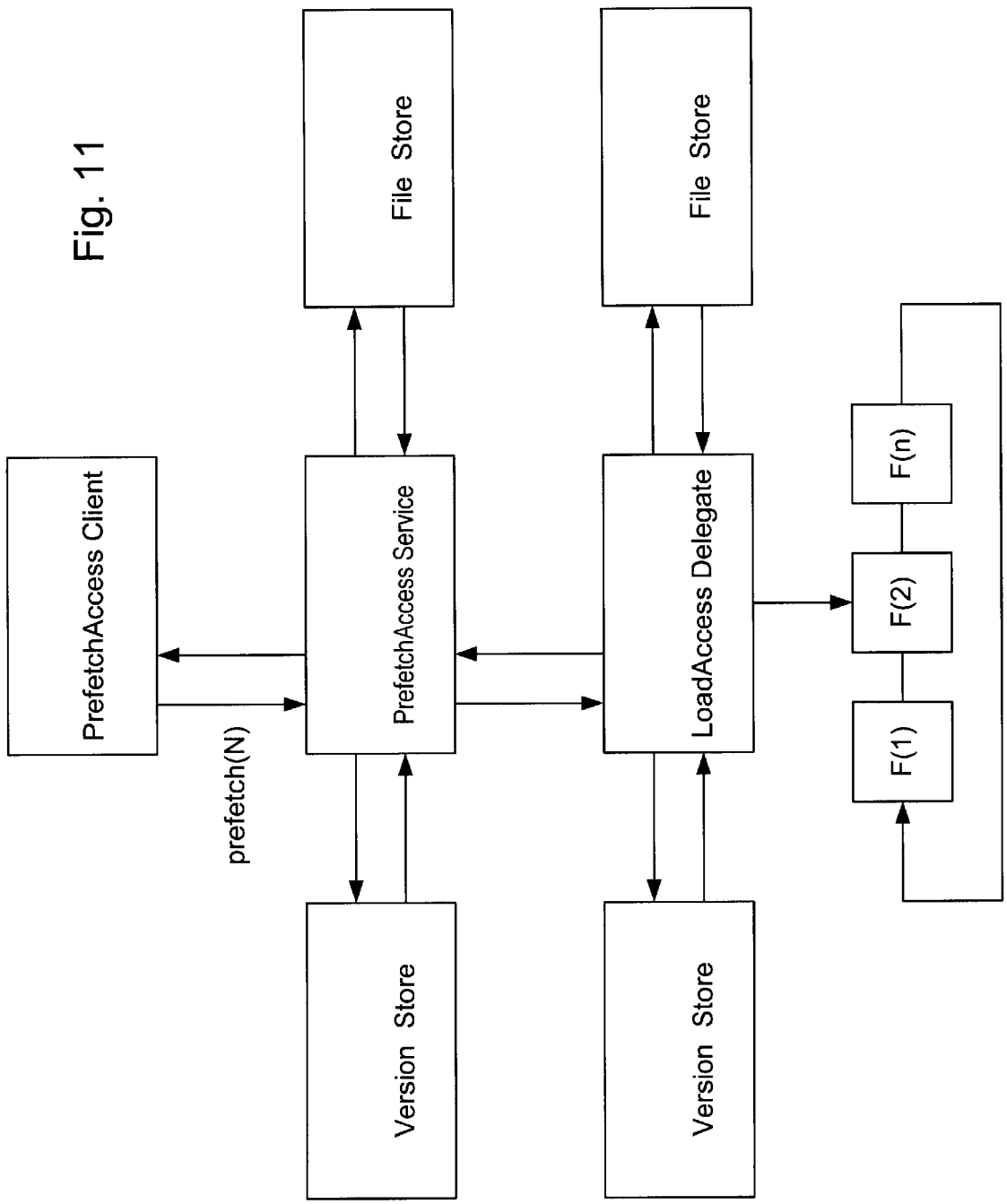

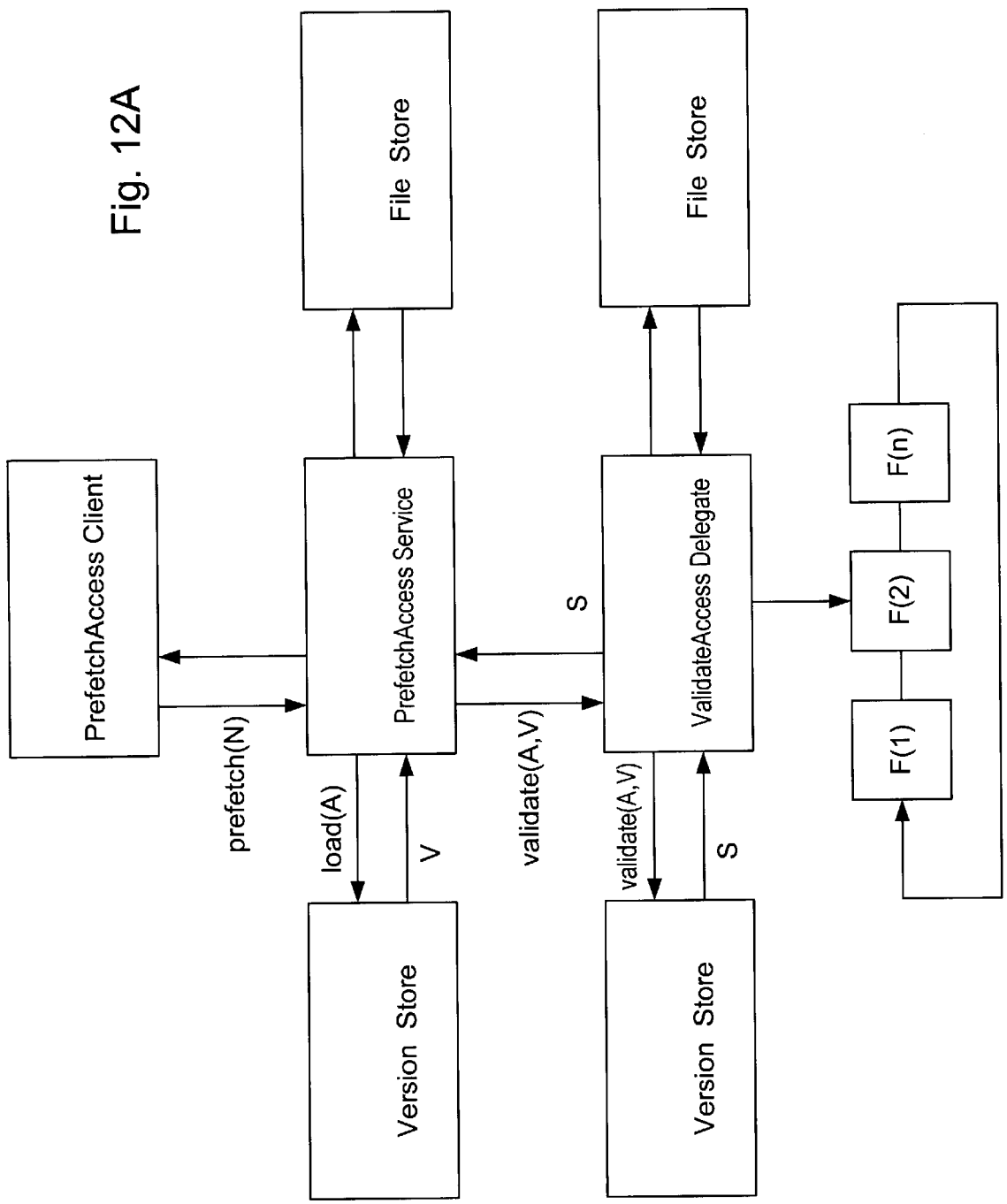

METHODS AND APPARATUS FOR EFFICIENTLY ACCESSING SEQUENTIALLY BROADCAST DATA

CROSS REFERENCE TO RELATED APPLICATIONS

This application takes priority under 35 U.S.C. §119(e) of U.S. Provisional Application Serial No. 60/257,078 entitled "Methods and Apparatus for Efficiently Accessing Sequentially Broadcast Data" by Van Loo filed Dec. 19, 2000 which is incorporated by reference in its entirety.

BACKGROUND OF THE INVENTION

1. Field of the Invention

The present invention generally relates to computing systems. More particularly, the present invention provides methods and apparatus for efficiently accessing data in those systems where the data is sequential data such as in, for xample, any mass media (such as TV or radio) broadcasting medium.

2. Description of the Related Art

In systems where data is only available in a sequential manner, such as in a conventional mass media broadcasting system as TV, radio, etc., a broadcaster sequentially transmits data in the form of audio, video, data, etc. over a medium such as air, cable, phone line (DSL, for example) that can be received by any number of receivers. For example, transmitted radio waves can be received with a radio receiver tuned to a particular transmission channel. Conventional broadcast communication is typically a sequential type communication medium since the receiver does not having control over the content of or the arrival time of broadcast data files.

To facilitate discussion, FIG. 1 illustrates a T.V broadcast system 100 that includes a T.V broadcaster 102 and a T.V receiver 104. The T.V receiver 104 can be an analog or a digital T.V receiver suitable for reception of voice, video, and data transmitted by the T.V broadcaster 102. In a broadcast system, data can be transmitted in a cyclical manner conceptualized in the art as a "data carousel" 106. As used herein, a data carousel refers to a mechanism for cyclic transmission of data modules, for example, as defined by MPEG-2 Digital Storage Medium Command and control (DSM-CC of ISO/IEC 138118-6) User-to-Network Download Protocol. To elaborate, the carrousel 106 illustrates cyclical transmission of data in the broadcast system 100. Data on the carrousel 106 can include data segments A, B, C, and D. Each data segment, such as data segment A, can consist of individual data files $X_1$ through $X_4$. In this manner data portions A, B, C, and D are sequentially transmitted as the carrousel 106 rotates clockwise in such a manner that a particular data file is re-transmitted when carrousel 106 completes its rotation with respect to an associated point of transmission. For example, the data file $X_1$, will be re-transmitted every time the associated reference point 108 undergoes a full rotation. In this way, each of the data files on the carrousel 106 is cyclically re-transmitted every T seconds, where T is the time it takes for carrousel 106 to make a complete rotation with respect to the point of transmission 108, also referred to as the carrousel's period.

Unfortunately, however, due to the cyclical nature of the carrousel type broadcasting system, the T.V broadcast system 100 has an inherent delay associated with the re-transmission of data. To elaborate, at a time $t_1$ when a vertical bar 110 is aligned with the point of transmission 108, the T.V broadcaster 102 will start transmitting the data file $X_1$. The transmission of data file $X_1$ will complete at a subsequent time $t_2$ when transmission of data file $X_2$ is initiated. If the T.V receiver 104 requires data file $X_1$ some time after transmission of data file $X_1$, the T.V receiver 104 must wait until file $X_1$ is re-transmitted which could be at most at a time T later. For example, it data file $X_1$ is required by the receiver 104 at a time $t_2$ (which for this example happens to be shortly after transmission of file $X_1$ has completed) a potentially long delay will be encountered before file $X_1$ is re-transmitted. This delay can be almost as long as the time T required to complete a full transmission cycle which can be on the orders of seconds or even minutes.

Thus, cyclical retransmission of data can result in long delays between the time data is requested (or needed) and the time data is received and accessed. With carrousels typically having hundreds of megabytes of data, the periodic nature of the data carrousel arrangement could potentially result in delays of up to several seconds in accessing required data. This potential delay is exacerbated in those situations where the broadcast medium includes low bandwidth links, such as the Internet. Even though this delay may not be very significant in non-interactive situations, it can be especially problematic for interactive applications such as interactive T.V, such as WEB TV™, where it is highly desirable to provide a user with requested information on demand.

In view of foregoing, there is a need for a consistent, interoperable collection of object interfaces that also scale across diverse clients and platforms.

SUMMARY OF THE INVENTION

Broadly speaking, the invention relates to an improved methods and apparatus for efficiently accessing sequentially broadcast data in a multi-platform environment. The invention can be implemented in numerous ways, including as a method, a computer system, and an apparatus. Several embodiments of the invention are discussed below.

In one embodiment, a method of efficiently accessing a sequentially broadcast data file is disclosed. A client class is constructed and if the data file is loaded, then execution is blocked by the client which then requests the data file. If the data file is not in a cache memory, then a file request is issued to a carousel system and if the data file is available to the carousel system, then the requested data file is returned to the requesting client.

In other embodiments, an apparatus and computer program product for efficiently accessing a sequentially broadcast data file are disclosed.

BRIEF DESCRIPTION OF THE DRAWINGS

The present invention will be readily understood by the following detailed description in conjunction with the accompanying drawings, wherein like reference numerals designate like structural elements, and in which:

FIGS. 10A–10C show the invocation patterns for the situation where the delegate supports the retrieve( ) function.

FIG. 11 describes an invocation patterns for the prefetch( ) function when the delegate supports just the basic load( ) function.

FIGS. 12A–12C corresponds to the situation where the delegate supports the validate( ) function.

DETAILED DESCRIPTION OF THE INVENTION

The invention relates to methods, apparatus, data structures, and systems suitable for providing a consistent, interoperable collection of object interfaces that also scale across diverse clients and platforms. In accordance with one aspect of the invention, the disclosure presents an apparatus, system, and method for file access for difficult domains, such as data broadcast, where the time to access a file can be considerable. The invention interposes a file access object between the client and the platform that is both scalable and interoperable. The invention decomposes file access into four (application visible) interfaces that scale between a most basic access (such as, for example, a simple load function) to the most expressive access (such as, a retrieve function). In the case of the retrieve operation, for example, the operation does not block and the client later receives the file through a separate interface.

Figure 1:
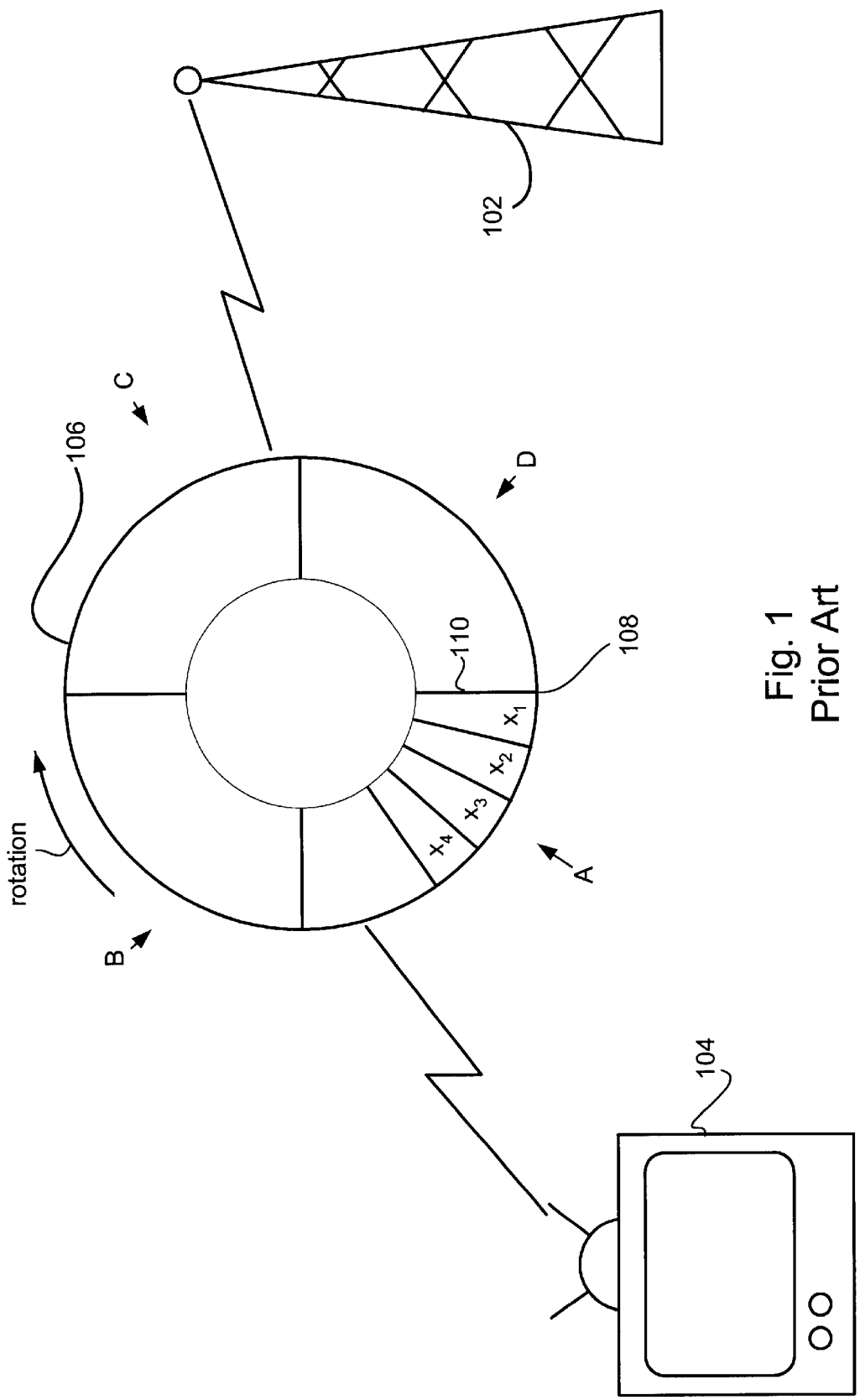
FIG. 1 illustrates a conventional sequential data acquisition system.
Figure 2:
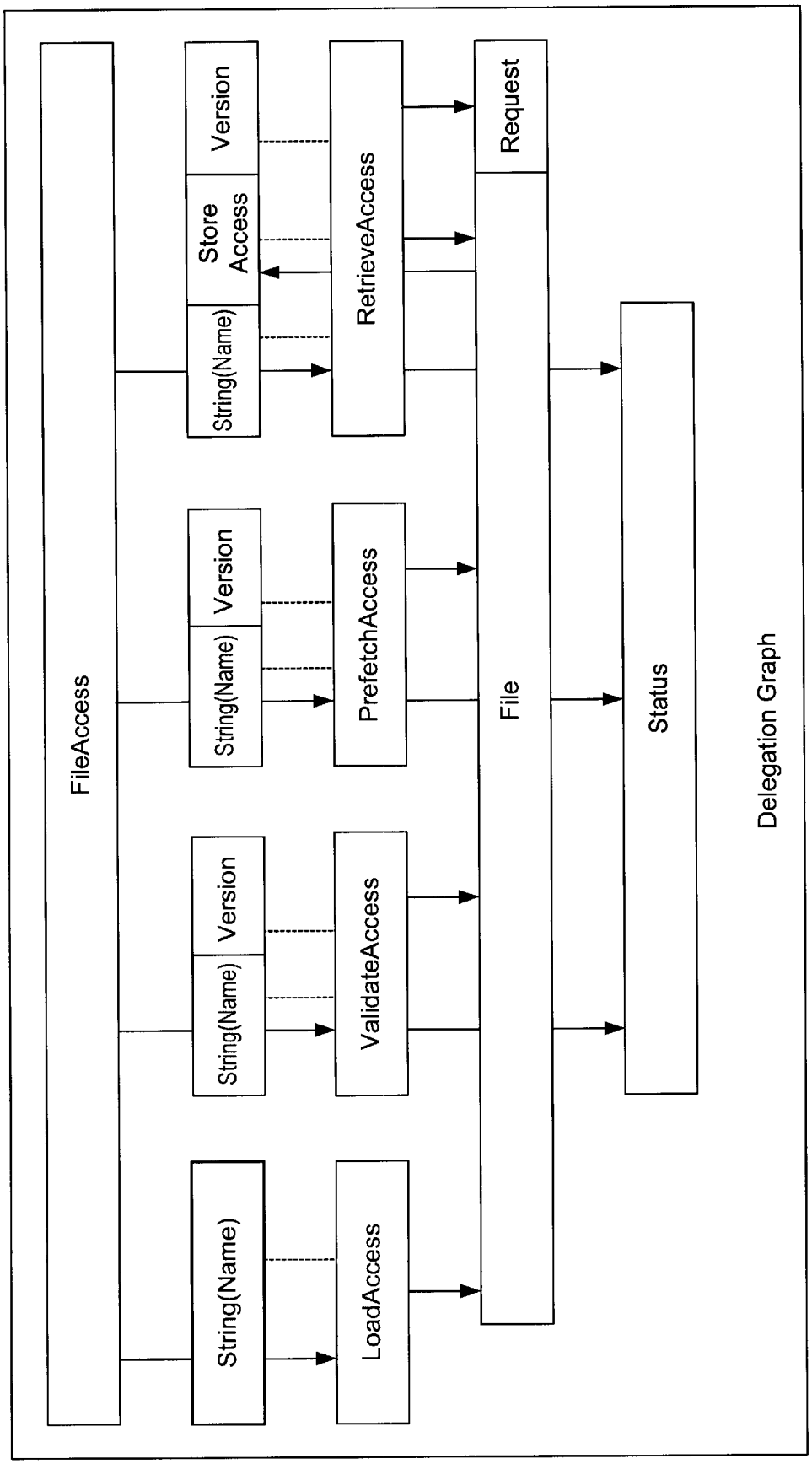
FIG. 2 illustrates some of the possible delegation patterns in accordance with an embodiment of the invention.

For example, FIG. 2 illustrates some of the possible delegation patterns in accordance with an embodiment of the invention. A base file access interface 202 supports just the load function which is blocked until the client receives the requested file. A validate function interface 204 detects if the file version known to the client is stale. A prefetch access interface 206 supports all previous operations plus a prefetch function which does not return a file, rather, the client registers interest in a file. A retrieve access interface 208 supports all previous operations plus a retrieve function. The client later receives the requested file through a separate interface.

Figure 3A:
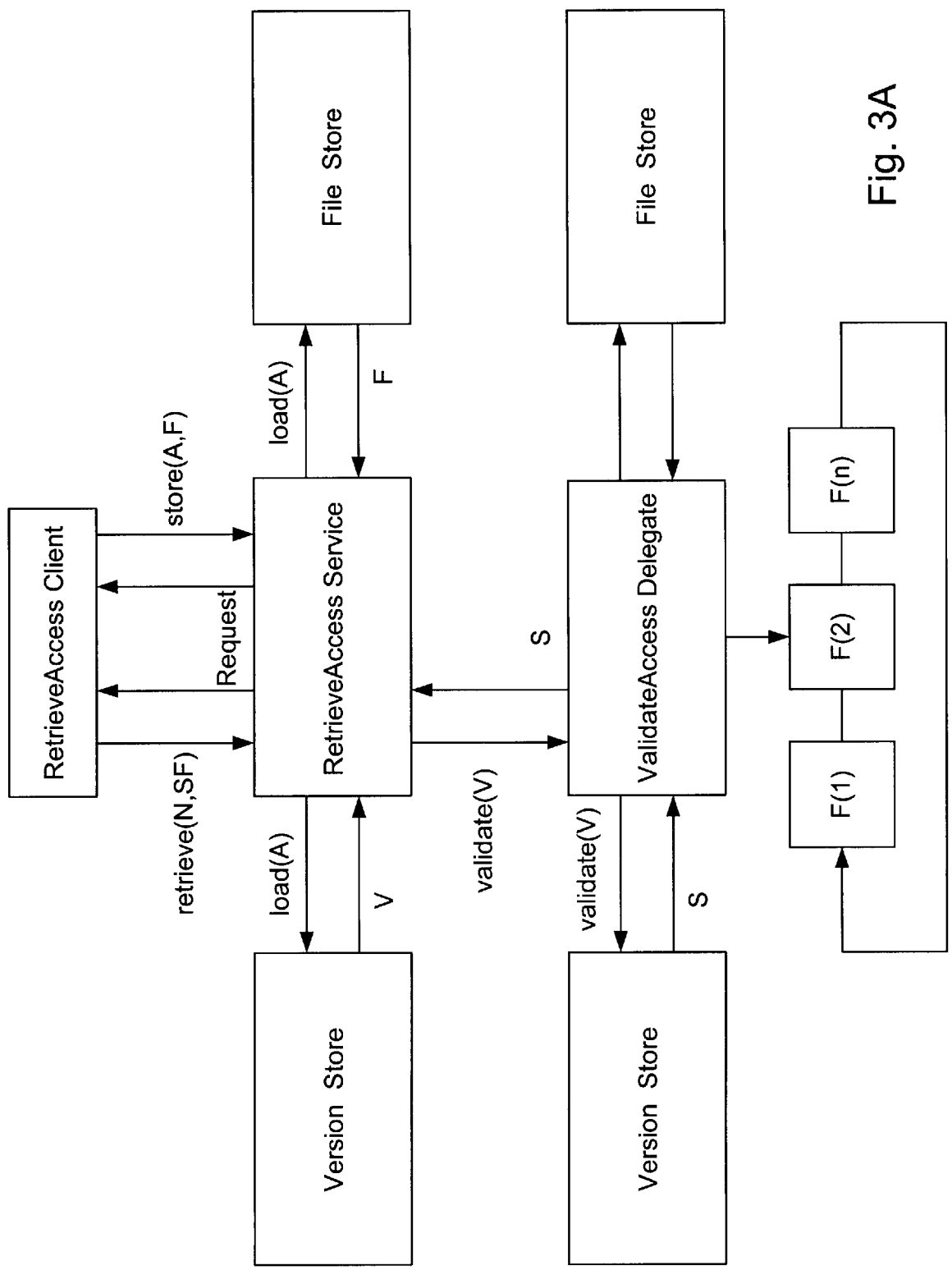
FIG. 3A illustrates a file access object detects that the version is current and the file access object then invokes load operation on its file store to recover the file and then invoke store on the client.
Figure 3B:
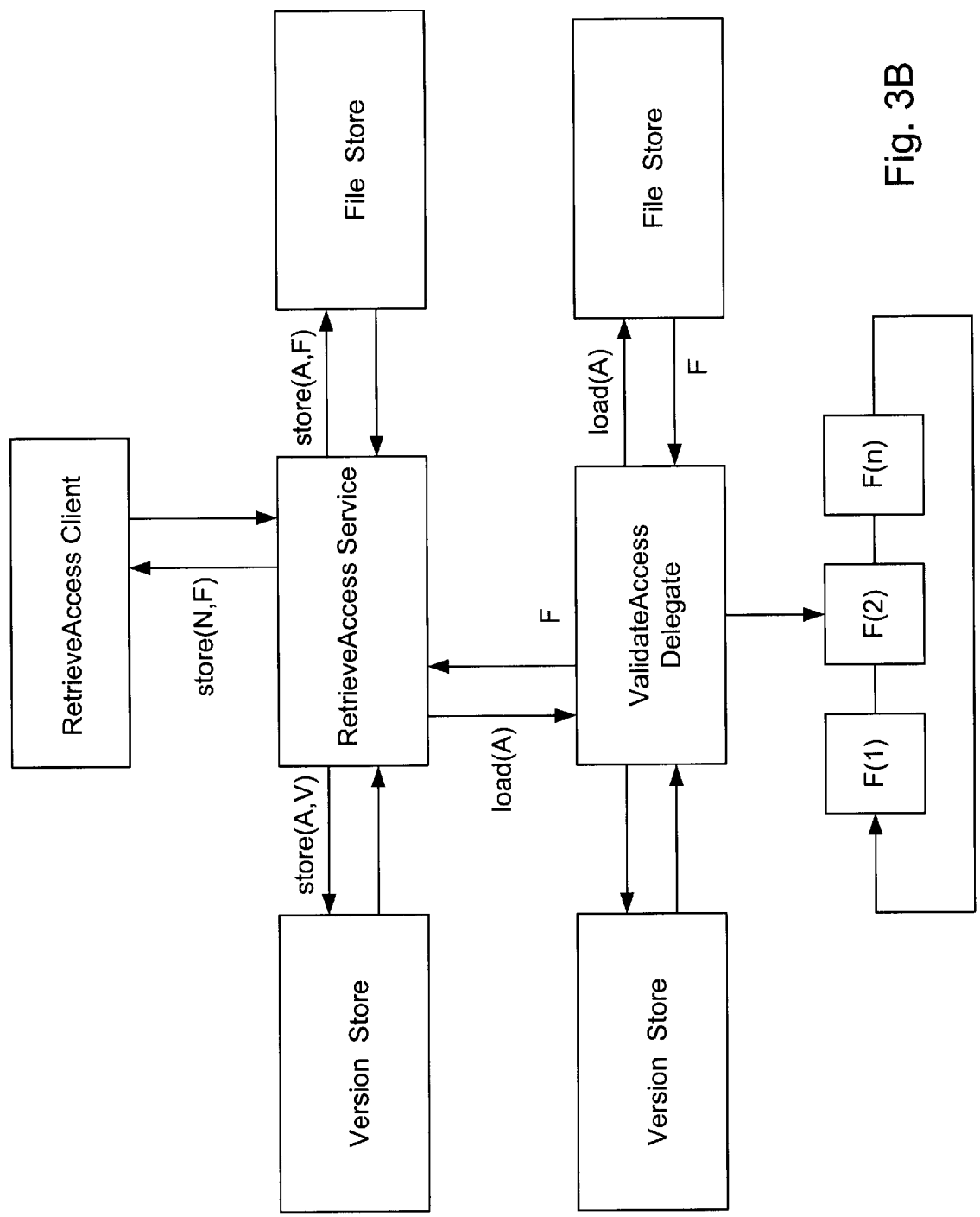
FIG. 3B illustrates a file access object detects that the version is stale and the file access object then invokes load operation on its file store to recover the file and then invoke store on the client.

In the described embodiment, the file access object interposes itself between the client and the platform. One of the roles of the file access object is to arbitrate the expectations of the client (implicit in the interface that the client creates) and the expectations of the platform (implicit in the interface that the platform exports). An example of which is shown in FIGS. 3A and 3B illustrating various interaction patterns for the retrieve function in those situations where a client creates the most expressive interface (i.e., the retrieve function) while the platform supports a more basic interface (such as, for example, the validate function interface). In this example, the file access object loads the version of its version store and then requests that the platform validate that version. As shown in FIG. 3A, the file access object detects that the version is current and the file access object then invokes load operation on its file store to recover the file and then invoke store on the client. As shown in FIG. 3B, however, the file access object detects that the version is stale. In this case, the file access object invokes load on the platform, and in anticipation of future requests, invokes store on its version store and invokes store on its file store, and lastly, invokes store on the client.

Since the architecture, in concept, interposes the file access object between the application and the platform, the class structure first isolates the classes visible to the application in a javax.carousel.client package. The classes visible to the file access object itself reside in a javax.carousel.platform package. The classes of the two packages are comparable; the differences are signature dialects (as optimizations) visible to the file access object but not visible to the application.

Figure 4:
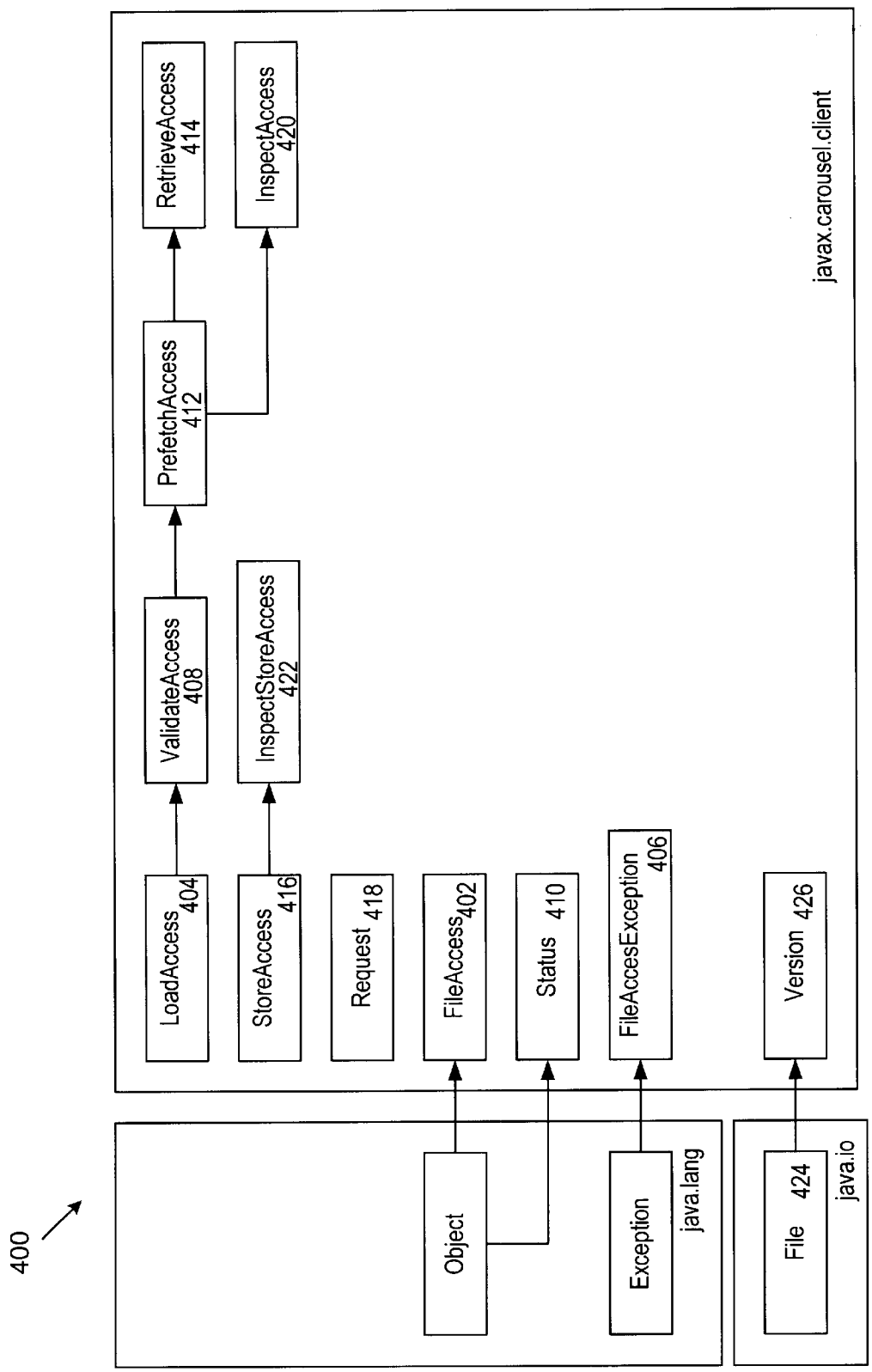
FIG. 4 illustrates an implementation of the structure of the javax.carousel.client package in accordance with an embodiment of the invention.

FIG. 4 illustrates an implementation of the structure of the javax.carousel.client package 400 in accordance with an embodiment of the invention. The application creates an instance of the file access object through the FileAccess class 402 using, for example, the following declarations:

```
public package javax.carousel.client {
    public abstract class FileAccess {
//Bootstrap Declarations
        public static FileAccess getInstance()
```

```
//File Access Object Creation
        public static LoadAccess create(String aClassName)
                throws ClassNotFoundException,
FileAccessException
        public static LoadAccess create(String aClassName,
           String aDomainName)
                throws ClassNotFoundException,
FileAccessException
        }
}
```

The application requests an object that supports a specific interface through the create( ) function. If the operation is successful, the infrastructure returns an object that supports at least the basic LoadAccess interface 404. To establish whether the object supports the more expressive interfaces, the application invokes isInstanceOf( ) on the object which is the mechanism that balances the expectations of the application versus the constraints of the infrastructure. The application can suggest the design center it prefers to adopt, but the infrastructure can also publish the fact that it can perhaps support a more conservative design center.

The ClassNotFoundException anticipates the evolution of the design, for example, future versions might support other interfaces. The exception allows less recent implementations to inform the application that these interfaces are not known to the implementation. A FileAccessException 406 accounts for the situation where the infrastructure can not create file access objects at this time, or does not recognize the domain that the applications expects to access.

The basic file access interface is the LoadAccess interface 404. The operation blocks until the implementation returns the file instance. It should be noted that in order to keep the discussion simple, the declaration includes a single signature with the argument a string, however, other signatures are feasible. In one embodiment, the declarations for the LoadAccess interface 404 are:

```
public package javax.carousel.client {
    public interface LoadAccess {
//Methods
        public File load(String aFileName)
                throws FileAccessException
        }
}
```

The second file access interface extends the basic interface with the validate( ) operation. The declarations for the ValidateAccess interface 408 are, for example,:

```
public package javax.carousel.client {
    public interface ValidateAccess extends LoadAccess {
//Methods
        public Status validate(Version aFileVersion)
                throws FileAccessException
        }
}
```

The operation blocks until the implementation can determine whether the file version that the client provides inside the signature is stale. The implementation returns the Status object 410 to communicate the results. The declarations for the Status class are, for example,:

```
public package javax.carousel.client {
    public class Status extends Object {
//Fields
        public final int Invalid = -1;
        public final int Indeterminant = 0;
        public final int Valid = +1;
//Constructors
        public Status(int aStatus)
//Methods
        public int getStatus();
        }
}
```

The signature of the validate( ) function is quite deliberate. The alternative would have been to return a simple boolean value rather than an object. The reason the design returns a status object is to fulfill the design objective that the semantics of the operations be scalable. To be specific, it is more difficult to establish that a file is current than to establish that a file might be stale. For example it is standard practice to organize file carousels as a tree structure whether nodes that are not leaf nodes are tables and leaf nodes are the files. The tables often include fields that indicate that the version of some content below the table has changed.

It is straightforward for the file access object 402 (or its delegates) to detect these fields, but quite expensive for the file access object 402 (or its delegates) to traverse the file structure to detect which files have changed. The object design accounts for these pragmatics in that it provides for an indeterminant state, which communicates that it is neither certain that the client file is current nor certain that the client file is stale.

A PrefetchAccess interface 412 supports the previous functions and provides a prefetch( ) function. The declarations for the PrefetchAccess interface 412 are, for example,:

```
public package javax.carousel.client {
    public interface PrefetchAccess extends ValidateAccess {
//Methods
        public void prefetch(String aFileName)
                throws FileAccessException
        }
}
```

The application can register interest in certain files through the PrefetchAccess interface 412, but since the function returns void, implementation can decide whether to be proactive, and cache the files, or just ignore the request.

A RetrieveAccess interface 414 supports the previous operations and provides a retrieve( ) function. It differs from the load( ) function in that the operation need not block until the file becomes available. The implementation can return once it confirms it can resolve the file name. The declarations for the RetrieveAccess interface are, for example,:

```
public package javax.carousel.client {
    public interface RetrieveAccess extends PrefetchAccess {
//Methods
        public Request retrieve(String aFileName, StoreAccess aStoreAccess)
                throws FileAccessException
        }
}
```

The application provides an object that realizes a StoreAccess interface 416 as an argument of the signature. The declarations for the StoreAccess interface 416 are, for example:

```
public package javax.carousel.client {
    public interface StoreAccess {
        public void store(String aFileName, File aFile)
        public void abort()
        public void abort(String aFileName)
    }
}
```

The store( ) function provides the mechanism for the file access object to return the file instance. Since it is conceivable that, while the file access object can resolve the file name, it could later encounter exceptions, the interface provides an abort( ) function. The abort( ) signature that contains a file name cancels a specific file access request. The abort( ) signature that does not contain a file name cancels all file access requests that relate to the StoreAccess instance.

The application can also cancel file access requests. The retrieve( ) function returns a Request object to the application. The declarations of a Request interface 418 are, for example:

```
public package javax.carousel.client {
    public interface Request {
//Methods
        public void abort()
        public void abort(String aFileName)
    }
}
```

An InspectAccess interface 420 again supports a retrieve( ) function, but with the semantics that the operation also registers interest in subsequent changes to the file. The declarations for the InspectAccess interface 420 are, for example:

```
public package javax.carousel.client {
    public interface InspectAccess extends PrefetchAccess {
//Methods
        public Request retrieve(String aFileName,
InspectStoreAccess aInspectStoreAccess)
            throws FileAccessException
    }
}
```

The file access object reports changes to the file version through a InspectStoreAccess object 422:

```
public package javax.carousel.client {
    public interface InspectStoreAccess extends StoreAccess {
        public void invaliate(String aFileName)
        public void invalidate(String aFileName, Status aStatus)
    }
}
```

The last classes of interest are a file class 424 and a version class 426. Since the application adopts the Java language to describe the concepts, the discussion assumes the java.io.File class. The version class 426 extends the file class 424 to provide functions that return the version fields and a function that compares a client version against the version known to the object:

```
public package javax.carousel.client {
    public class Version extends java.io.File {
//Constructors
        public Version(String aFileName)
        public Version(String aPathname, String aFileName)
        public Version(File aFile, String aFileName)
//Methods
        protected void setVersion(short aMajor, short aMinor,
            short aMicro)
        public short getMajor()
        public short getMinor()
        public short getMicro()
        public Status validate(Version aVersion)
    }
}
```

Figure 5:
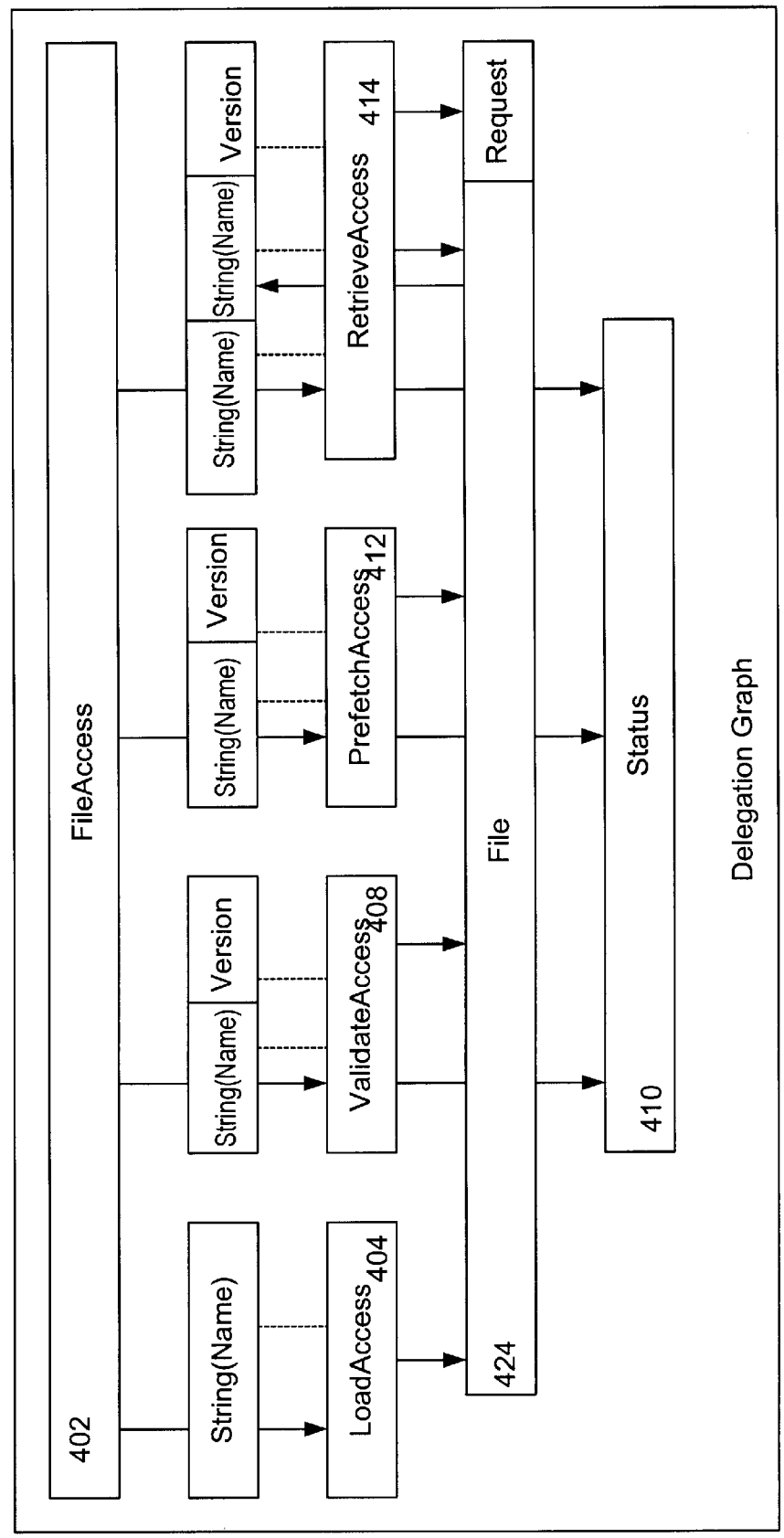
FIG. 5 illustrates application delegation patterns in accordance with an embodiment of the invention.

FIG. 5 illustrates application delegation patterns in accordance with an embodiment of the invention. The application creates the file access objects through the FileAccess class 402. Since all of the file access objects support the load( ) function, FIG. 5 includes delegation links from the various interfaces to the File class 424. The file access objects that also support the validate( ) function include delegation links to the Status class 410. The file access objects that support the retrieve( ) function include delegation links to the Request class plus the invocation link to the StoreAccess interface 416, through which the file access object returns the file.

Figure 6:
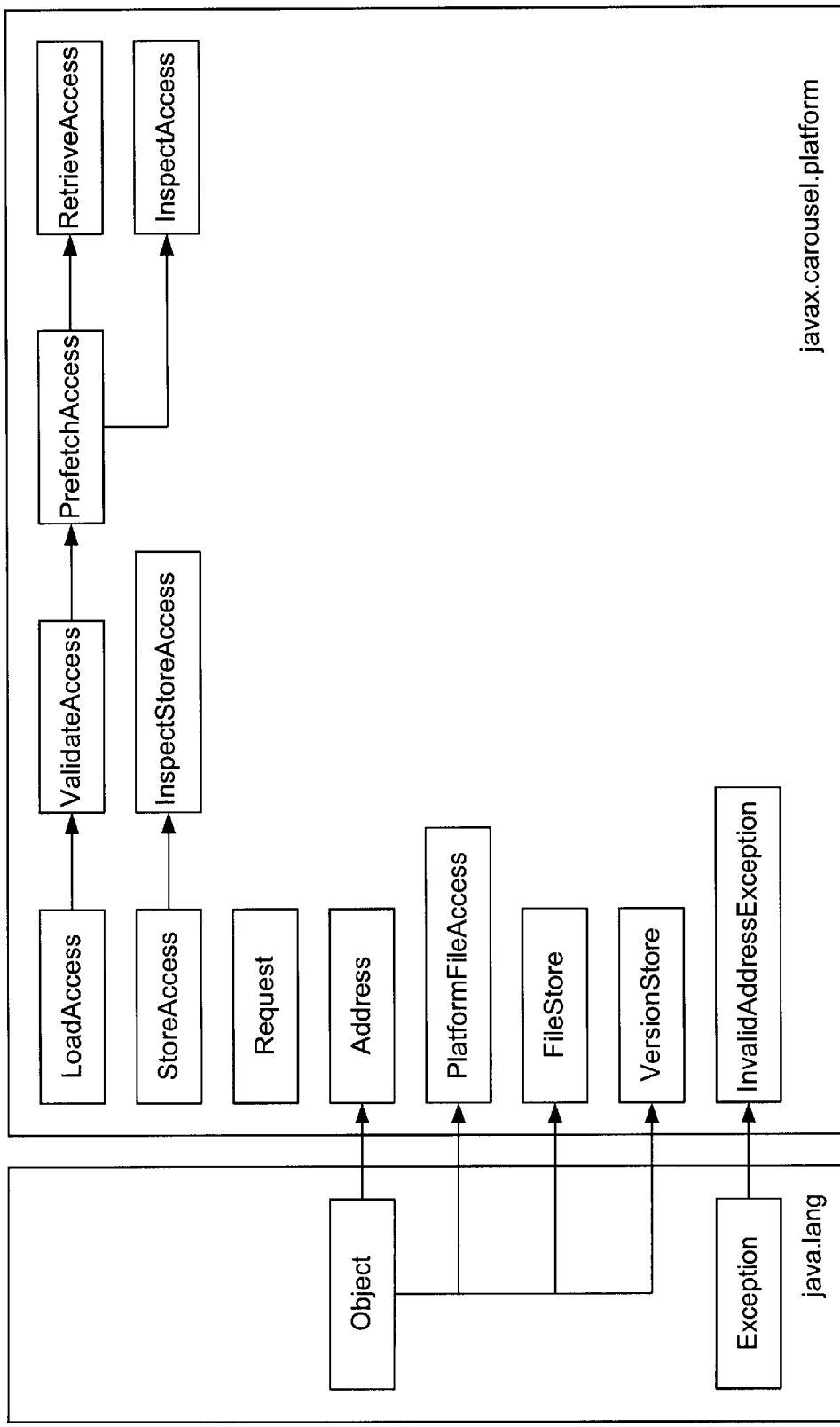
FIG. 6 presents platform centric file access interfaces in accordance with an embodiment of the invention.

FIG. 6 presents platform centric file access interfaces in accordance with an embodiment of the invention. The javax.carousel.platform package 600 is comparable to the javax.carousel.client package 400, except for optimizations of certain signatures. The basic difference is that once the file access object resolves the file name to the file address 602, the invocations adopt the file address 602 rather than the file name to describe the file.

The focus of the discussion of this section is on the invocation patterns of the client object, the file access object, and the delegate object. The section considers each of the five interfaces that the file access object might support, and for each considers each of the interfaces that the delegate object might export. The first function to consider is the basic load( ) function.

Figure 7:
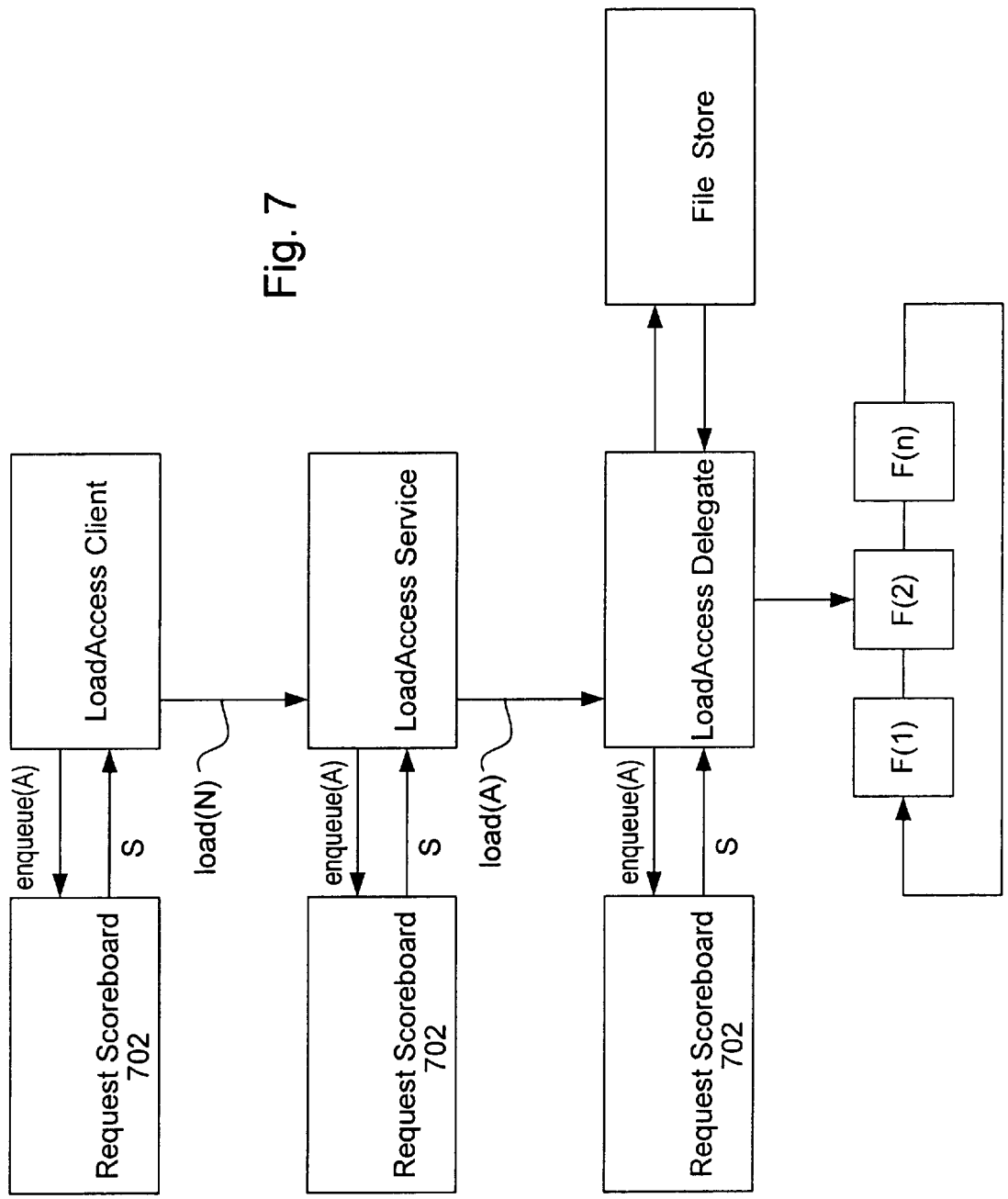
FIG. 7 reinforces that the client object, the file access object, and the delegate object often implement a request scoreboard operation.

This section describes the invocation patterns for the load( ) function. FIG. 7A reinforces that the client object, the file access object, and the delegate object often implement a request scoreboard operation 702. The request scoreboard 702 is an optimization. The scoreboard 702 detects duplicate requests. For example multiple clients might invoke load( ) for the same file. If the file access object has invoked load( ) on the delegate, and the delegate has not returned the file, the file access object need not invoke a second load( ) request for the same file. It should be noted that since the scoreboard 702 is an optimization, subsequent figures do not include it.

Figure 8:
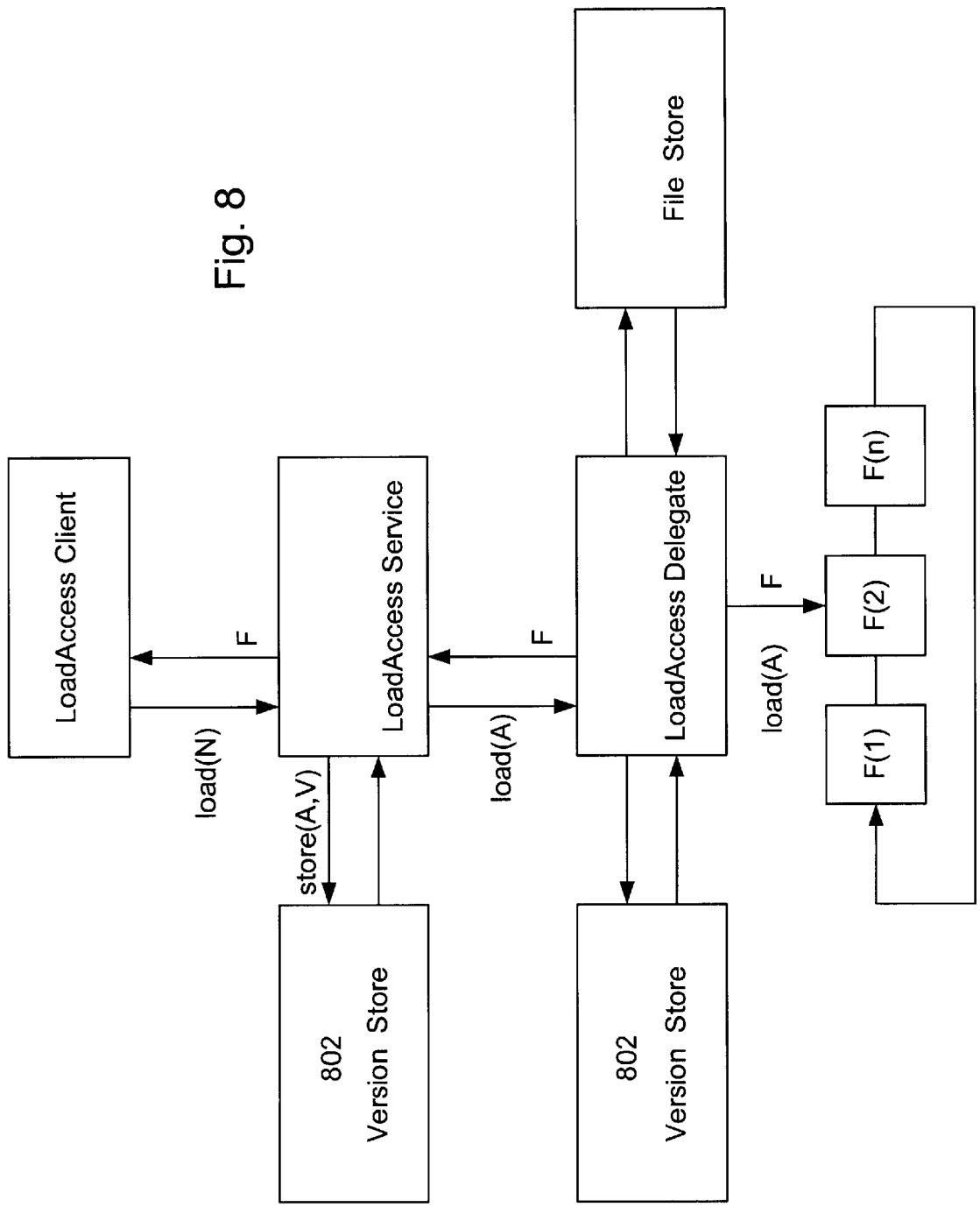
FIG. 8 shows the invocation patterns for the situation where the delegate supports just the load( ) function.
Figure 9:
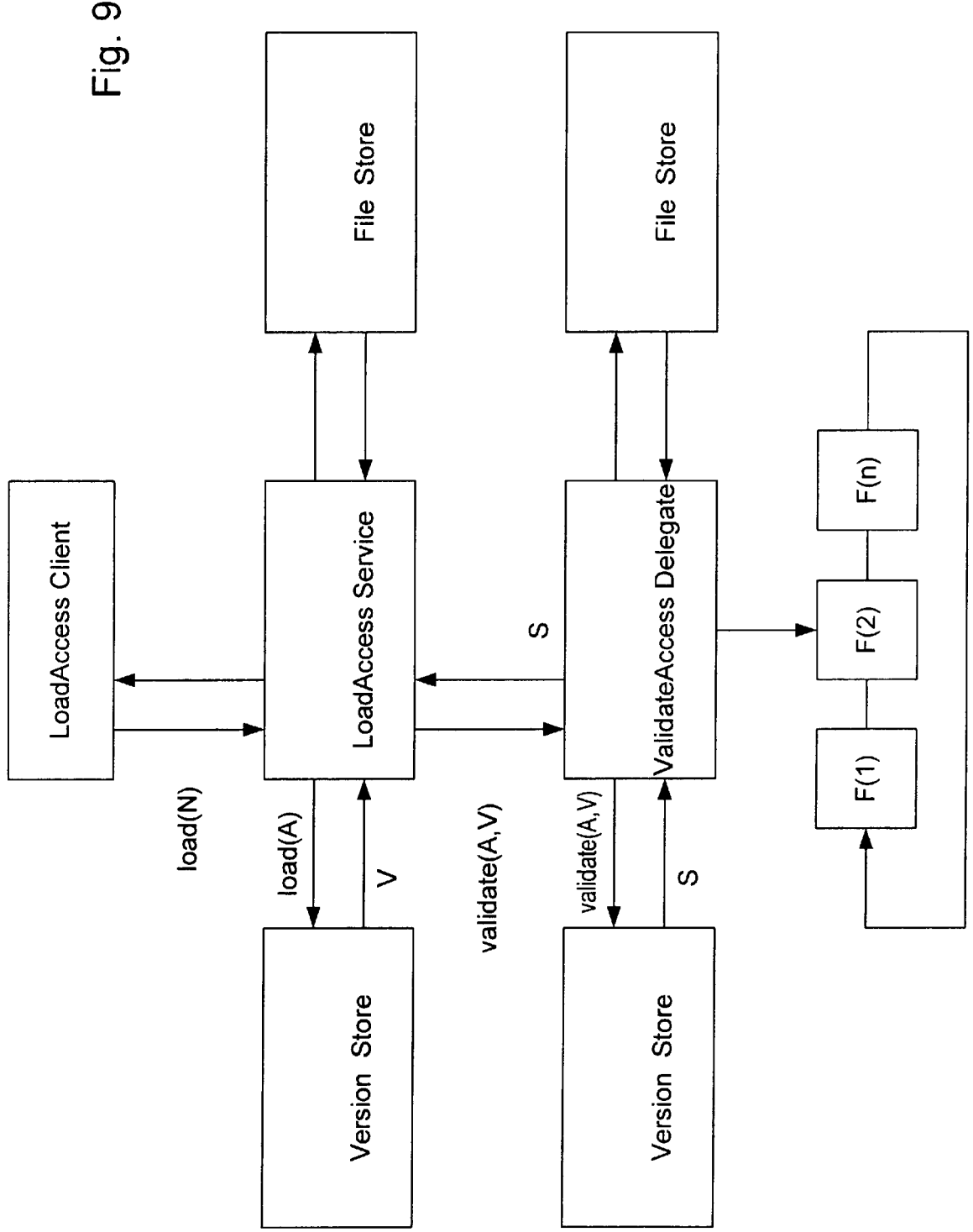
FIG. 9 shows the invocation patterns for the situation where the delegate supports the validate( ) (or the prefetch) function.

FIG. 8 shows the invocation patterns for the situation where the delegate supports just the load( ) function. The file access object just cascades the load( ) and, before it returns the file to the client, stores the version in a VersionStore 802. The version store 802 anticipates the validate( ) function. FIG. 9A shows the invocation patterns for the situation where the delegate supports the validate( ) (or the prefetch) function. In FIG. 9A, the file access object recovers the version and then invokes validate( ) on the delegate. The delegate returns the Status. When the version is current. Tthe file access in this case invokes load( ) on the FileStore and returns the file to the client. However, those situations where the validate( ) operation on the delegate reveals that the version is stale, the file access object invokes load( ) on the delegate, stores the version and the file, and then returns the file to the client.

Figure 10B:
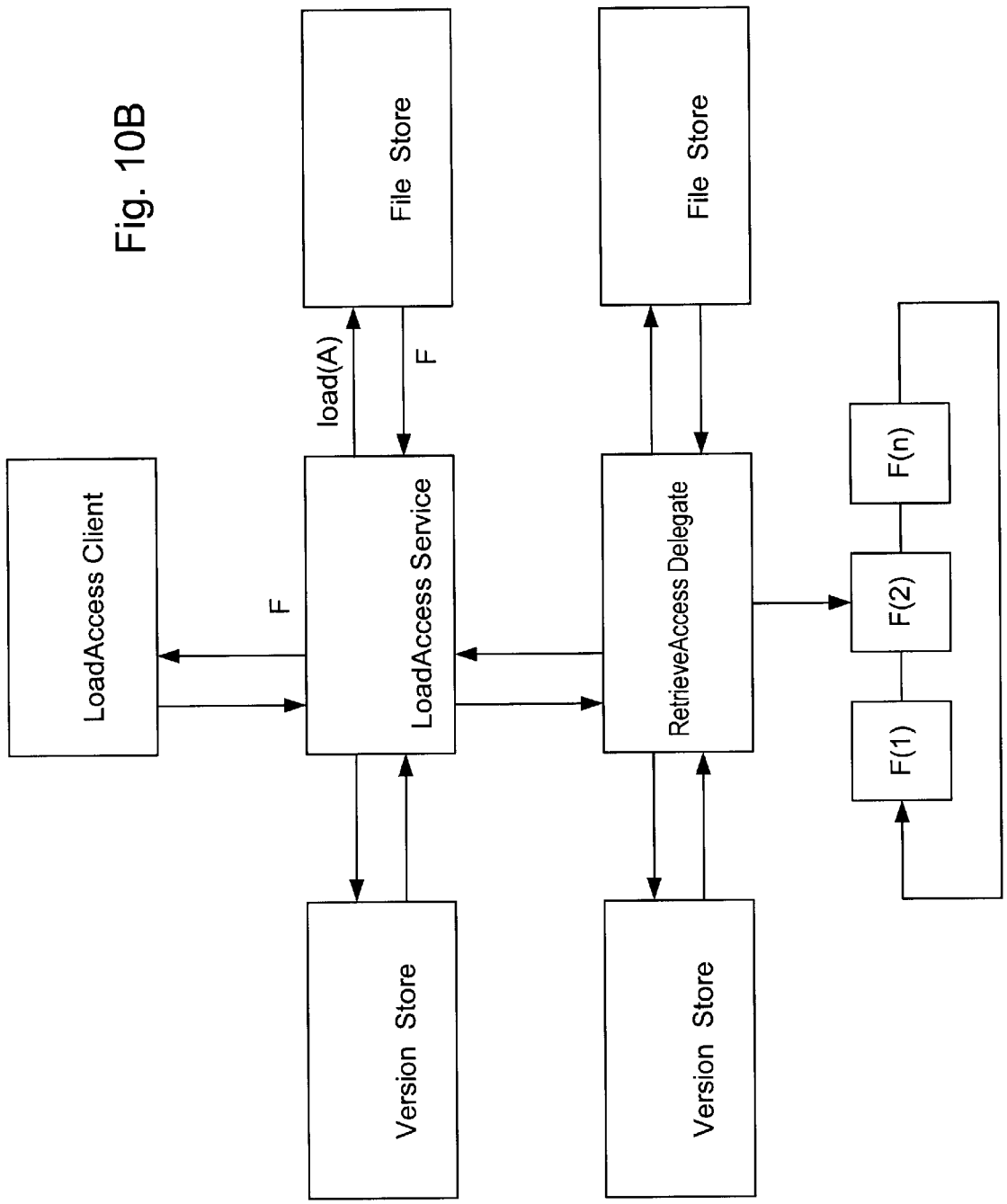

FIGS. 10A–10C show the invocation patterns for the situation where the delegate supports the retrieve( ) function. As shown in FIG. 10A, if the file in the FileStore is current, the sequence is the same where the delegate supports just the validate( ) function. The file access object recovers the version and then invokes validate( ) on the delegate. The delegate returns the Status. FIG. 10B corresponds to the situation where the version is current. The file access in this case invokes load( ) on the FileStore and returns the file to the client.

FIG. 10C illustrates those cases where the validate( ) operation on the delegate reveals that the version is stale. The file access object invokes retrieve( ) on the delegate. The delegate later invokes store( ) on the file access object to forward the file. The file access object stores the version and the file, and then returns the file to the client.

This section describes the invocation patterns for the prefetch( ) function. The example shown in FIG. 11 assumes that the delegate supports just the basic load( ) function. Since the file access object can not be certain that versions are current, there is little incentive for the file access object to load( ) the file. The file access object just returns null to the client.

Figure 12B:
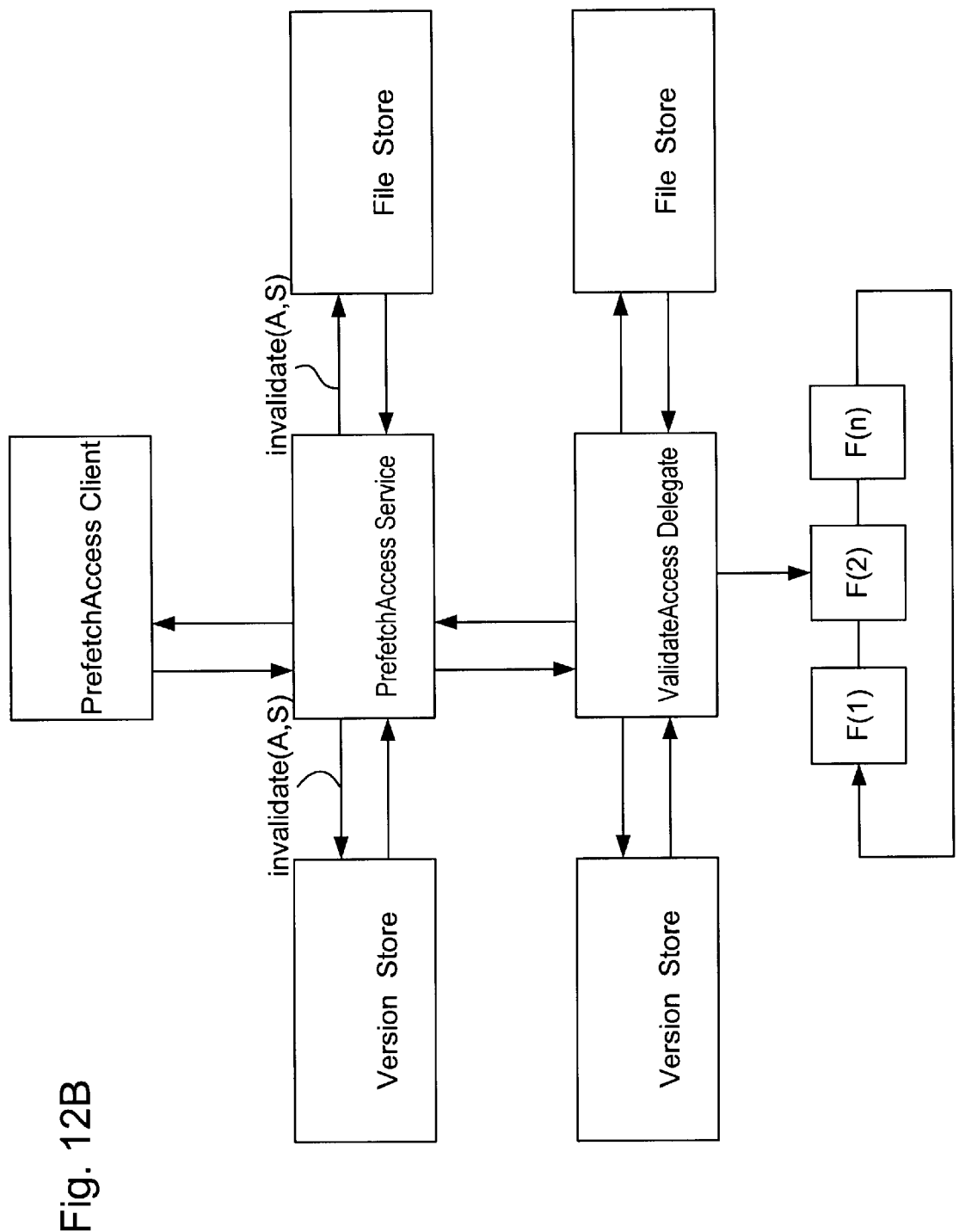
Figure 12C:
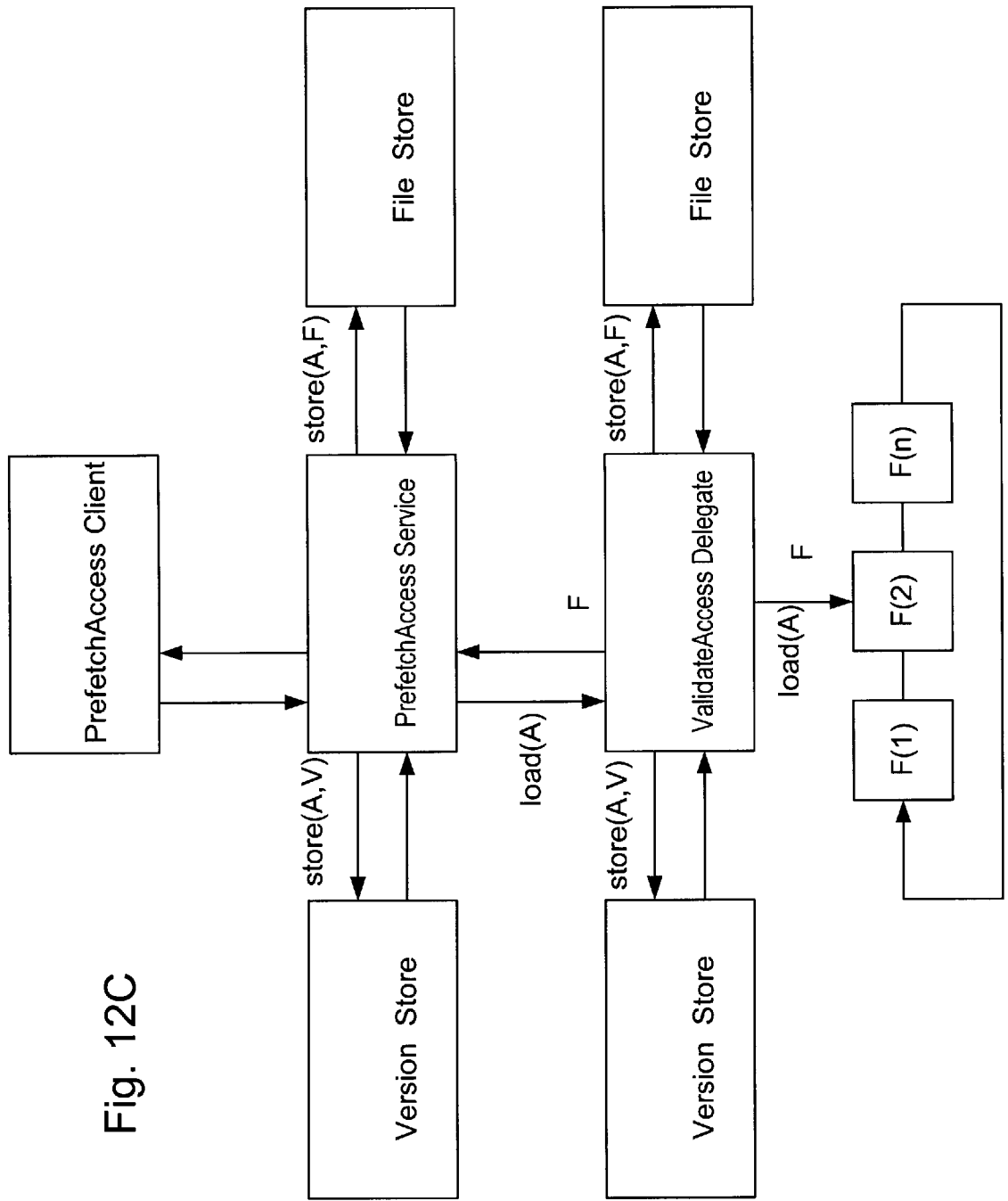

FIGS. 12A–12C corresponds to the situation where the delegate supports the validate( ) function. The file access object invokes load( ) on the VersionStore to recover the version and invokes validate( ) on the delegate. The invocation sequence shown in FIG. 12A assumes the result is that the version of the file access object matches the delegate version. Since the file is current, the file access object just returns null to the client. The invocation sequence shown in FIG. 12B, however, assumes the result is that the version is found to be stale. The file access object in the example is not proactive. The file access object just invokes invalidate( ) on the VersionStore and FileStore and then returns null to the client.

The invocation sequence shown in FIG. 12C, however, assumes the result is that the version is found to be stale. The file access object in the example is proactive. The file access object invokes load( ) on the delegate and stores the version and the file. The file access object then returns null to the client.

Figure 13A:
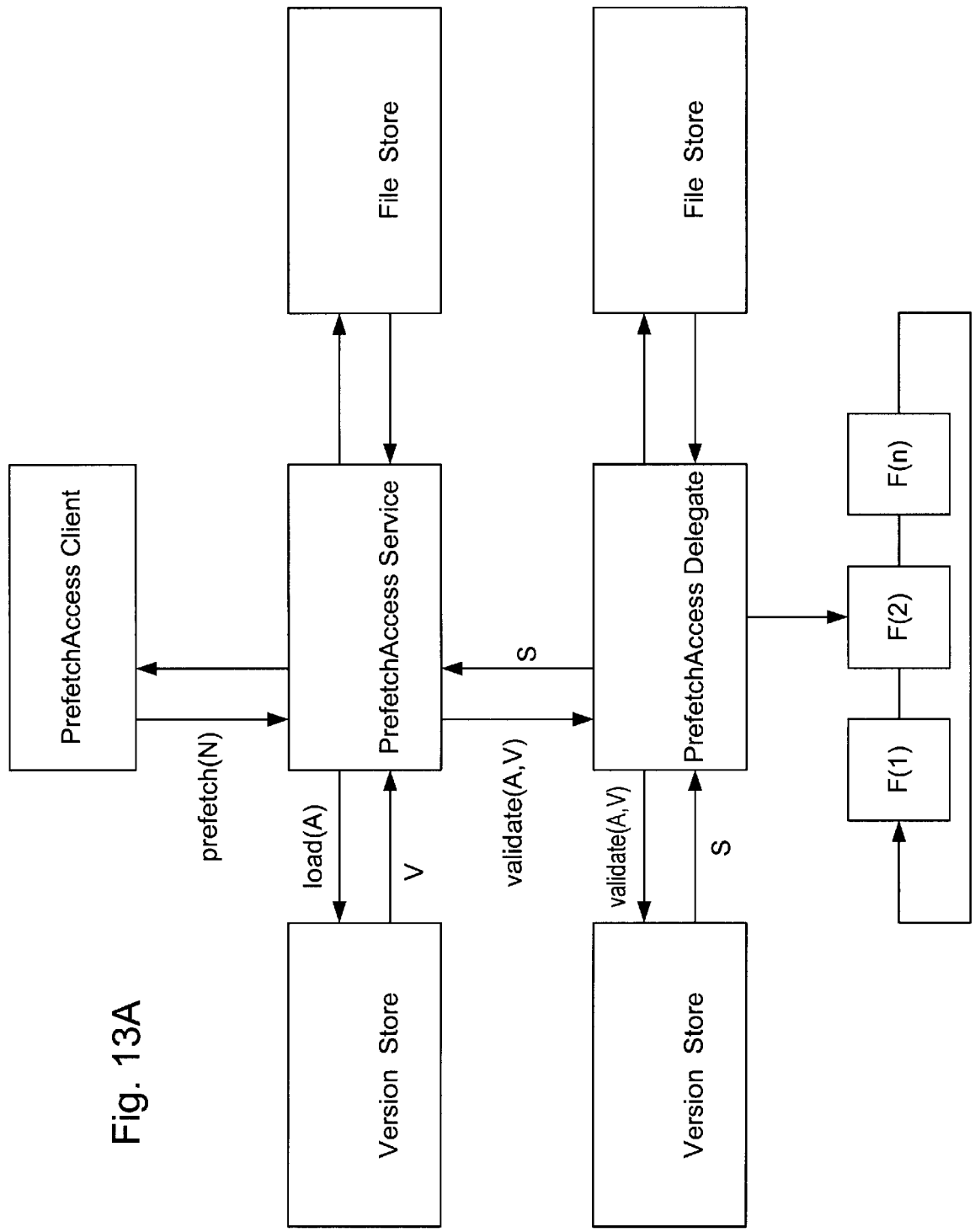
FIGS. 13A and 13B corresponds to the situation where the delegate supports the prefetch( ) function.
Figure 13B:
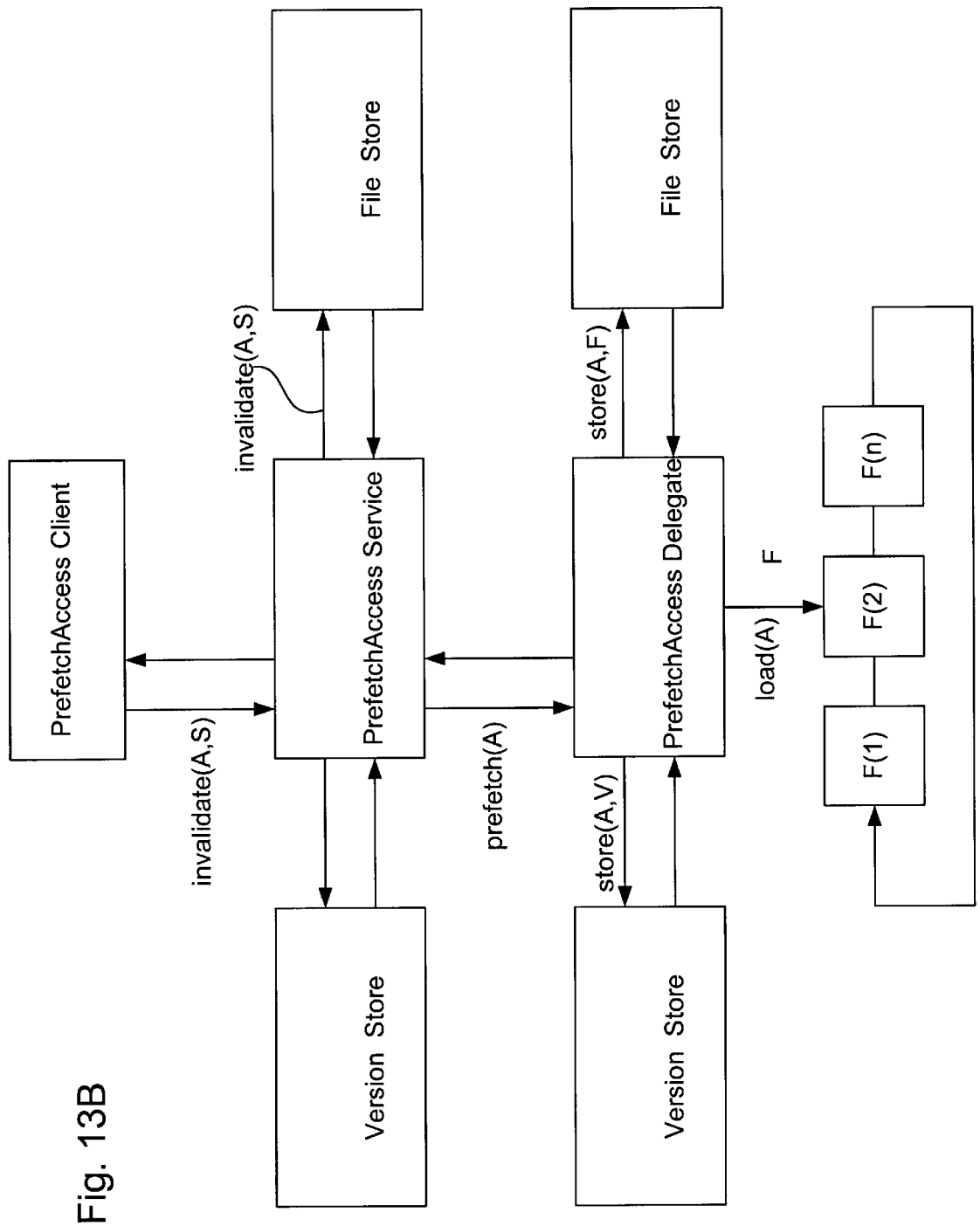

FIGS. 13A and 13B corresponds to the situation where the delegate supports the prefetch( ) function. As shown in FIG. 13A, the file access object invokes load( ) on the VersionStore to recover the version and invokes validate( ) on the delegate. The invocation sequence shown in FIG. 13B assumes the result is that the version is found to be stale. The file access object in the example exploits the fact that the delegate supports the prefetch( ) function. The file access object invokes invalidate( ) the VersionStore and the FileStore, but also invokes prefetch( ) on the delegate. The file access object then returns null to the client. When the version is found to be stale, the file access object in the example is proactive. The file access object invokes load( ) on the delegate and stores the version and the file before it returns null to the client.

Figure 14A:
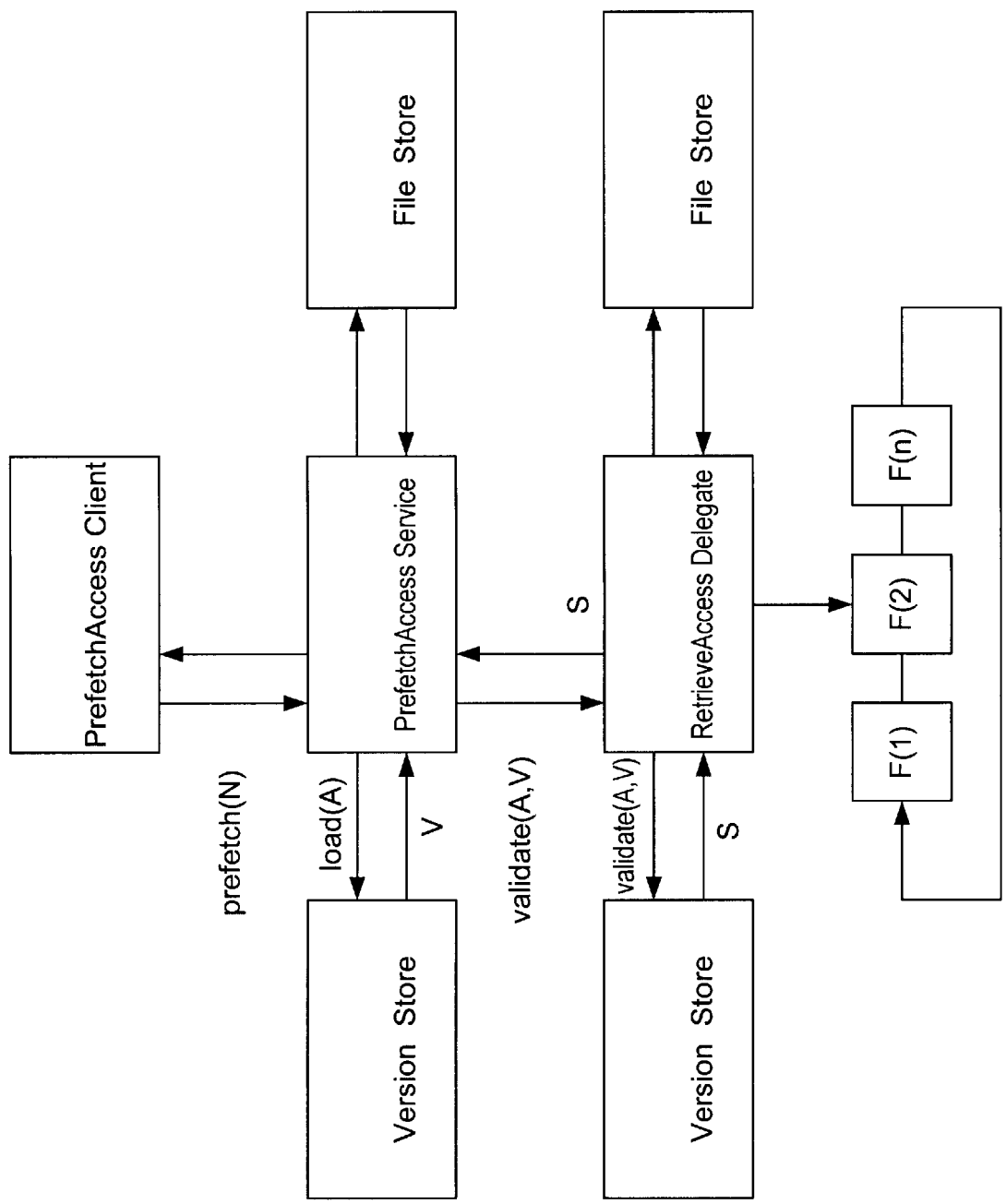
FIGS. 14A–14C corresponds to the situation where the delegate supports the retrieve( ) function.
Figure 14B:
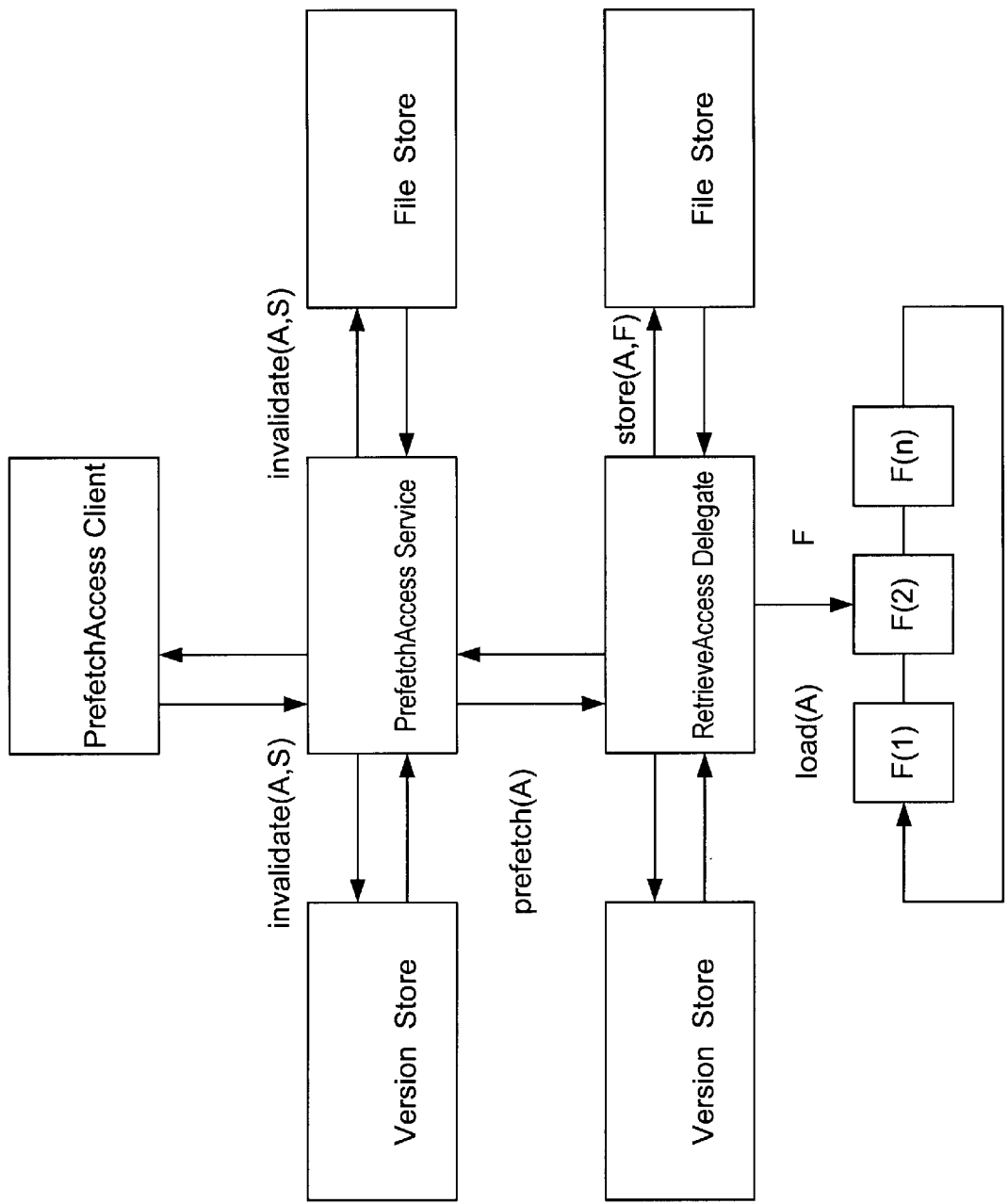
Figure 14C:
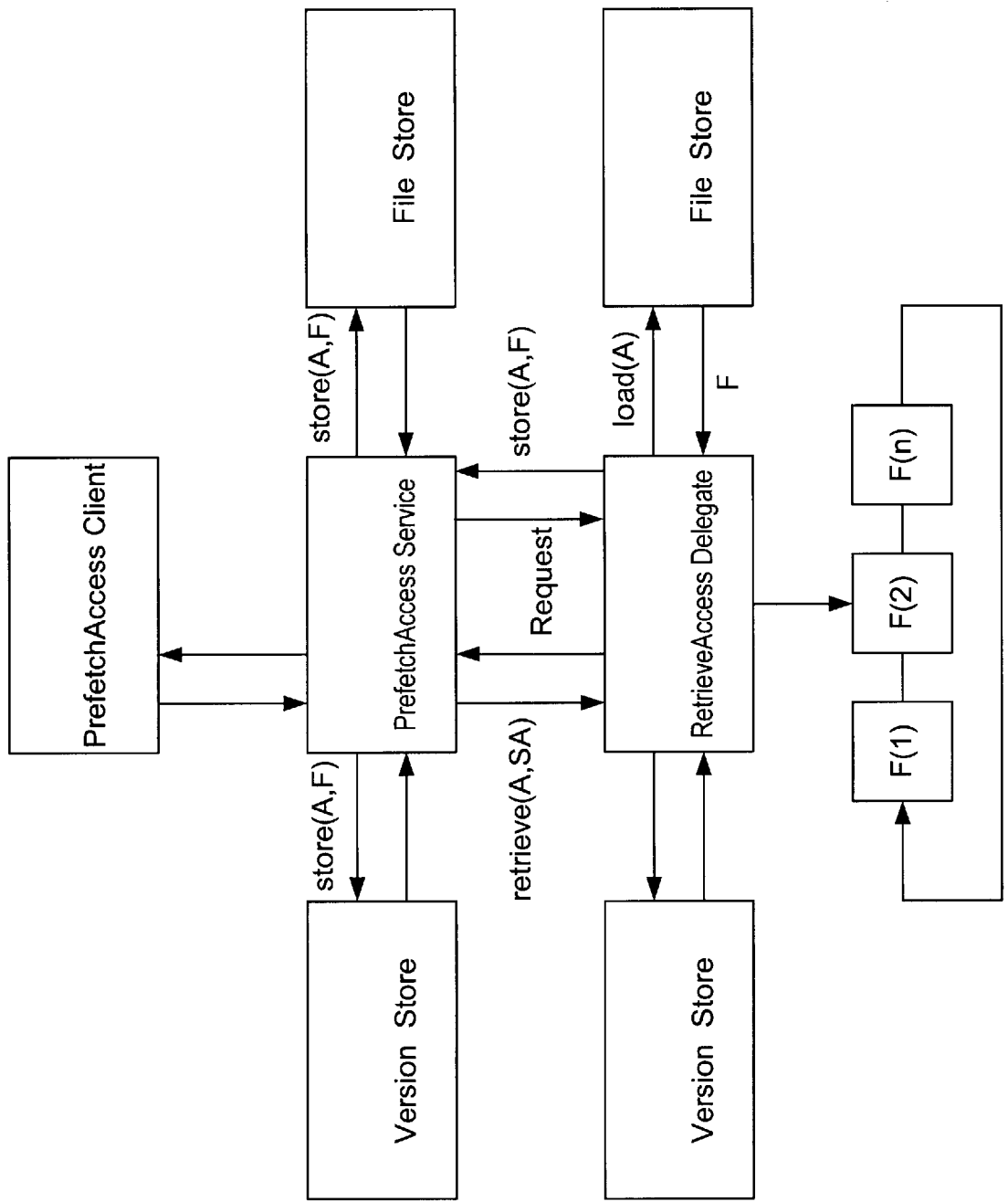

FIGS. 14A–14C corresponds to the situation where the delegate supports the retrieve( ) function. As shown in FIG. 14A, the file access object invokes load( ) on the VersionStore to recover the version and invokes validate( ) on the delegate. The invocation sequence shown in FIG. 14B assumes the result is that the version is found to be stale. The file access object in the example exploits the fact that the delegate also supports the prefetch( ) function. The file access object invokes invalidate( ) the VersionStore and the FileStore, but also invokes prefetch( ) on the delegate. The file access object then returns null to the client. FIG. 14C, however, assumes the result is that the version is found to be stale. The file access object in the example is proactive. The file access object invokes retrieve( ) the delegate. The delegate later invokes store( ) on the file access object to forward the file. The file access object stores the version and the file before it returns null to the client.

FIGS. 15A–15K describes the invocation patterns for the validate( ) function. The example shown in FIGS. 15A–15K assumes that the delegate supports just the basic load( ) function. The discussion on the algorithm for the load( ) function observes that there is little incentive for the file access object to implement a FileStore object. The performance does improve if the file access object implements a VersionStore object. The invocation sequence of FIG. 15A assumes the existence of the VersionStore object. The file access object invokes validate( ) on the VersionStore. The invocation sequence shown in FIG. 15B assumes the result is that the client version is known to be stale. The file access object in this case just returns the status S to the client. The invocation sequence shown in FIG. 15C, however, assumes the result is that the client version matches the version known to the file access object. Since the file access object can not be certain that the version is still valid, the file access object invokes load( ) on the delegate, stores the version, and invokes validate with the client version. The file access object returns the status S that is the return value to the client.

Figure 15A:
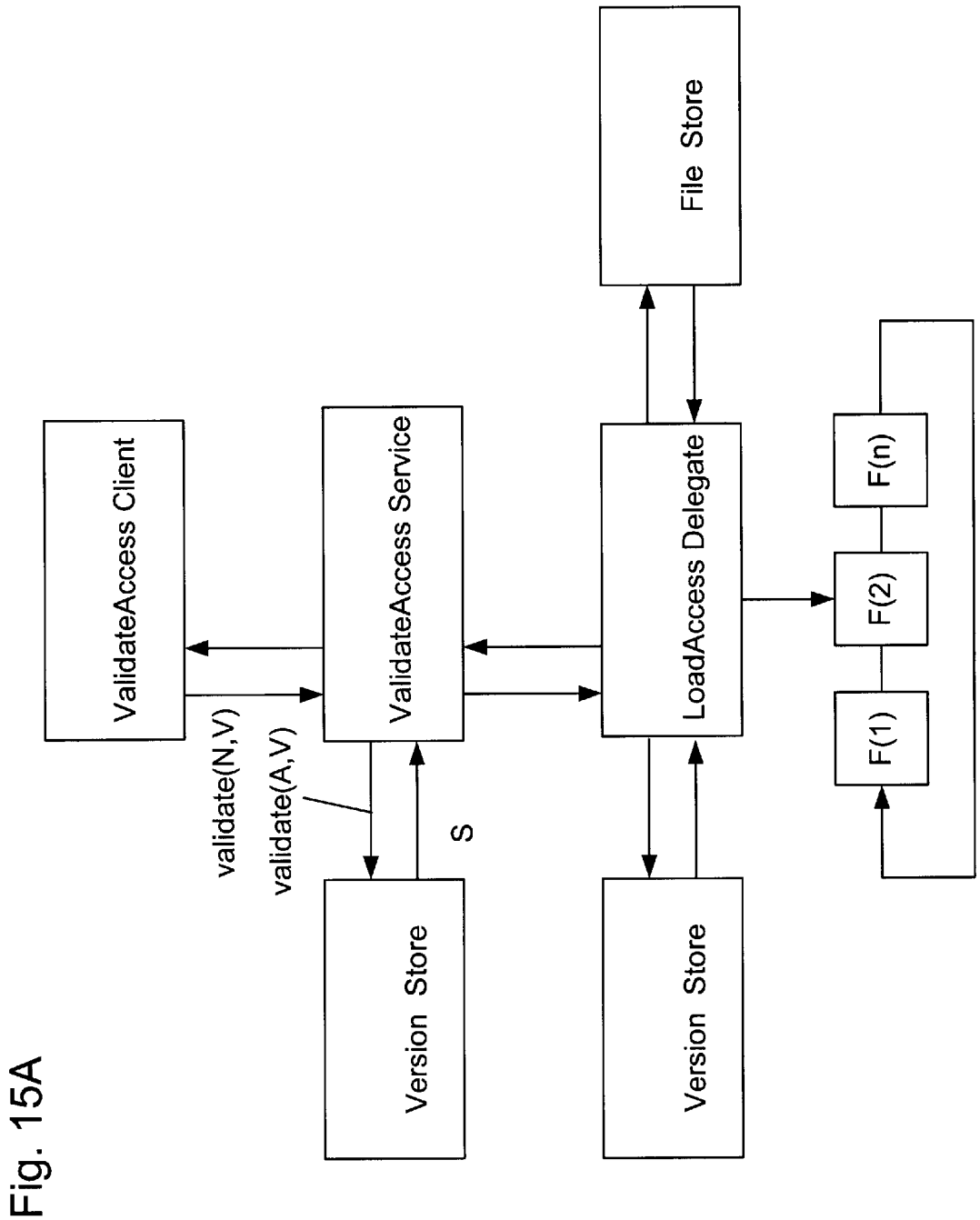
FIGS. 15A–15K assumes that the result of the validate( ) on the VersionStore is indeterminate.
Figure 15B:
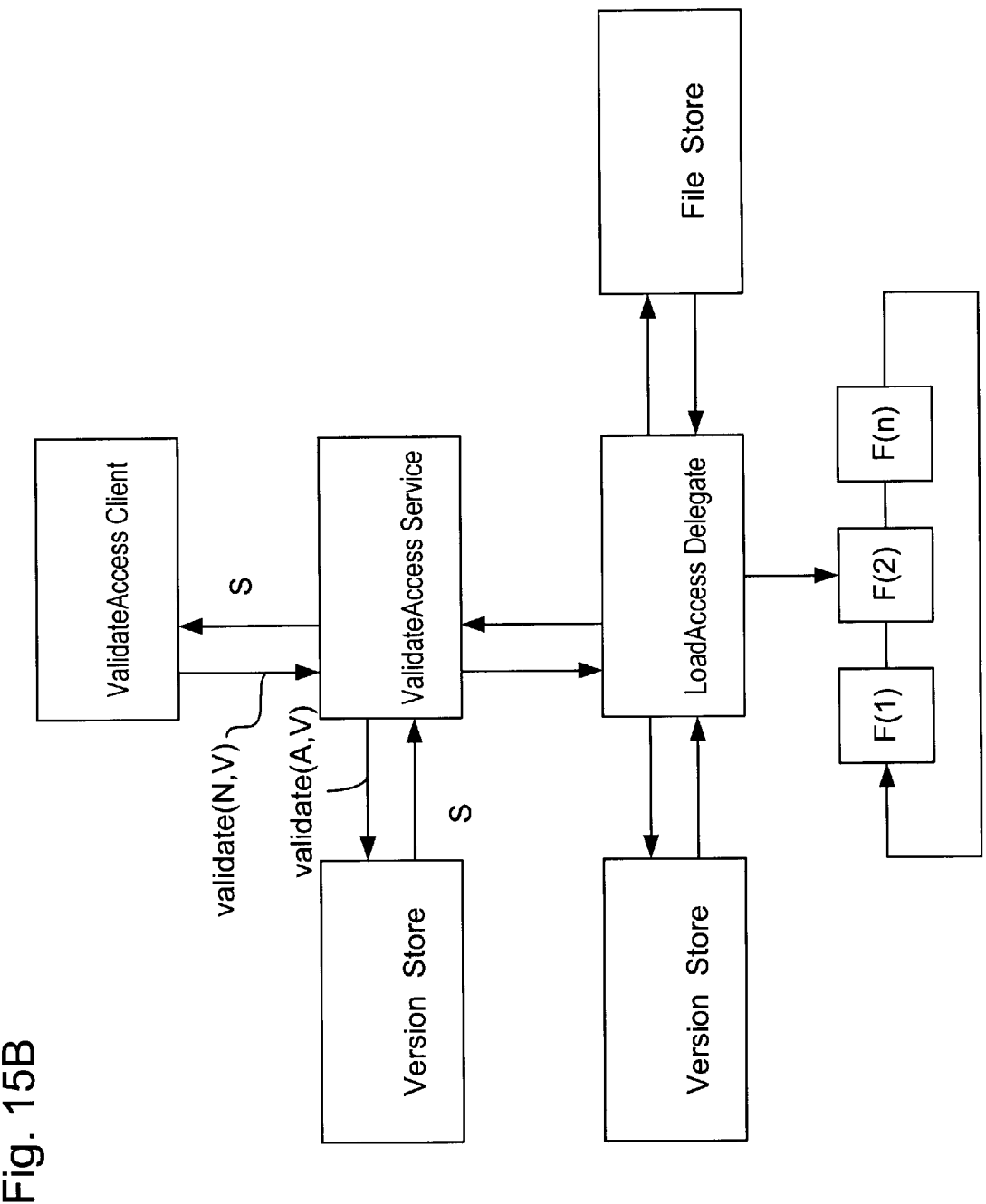
Figure 15C:
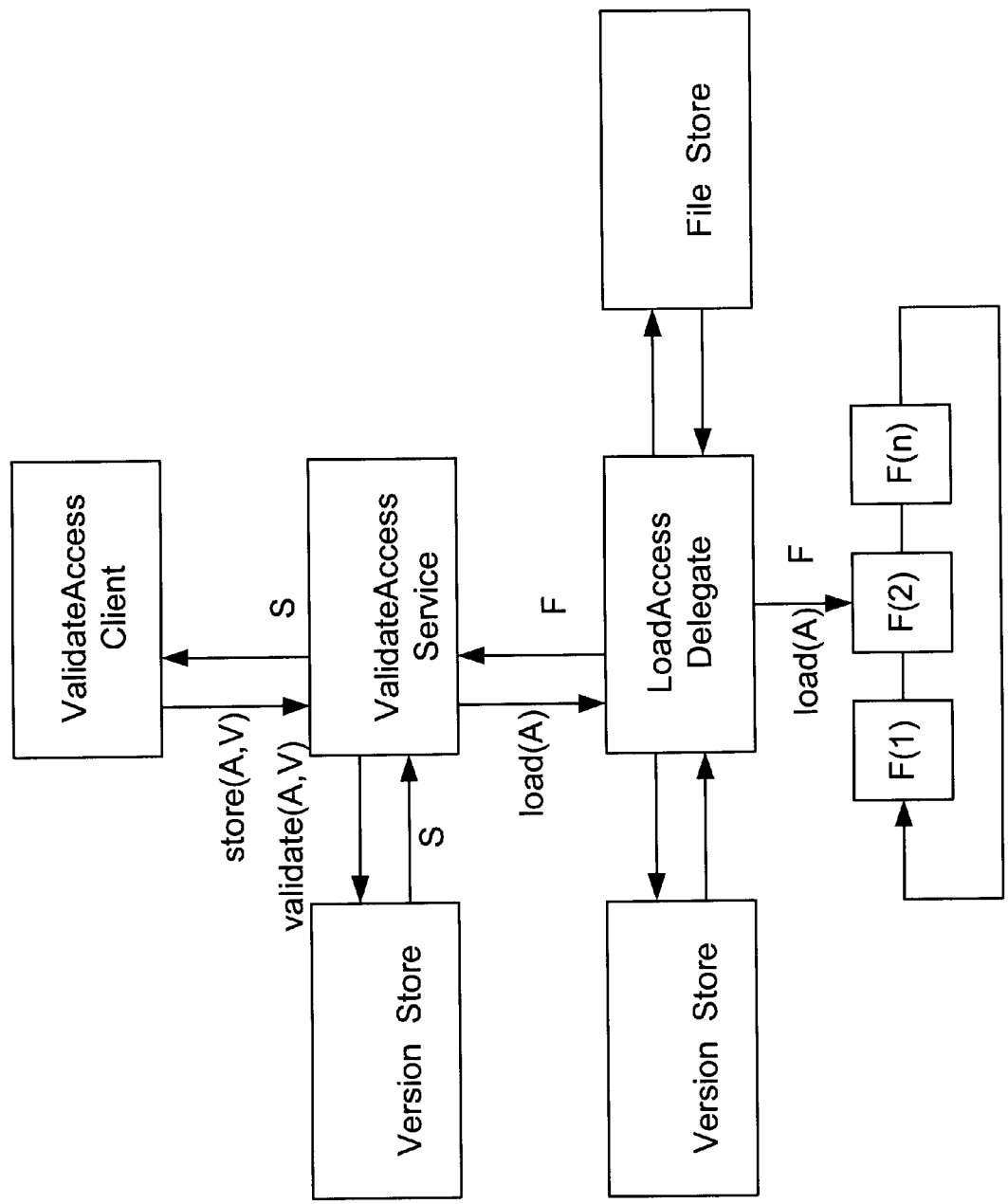
Figure 15D:
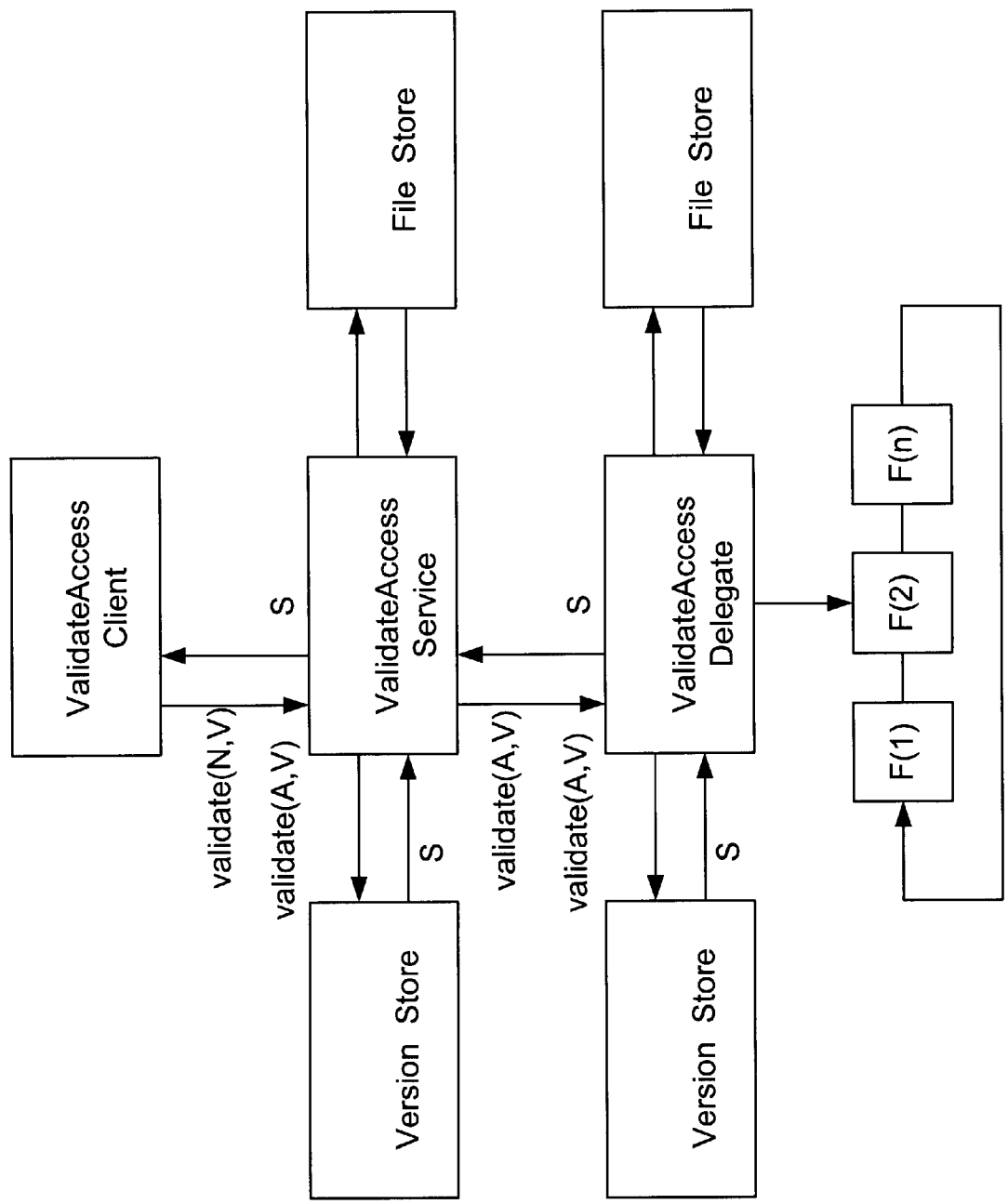
Figure 15E:
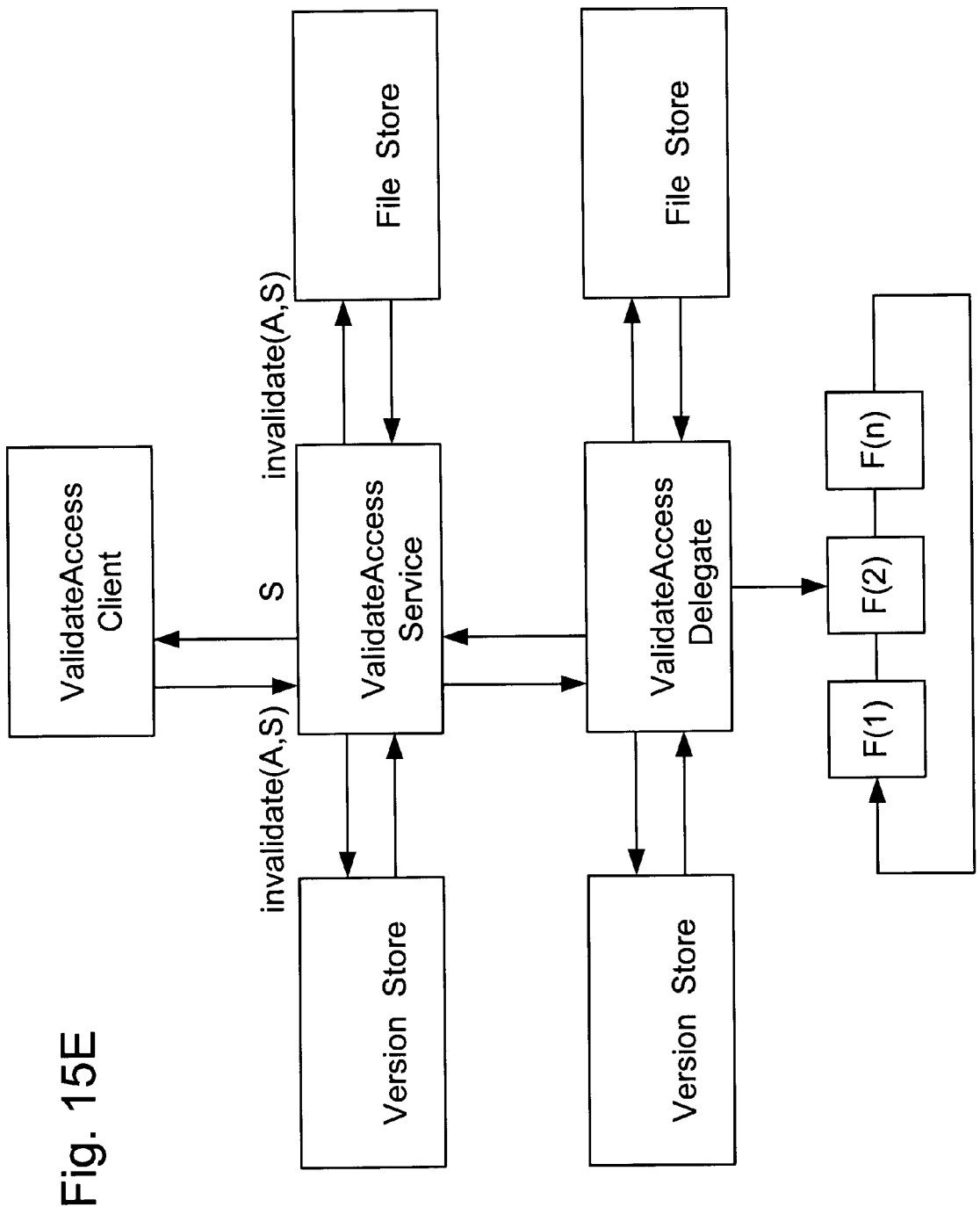
Figure 15F:
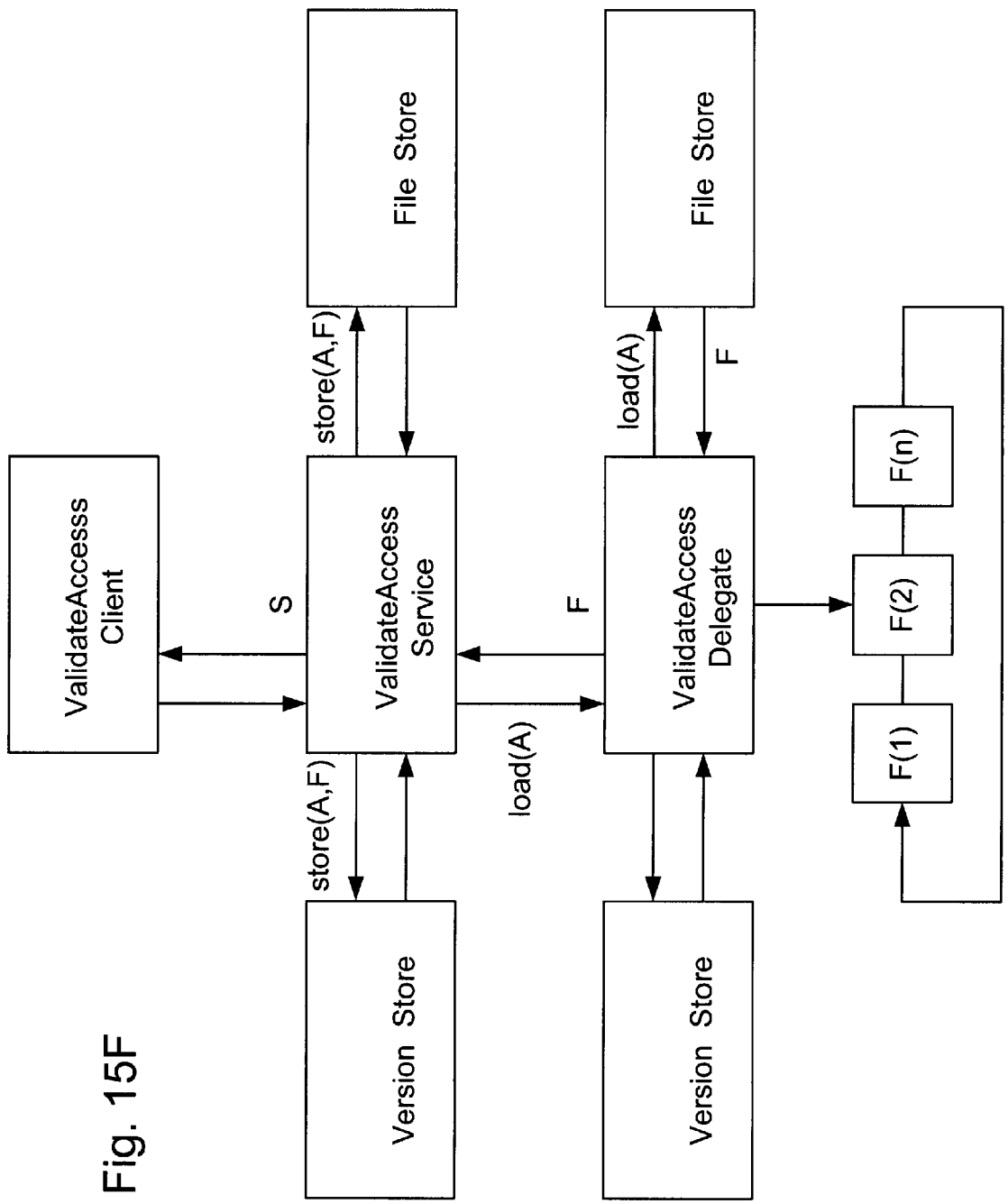

The invocation pattern shown in FIG. 15D corresponds to the situation where the delegate supports the validate( ) (or prefetch) function. FIGS. 15D–15F assumes that the result of the validate( ) on the VersionStore is indeterminate. Since the file access object can not be certain that the version is current, it cascades the validate( ) to the delegate. The invocation sequence shown in FIG. 15D corresponds to the situation where the version is found to be current. The invocation sequence shown in FIG. 15E, however, corresponds to the situation where the version is found to be stale. The file access object in this example is not proactive. The file access object just returns the status S to the client. The invocation sequence shown in FIG. 15F corresponds to the situation where the version is found to be stale. The file access object in this example is proactive. The file access object first invokes load( ) on the delegate and stores the version and file. Once these operations are complete, the file access object returns the status to the client.

Figure 15G:
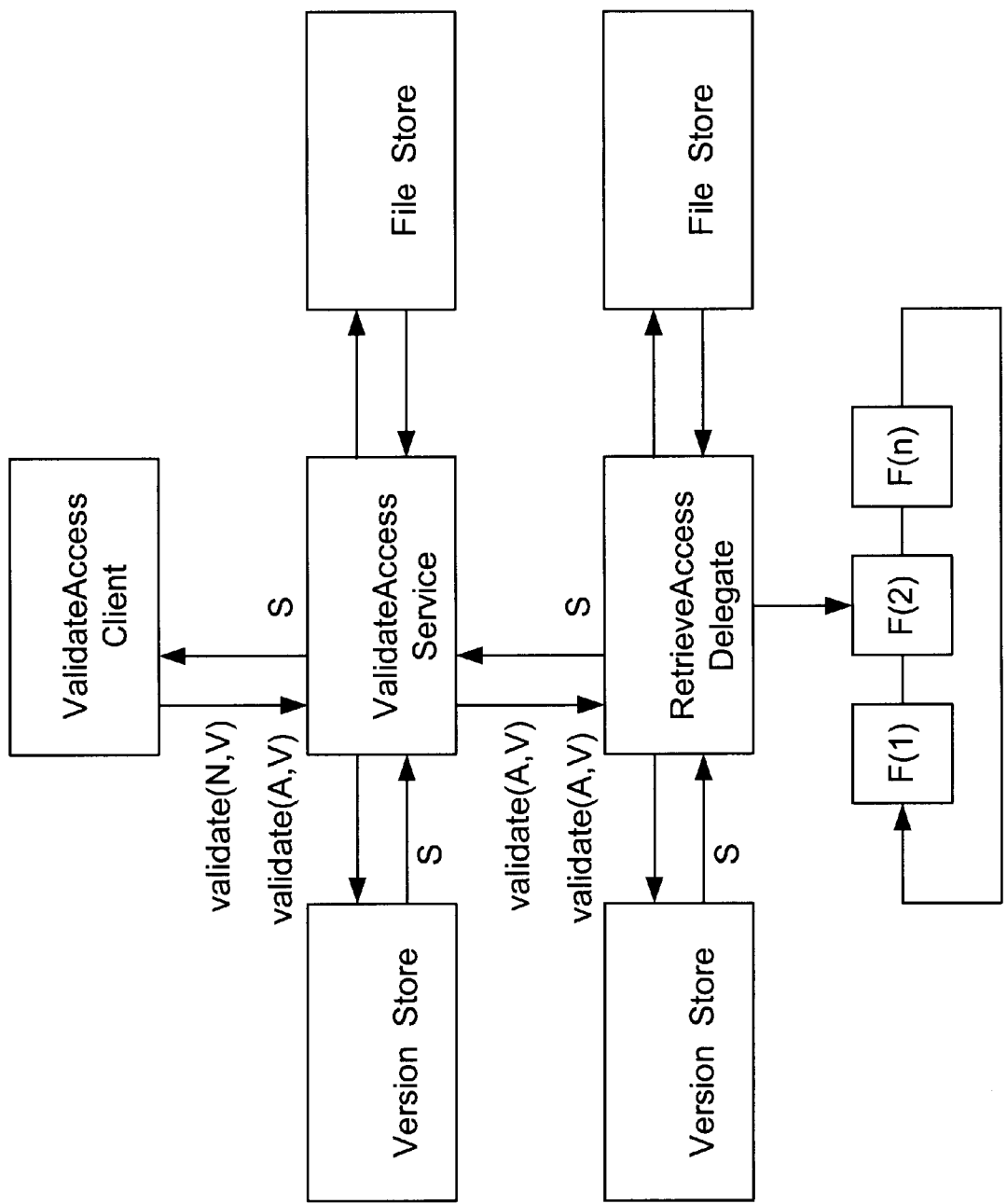
Figure 15H:
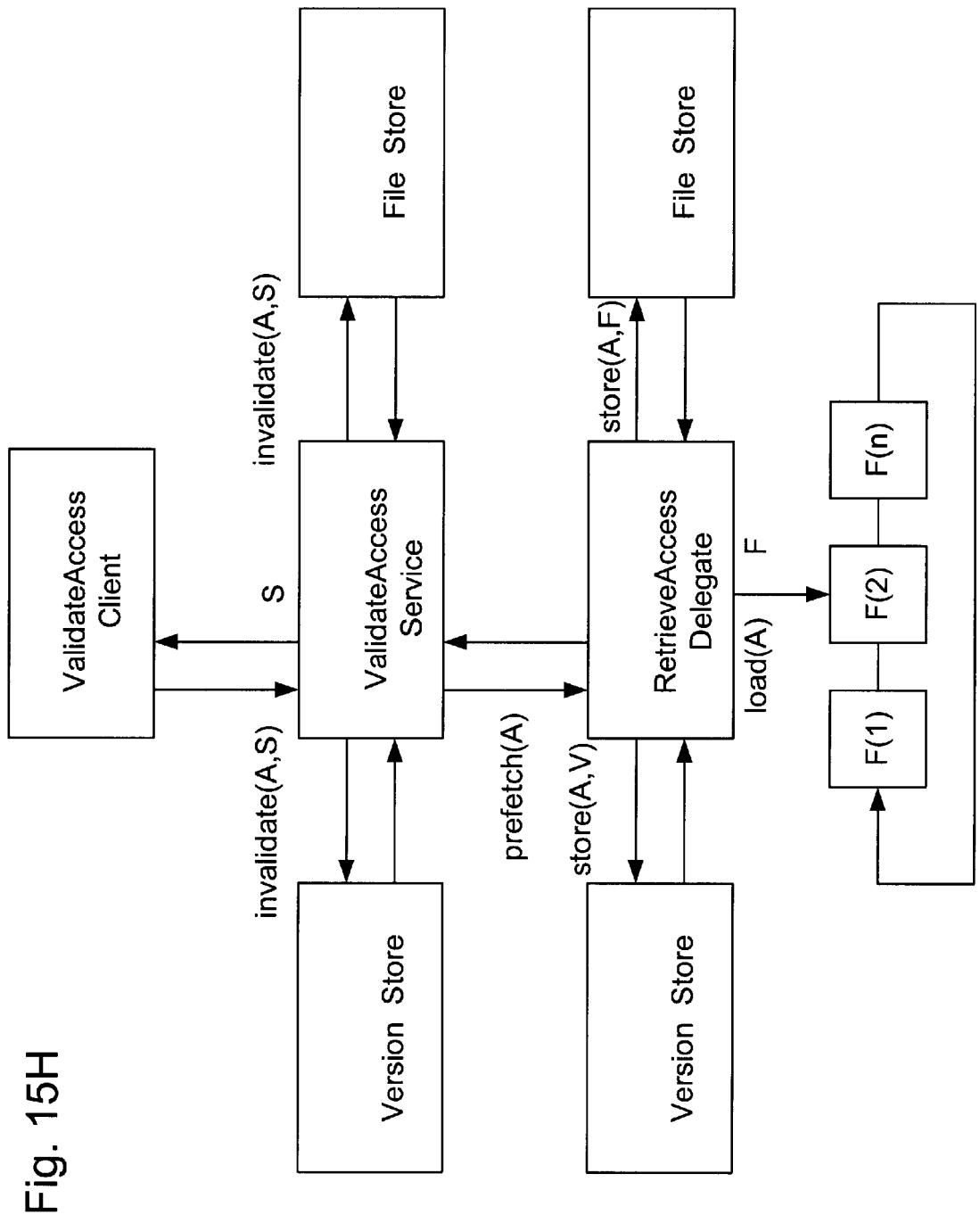

The invocation pattern shown in FIG. 15G corresponds to the situation where the delegate supports the retrieve( ) functions. FIGS. 15G–15K assumes that the result of the validate( ) on the VersionStore is indeterminate. Since the file access object can not be certain that the version is current, it cascades the validate( ) to the delegate. The example shown in FIG. 15G corresponds to the situation where the version is found to be current. The file access object just returns the status S to the client. The invocation sequence shown in FIG. 15H corresponds to the situation where the version is found to be stale. The file access object in this example is somewhat proactive. The file access object invokes prefetch( ) on the delegate before it returns the status to the client.

Figure 15I:
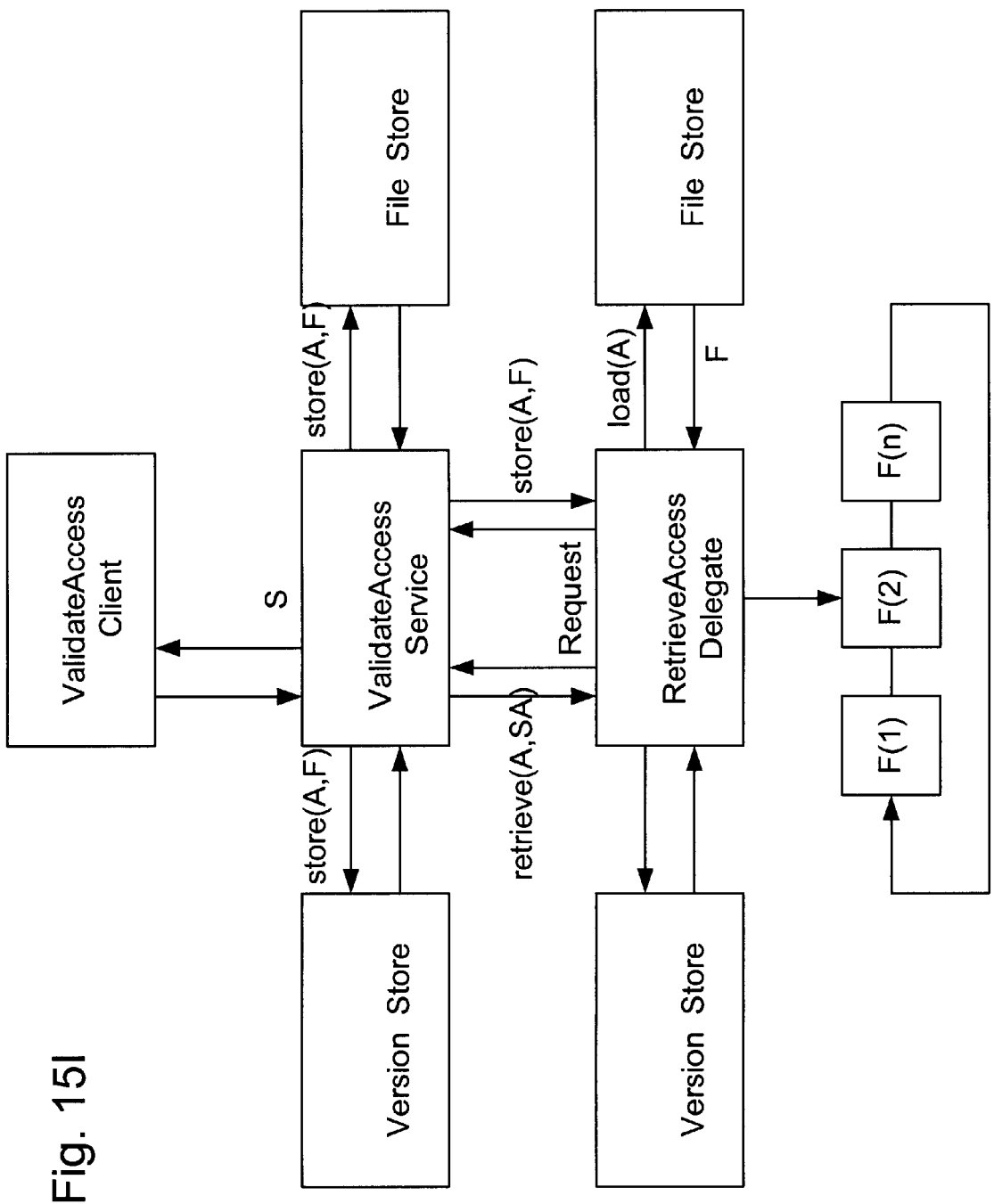

The invocation sequence shown in FIG. 15I corresponds to the situation where the version is found to be stale. The file access object in this example is proactive. The file access object invokes retrieve( ) on the delegate. The delegate later invokes store( ) on the file access object to forward the file. The file access object stores the version and the file before it returns the status to the client.

Figure 15J:
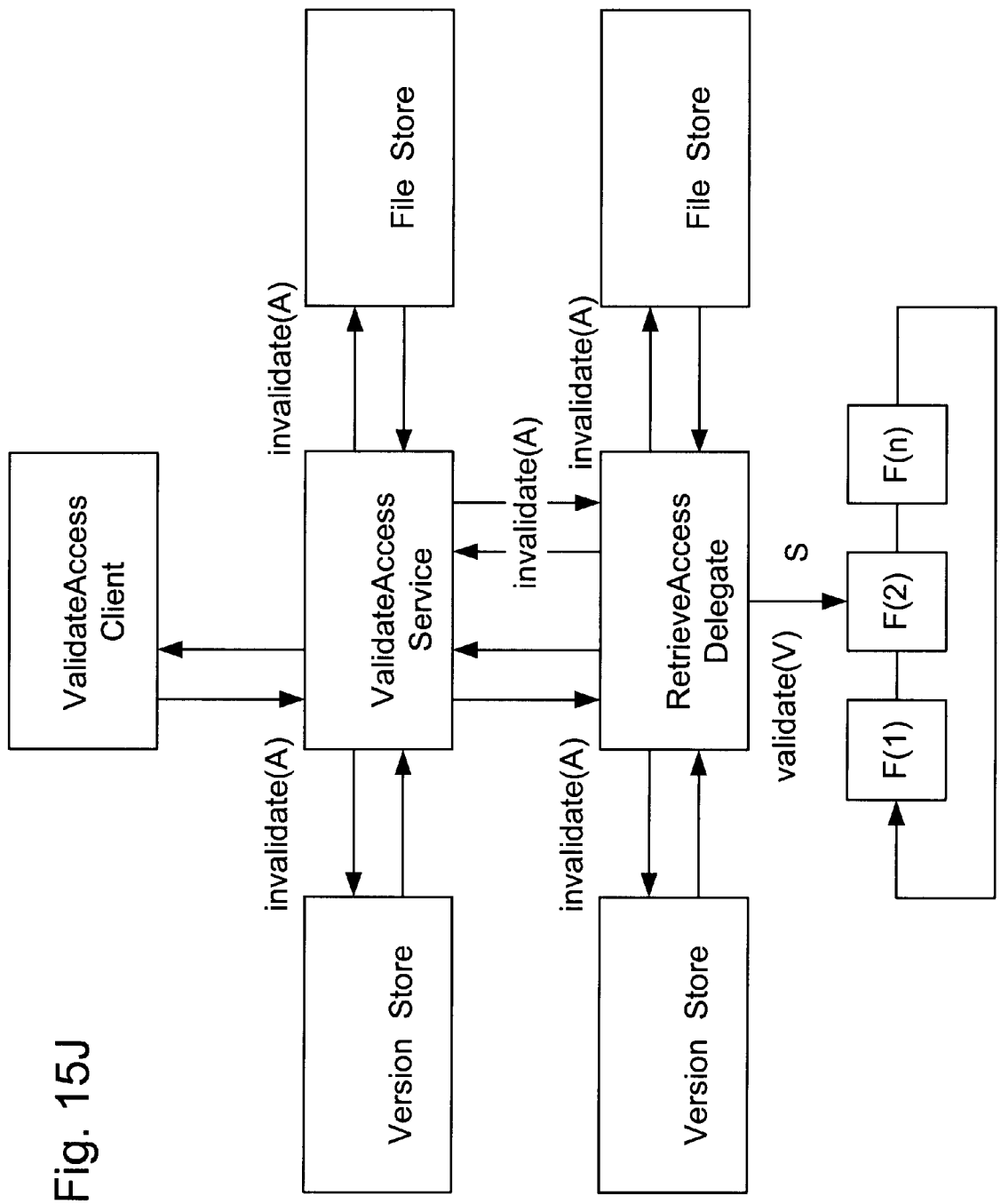
Figure 15K:
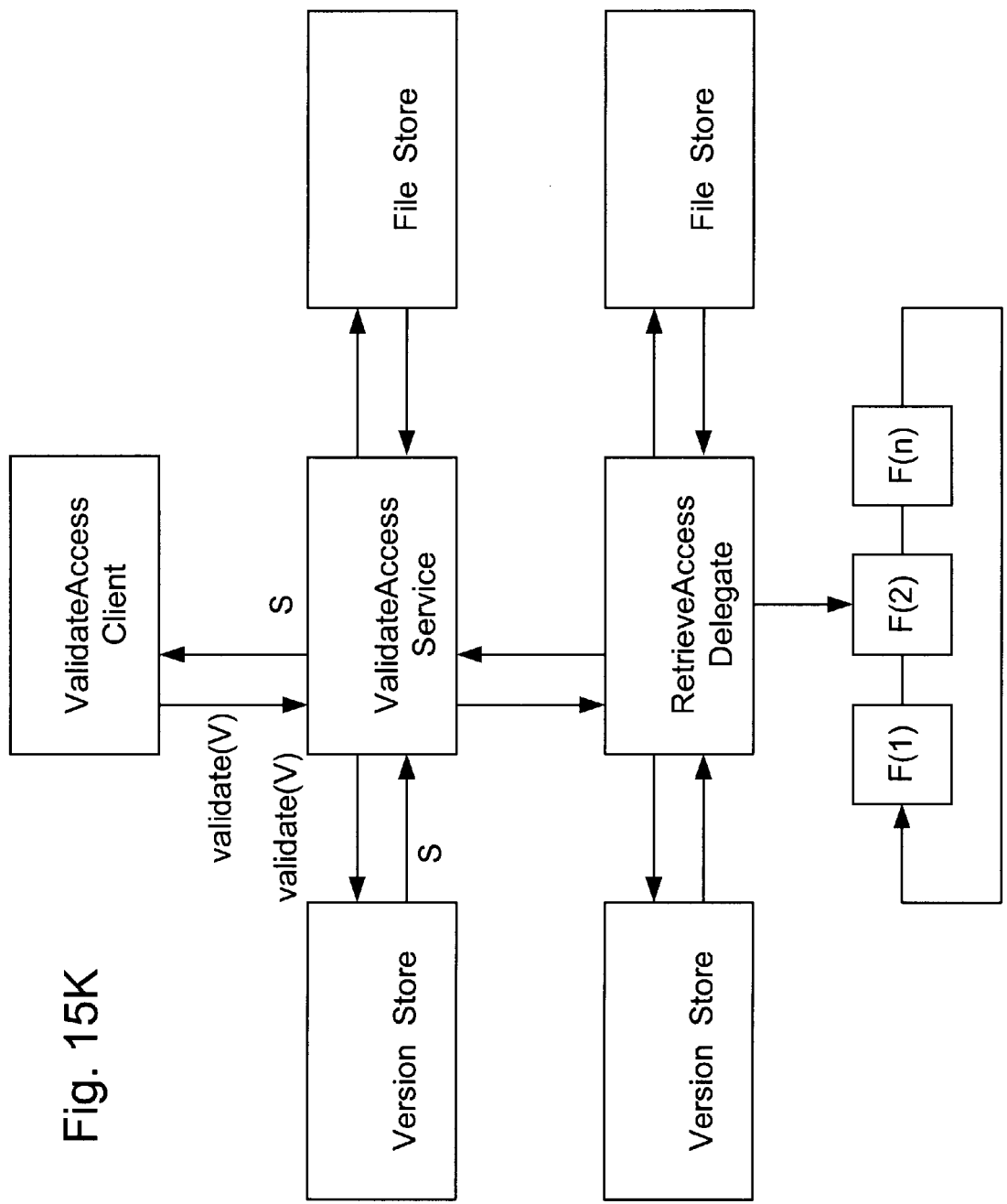

FIG. 15J corresponds to the situation where the delegate supports the retrieve( ) function and the delegate detects version changes. In the invocation sequence shown in FIG. 15J, the delegate instruments the object carousel protocol and detects a version change. The delegate first reflects the change into its VersionStore and FileStore and then invokes invalidate( ) on the file access object. The file access object cascades the invalidate( ) to its VersionStore and FileStore. FIG. 15K illustrates the implications in which it is assumed that the client invokes the validate( ) function. Because the file access object is certain the version of the VersionStore is current, the file access object invokes validate( ) on the VersionStore and just returns the status S to the client.

The following section describes the invocation patterns for the retrieve( ) function and is illustrated by FIGS. 16A–16J. It should be noted that the examples shown in FIG. 16A assumes that the delegate supports just the basic load( ) function. Since the delegate supports just the load( ) function, the file access object invokes load( ) on the delegate. The file access object then stores the version (but not the file) before it returns the file to the client. The invocation pattern of FIG. 16B corresponds to the situation where the delegate supports the validate( ) (or prefetch) function. The invocation patterns shown in FIG. 16C assumes that the delegate confirms that the version is current. The file access object invokes load( ) on the FileStore and invokes store( ) on the client to forward the file.

Figure 16A:
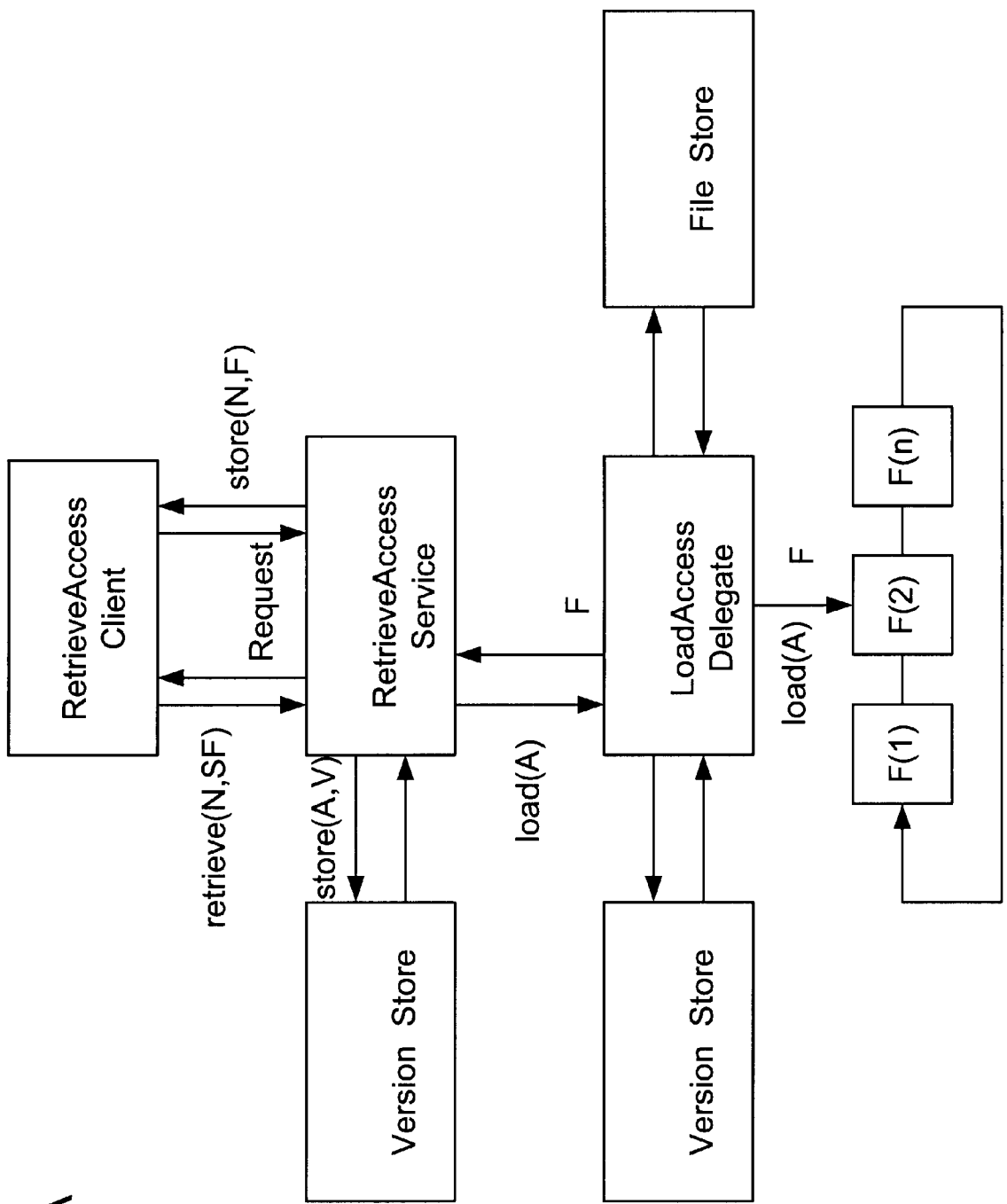
FIGS. 16A–16I illustrate the invocation patterns for the retrieve( ) function.
Figure 16B:
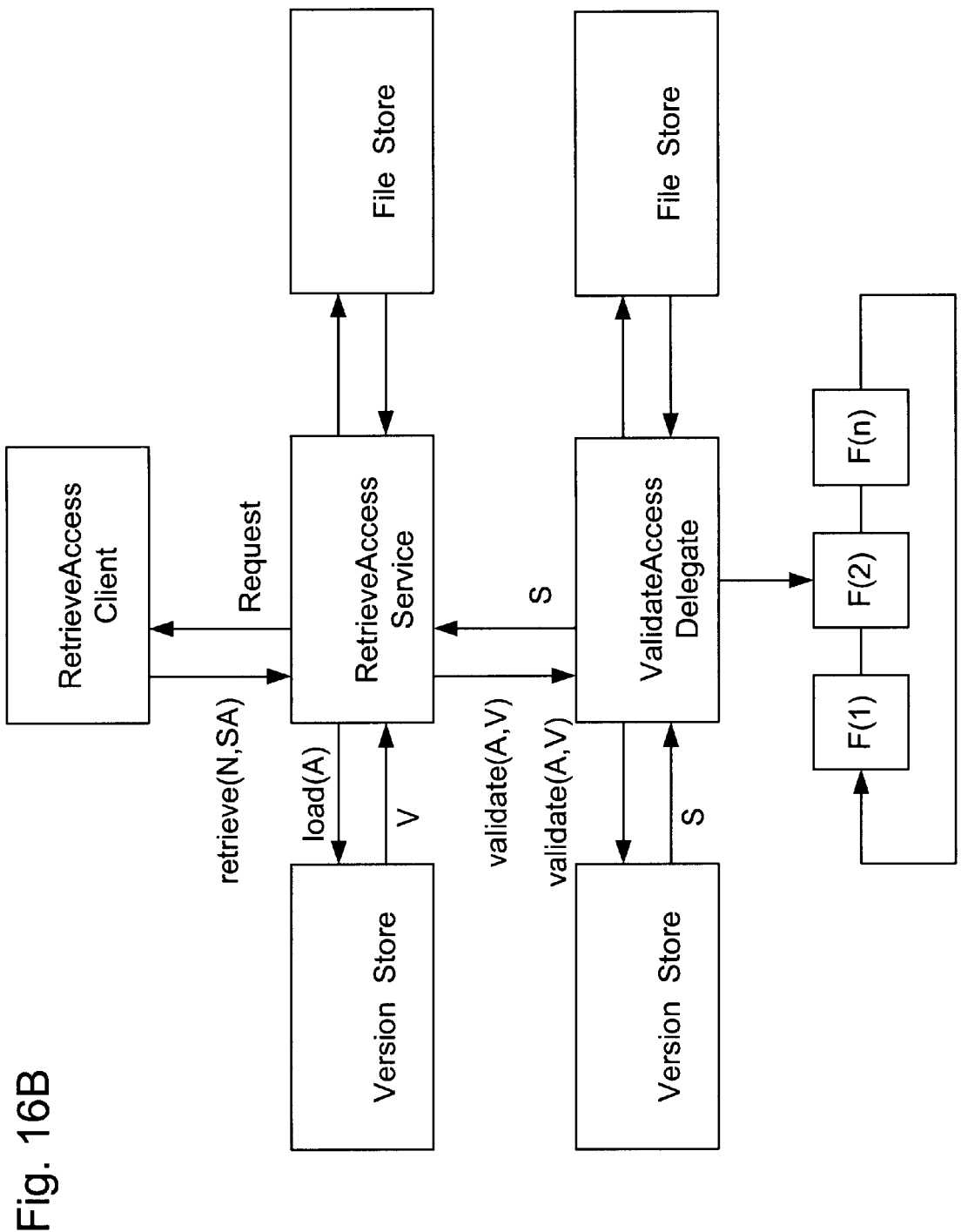
Figure 16C:
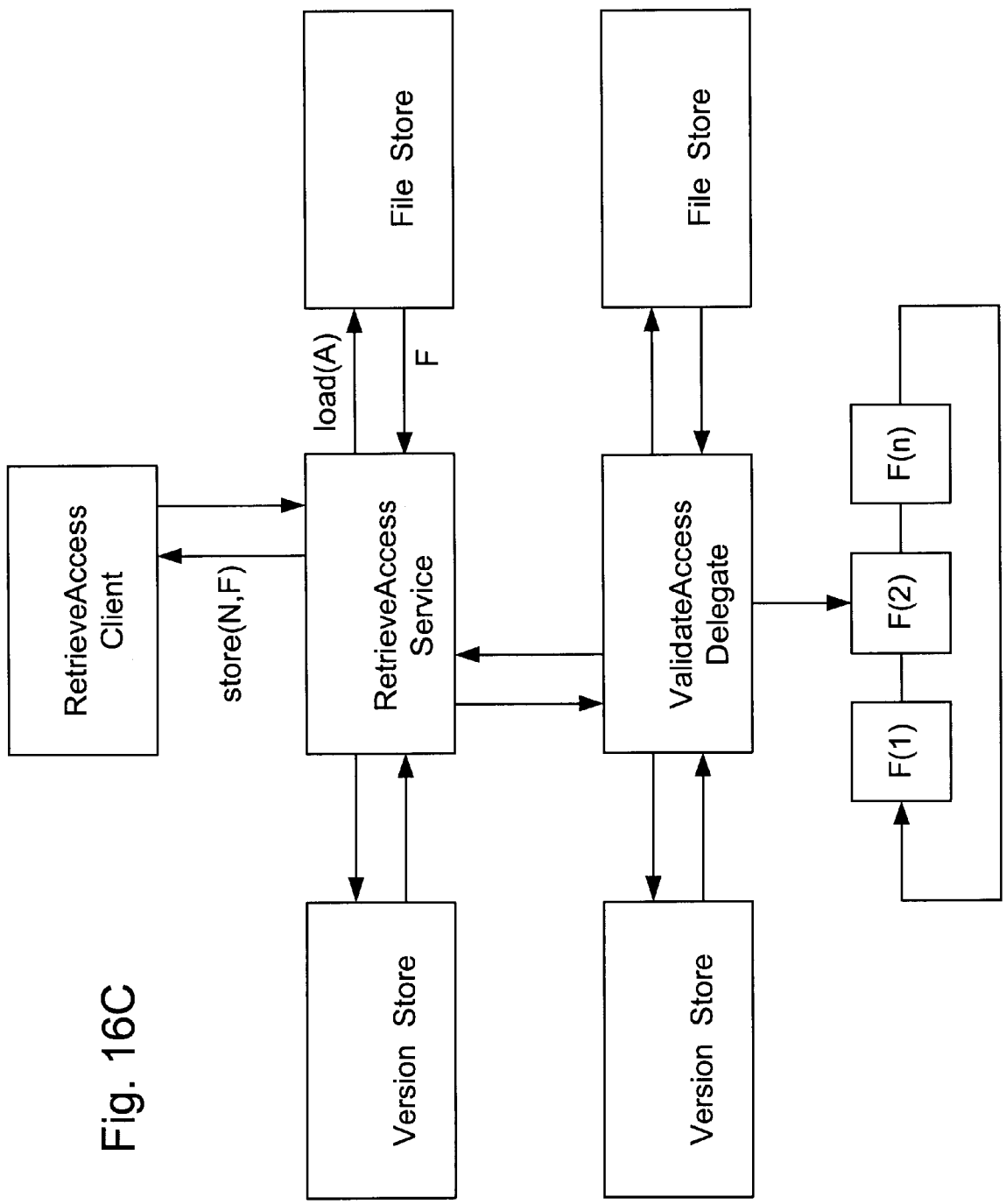
Figure 16D:
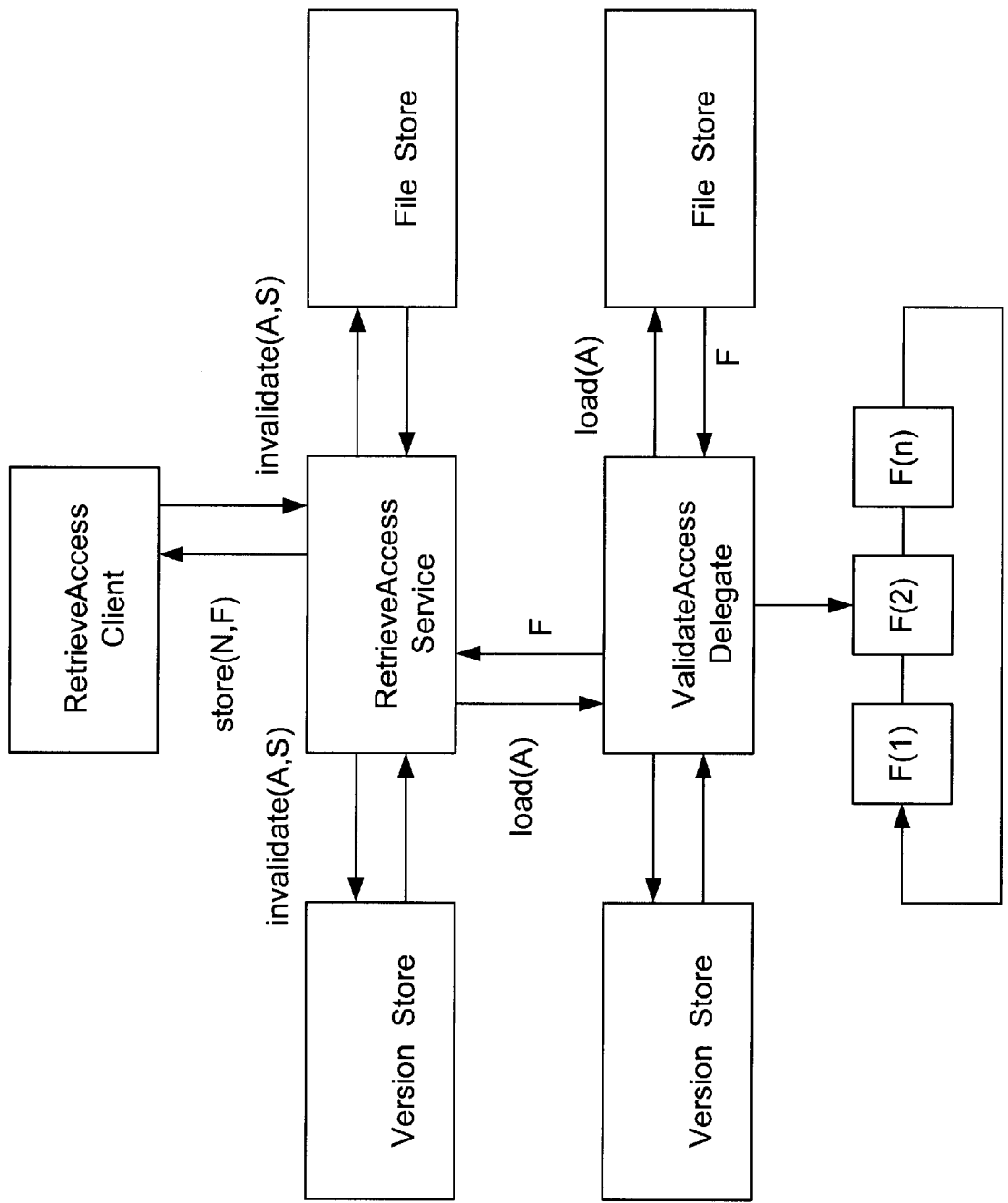

The invocation pattern shown in FIG. 16D assumes the file access object learns that the version is stale. The file access object invokes load( ) on the delegate. The invocation sequence in FIG. 16D the access object is not proactive. The file access object invokes load( ) on the delegate, but elects not to store the file. The file access object instead invokes invalidate( ) on the VersionStore and the FileStore. The file access object then invokes store( ) on the client to forward the file.

Figure 16E:
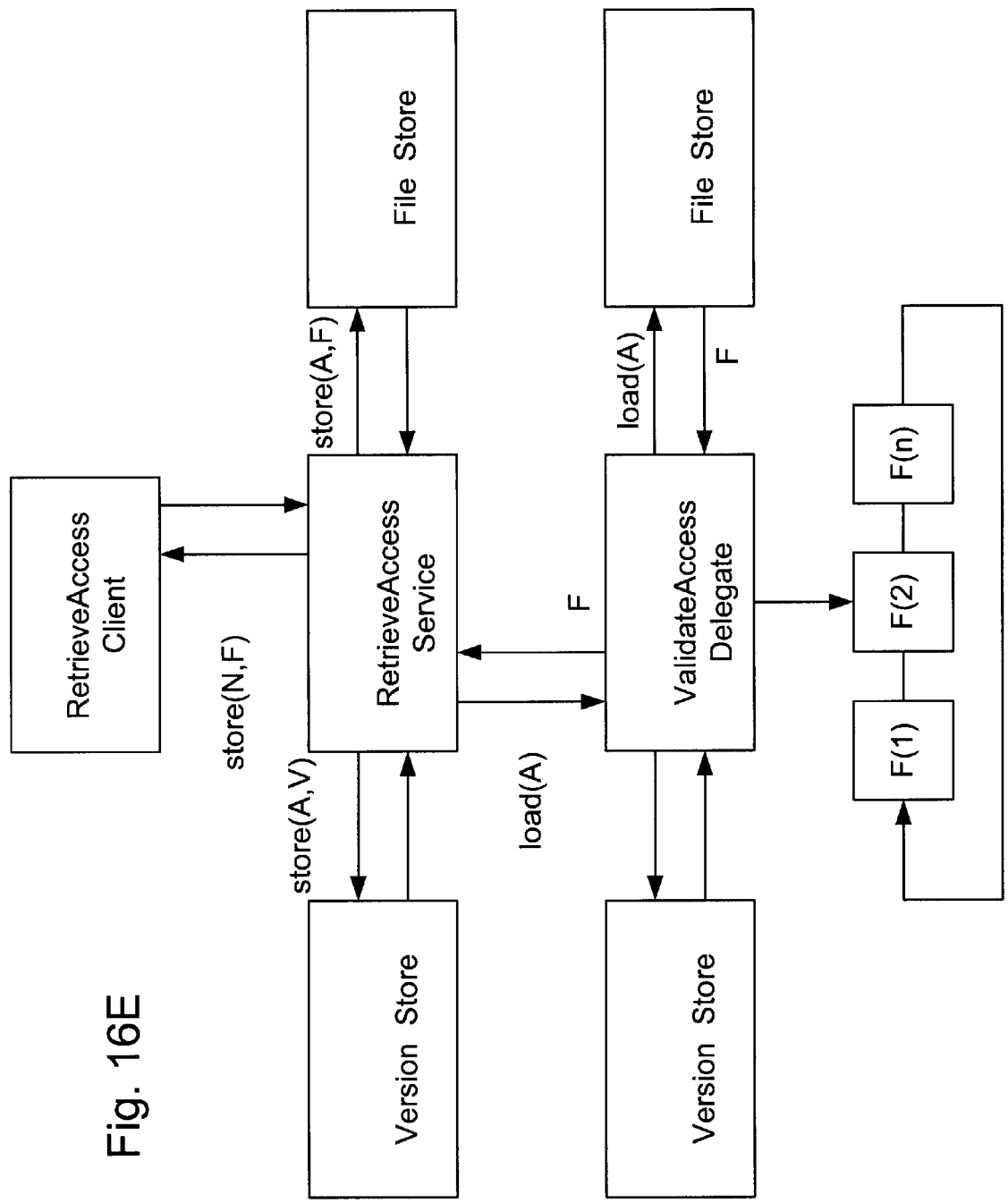

The invocation pattern shown in FIG. 16E assumes the file access object learns that the version is stale. The file access object invokes load( ) on the delegate. The file access object stores the version and the file before it invokes store( ) on the client to forward the file.

Figure 16F:
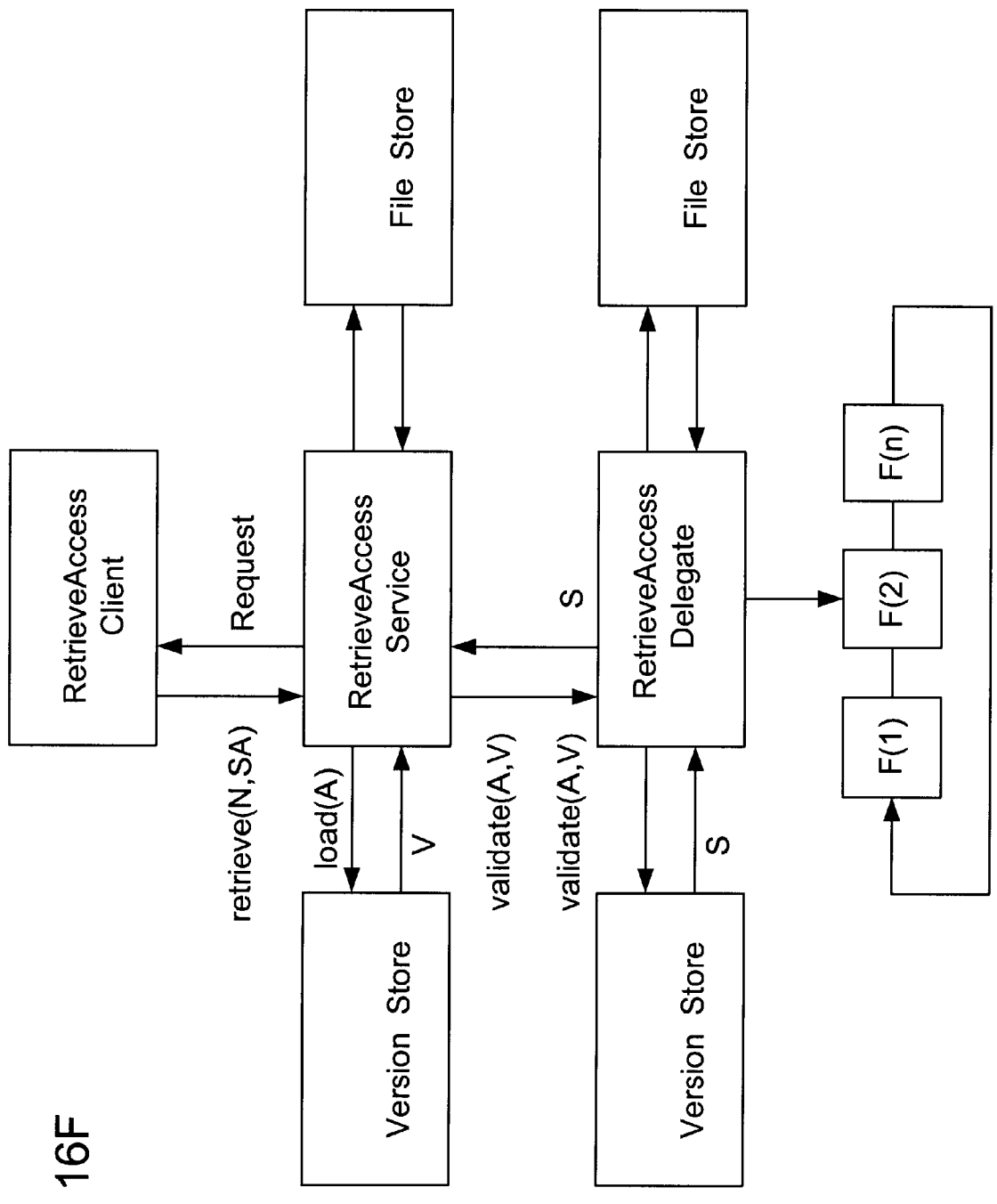
Figure 16G:
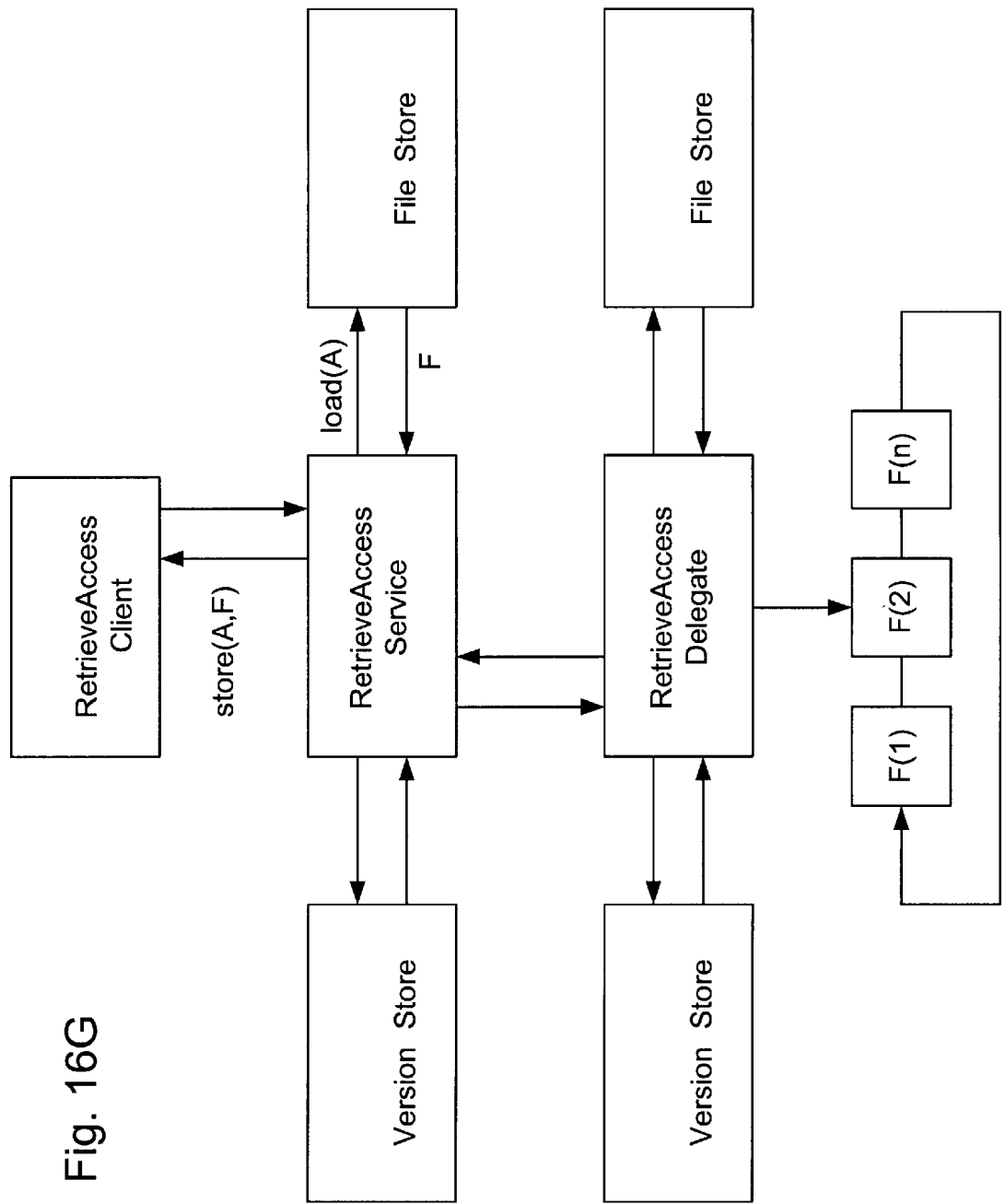
Figure 16H:
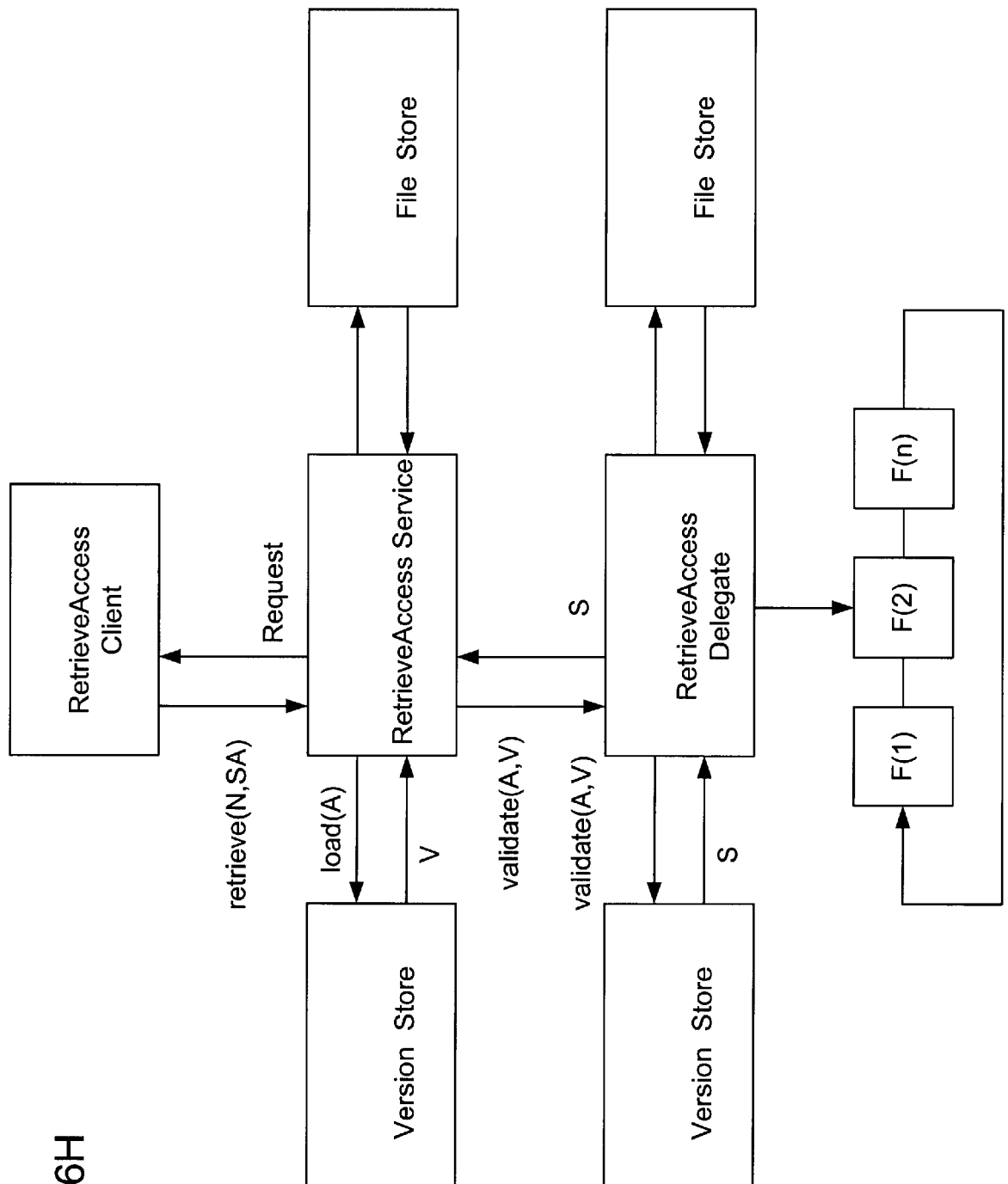
Figure 16I:
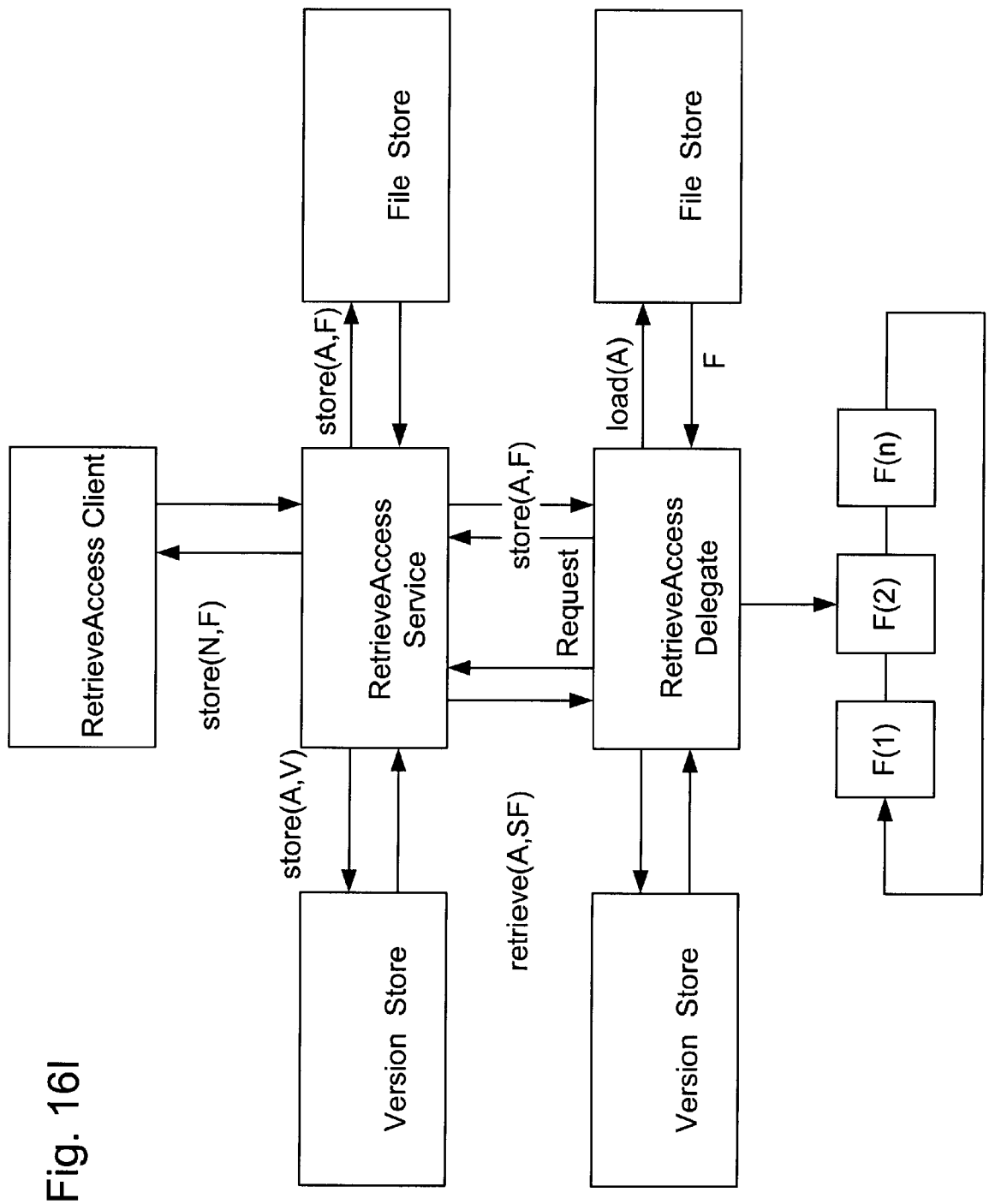

The invocation pattern shown in FIG. 16F corresponds to the situation where the delegate also supports the retrieve( ) function. The invocation pattern shown in FIG. 16G assumes that the delegate confirms that the version is current. The file access object invokes load( ) on the FileStore and invokes store( ) on the client to forward the file. The invocation pattern shown in FIG. 16H assumes the file access object learns that the version is stale. The file access object invokes load( ) on the delegate. (It should be noted that the retrieve( ) function might require multiple threads to realize. The example assumes the file access object invokes load( ) rather than retrieve( ) to conserve threads). The file access object invokes load( ) on the delegate and stores the version and the file. The file access object then invokes store( ) on the client to forward the file. In the invocation pattern shown in FIG. 16I, the file access object learns that the version is stale. The file access object exploits the fact that the delegate supports the retrieve( ) function. The file access object invokes retrieve( ) on the delegate. The delegate later invokes store on the file access object to forward the file. The stores the version and the file. The file access object then invokes store( ) on the client to forward the file.

Figure 17:
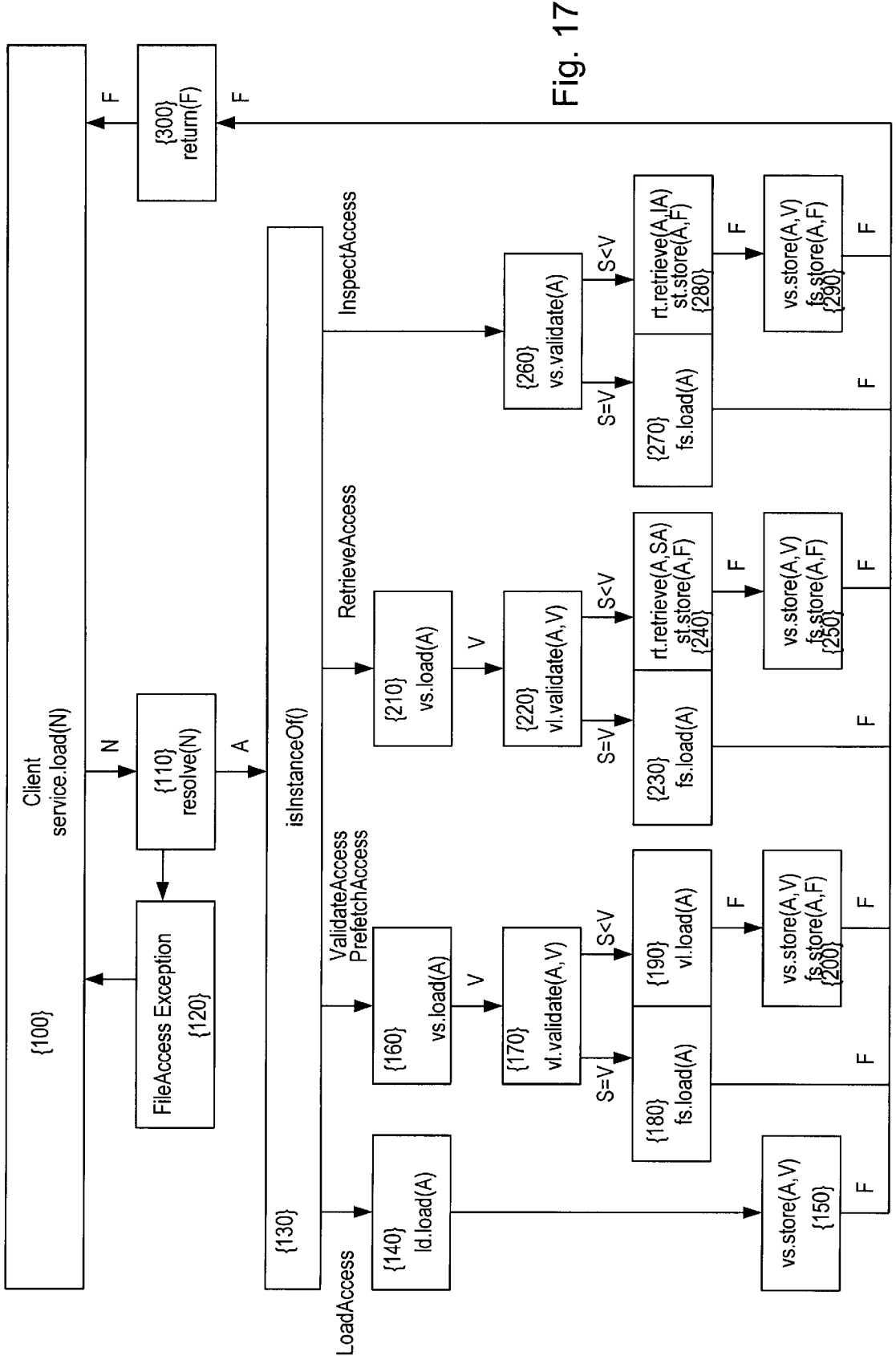
FIG. 17 describes the execution logic of the load( ) function.

FIGS. 17–21 illustrate various logic diagrams for the file access interfaces in accordance with an embodiment of the invention. The diagrams represent the formalism of the interaction patterns of the previous section. The diagrams describe the adaptation to the interface that the delegate object supports. FIG. 17 describes the execution logic of the load( ) function. To initiate the sequence, the client invokes load(String aFileName) {100} on the file access object. The function blocks until the file access object executes return (File aFile) {300} and returns the file to he client. The first step is to resolve( ) {110} the file name to the file address. If the file access object can not resolve( ) the file name, it raises the FileAccessException {120}. If the file access object can resolve( ) the file name, the file access object (in concept) invokes isInstanceOf( ) {130} on the file access delegate. The operation confirms which of the five interfaces the delegate exports. (The file access object, in practice, performs this operation just once, just after it creates the file access delegate. The diagrams include the step to reinforce the adaptation to the specific file access delegate.)

If the file access delegate supports the load( ) function, but does not support the validate( ) function, the file access object invokes load(Address aFileAddress) {140} on the file access delegate. The observation is that there is little incentive for the file access object to store the file itself. The file access object can detect that a version is stale (the validate( ) logic), but it can not certain that the version is current unless it invokes load( ) on the file access delegate. The file access object invokes store(Address aFileAddress, Version, aFileVersion) {150} to store the version but does not store the file itself. The file access object then returns {300} the file to the client.

If the file access delegate supports the validate( ) function (or the prefetch( ) function), the file access object invokes load(Address aFileAddress) {160} on the VersionStore to recover the version. To confirm that the version is valid, the file access object invokes validate(Address aFileAddress, Version aFileVersion) {160} on the file access delegate. The file access delegate returns the file status. If the version is valid, the file access object invokes load(Address aFileAddress) {180} on the FileStore and returns {300} the file to the client. If the version is stale, the file access object invokes load(Address aFileAddress) {190} on the file access delegate. The file access object then invokes store(Address aFileAddress, Version aFileVersion) on its VersionStore and store(Address aFileAddress, File a File) {200} on its FileStore before it returns {300} the file to the client.

If the file access delegate supports the retrieve( ) function, the file access object invokes load(Address aFileAddress) {210} on its VersionStore to recover the file version. To confirm that the version is valid, the file access object invokes validate(Address aFileAddress, Version aFileVersion) {220} on the file access delegate. The file access delegate returns the file status. If the version is valid, the file access object invokes load(Address aFileAddress) {230} on the FileStore and returns {300} the file to the client. If the version is stale, the file access object invokes retrieve(Address aFileAddress, StoreAccess aStoreAccess) {240} on the file access delegate, which later invokes store(Address aFileAddress, File aFile) to return the file. The file access object then invokes store(Address aFileAddress, Version aFileVersion) on the VersionStore and store(Address aFileAddress, File aFile) {250} on the FileStore before it returns {300} the file to the client.

If the file access delegate supports the retrieve( ) function and also detects version changes, the file access object invokes validate(Address aFileAddress) {260} on the VersionStore. If the version is valid, the file access object invokes load(Address aFileAddress) {270} on the FileStore and returns {300} the file to the client. If the version is stale, the file access object invokes retrieve(Address aFileAddress, StoreAccess aStoreAccess) {280} on the file access delegate, which later invokes store(Address aFileAddress, File aFile) to return the file. The file access object then invokes store(Address aFileAddress, Version aFileVersion) on the VersionStore and store(Address aFileAddress, File aFile) {290} on the FileStore before it returns {300} the file to the client.

Figure 18:
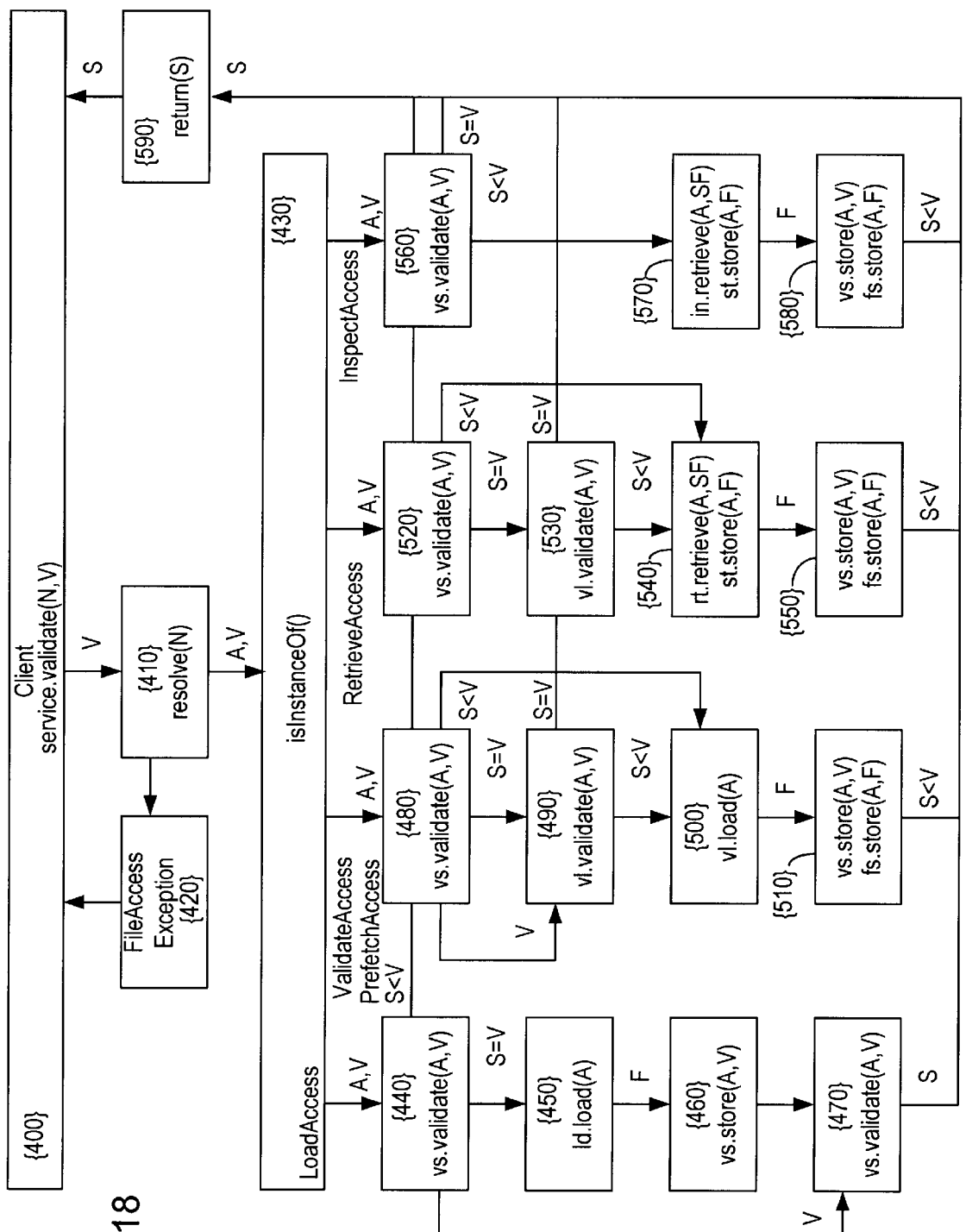
FIG. 18 describes the execution logic for the validate( ) function in accordance with an embodiment of the invention.

FIG. 18 describes the execution logic for the validate( ) function in accordance with an embodiment of the invention. To initiate the sequence, the client invokes validate (Version aFileVersion) {400} on the file access object. The function blocks until the file access object executes return (Status aStatus) {590} and returns the status to the client. The first step is to resolve( ) the file name to the file address. (The fact that previous operations were able to resolve( ) the file name is not sufficient. The location (or perhaps existence) of the file can change over time.) The file access object attempts to resolve( ) {410} the file name to the file address. If the file access object can not resolve( ) the file name, it raises {420} the FileAccessException. If the file access object can resolve( ) the file name, the file access object (in concept) invokes isInstanceOf( ) {430} on the file access delegate. The operation confirms which of the five interfaces the delegate exports. (The file access object, in practice, performs this operation just once, after it creates the file access delegate. The logic diagrams include the step to reinforce the adaptation to the specific file access delegate.)

If the file access delegate supports the load( ) function, but does not support the validate( ) function, the file access object emulates the validate( ) function. The file access object first invokes validate(Address aFileAddress, Version a ClientVersion {440} on the VersionStore. If the file is known to be stale, the file access object returns {590} the status to the client. If the client version matches the version, the file access object can not be certain the client version is valid. The file access object invokes load(Address aFileAddress) {450} on the file access delegate. The delegate returns the file. The file access object invokes store (Address aFileAddress, Version aFileVersion) {460} on the VersionStore and then validate(Address aFileAddress, Version aClientVersion) {470} on the VersionStore. (Note that the sequence expedites future validate( ) functions, because the VersionStore contains the current version. Thus the logic can perhaps detect in the first step that a client version is stale.) The file access object returns {590} the status to the client.

If the file access delegate supports the validate( ) function (or the prefetch( ) function), the file access object invokes validate(Address aFileAddress, Version aClientVersion) {480} on the VersionStore. If the file is known to be stale, the file access object invokes load(Address aFileAddress) {500} on the file access delegate. The file access object then invokes store(Address aFileAddress, Version aFileVersion) on the VersionStore and store(Address aFileAddress, File aFile) on the FileStore {510} before the file access object returns {590} the status to the client. If the client version matches the version, the file access object invokes validate (Address aFileAddress, Version aClientVersion) {490} on the file access delegate. If the client version matches the delegate version, the file access object returns {590} the status to the client. If the client version is stale, the file access object invokes load(Address aFileAddress) {500} on the file access delegate. The file access object then invokes store (Address aFileAddress, Version aFileVersion) on the VersionStore and store(Address aFileAddress, File aFile) {510} on the FileStore before it returns {590} the status to the client.

If the file access delegate supports the retrieve( ) function, the file access object invokes validate(Address aFileAddress, Version aClientVersion) {520} on the VersionStore. If the file is known to be stale, the file access object invokes retrieve(Address aFileAddress, StoreAccess aStoreAccess) {540} on the file access delegate, which later invokes store(Address aFileAddress, File aFile) to forward the file. The file access object then invokes store(Address aFileAddress, Version aFileVersion) on the VersionStore and store(Address aFileAddress, File aFile) on the FileStore {550} before the file access object returns {590} the status to the client. If the client version matches the version, the file access object invokes validate(Address aFileAddress, Version aClientVersion) {530} on the file access delegate. If the client version matches the delegate version, the file access object returns {590} the status to the client. If the client version is stale, the file access object invokes retrieve (Address aFileAddress, StoreAccess aStoreAccess) {540} on the file access delegate, which later invokes store (Address aFileAddress, File aFile) to forward the file. The file access object then invokes store(Address aFileAddress, Version aFileVersion) on the VersionStore and store (Address aFileAddress, File aFile) on the FileStore {550} before the file access object returns {590} the status to the client.

If the file access delegate supports the retrieve( ) function and also detects version changes, the file access object invokes validate(Address aFileAddress) {560} on the VersionStore. If the file is known to be stale, the file access object invokes retrieve(Address aFileAddress, StoreAccess aStoreAccess) {570} on the file access delegate, which later invokes store(Address aFileAddress, File aFile) to forward the file. The file access object then invokes store(Address aFileAddress, Version aFileVersion) on the VersionStore and store(Address aFileAddress, File aFile) on the FileStore {580} before the file access object returns {590} the status to the client. If the client version matches the version, the file access object just returns {590} the status to the client.

Figure 19:
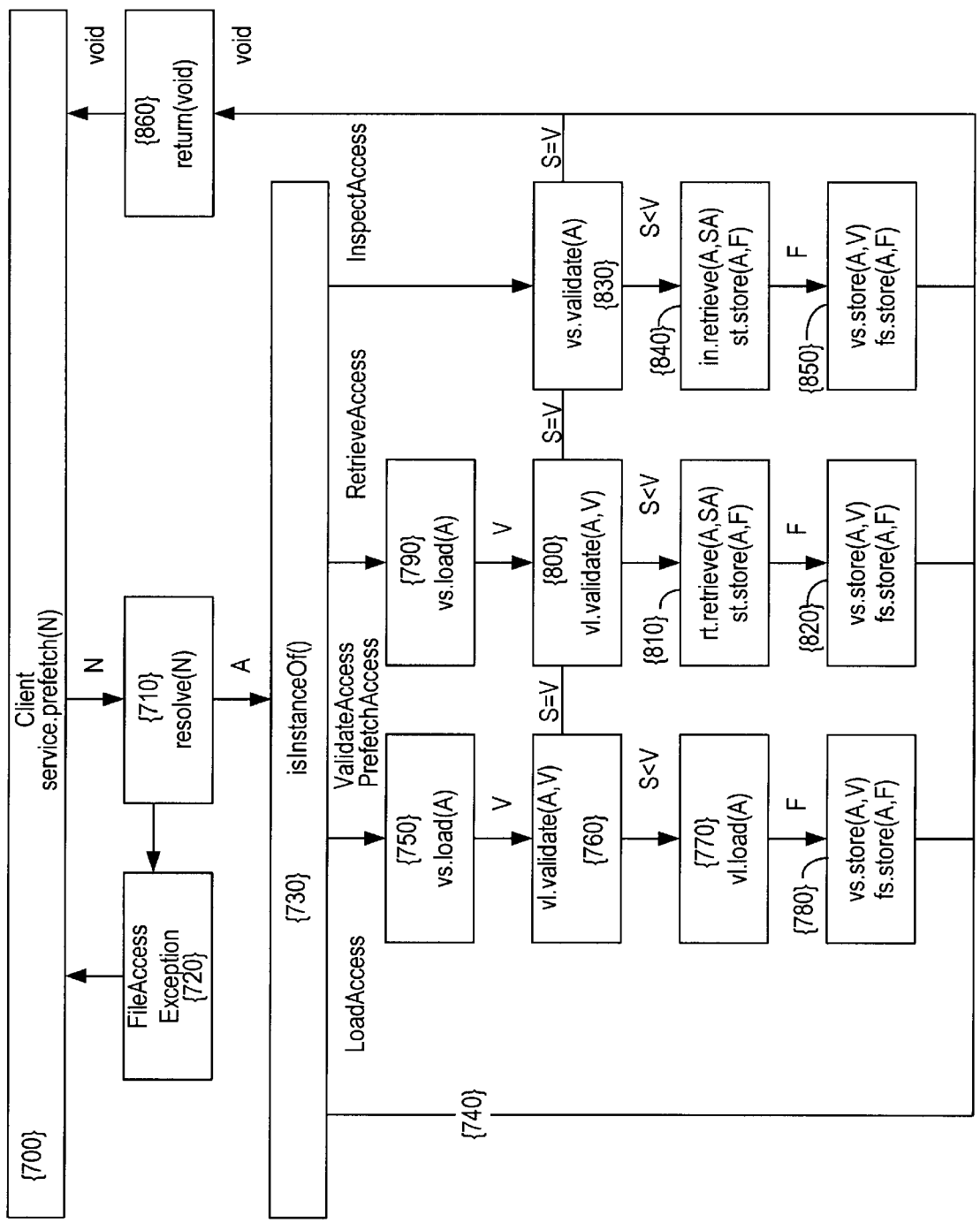
FIG. 19 describes the execution logic for the prefetch( ) function in accordance with an embodiment of the invention.

FIG. 19 describes the execution logic for the prefetch( ) function in accordance with an embodiment of the invention. To initiate the sequence, the client invokes prefetch (String aFileName) {700} on the file access object. The function blocks until the file access object executes return (void) {860}. The first step is to resolve( ) {710} the file name to the file address. If the file access object can not resolve( ) the file name, it raises the FileAccessException {720}. If the file access object can resolve( ) the file name, the file access object (in concept) invokes isInstanceOf( ) {730} on the file access delegate. The operation confirms which of the five interfaces the delegate exports. (The file access object, in practice, performs this operation just once, after it creates the file access delegate. The logic diagrams include the step to reinforce the adaptation to the specific file access delegate.)

If the file access delegate supports the load( ) function, but does not support the validate( ) function, the file access object returns {740} null to the client. The observation is that there is little incentive for the file access object to store the file itself. The file access object can detect if a client version is stale (the validate( ) logic), but the file access object can not certain that the file is valid unless it invokes load( ) on the file access delegate. The implication is that there is little incentive to prefetch the file if the delegate supports just the load( ) function.

If the file access delegate supports the validate( ) function (or the prefetch( ) function), the file access object first invokes load(Address aFileAddress) {750} on the VersionStore. It then invokes validate(Address aFileAddress, Version aFileVersion) {760} on the file access delegate. If the version matches the delegate version, the file access object just returns {860} null to the client. If its file version is stale, the file access object invokes load(Address aFileAddress) {770} on the file access delegate. The delegate returns the file. The file access object invokes store(Address aFileAddress, Version aFileVersion) on the VersionStore and store(Address aFileAddress, File aFile) {780} on FileStore before it returns {860} null to the client.

If the file access delegate supports the retrieve( ) function, the file access object first invokes load(Address aFileAddress) {790} on the VersionStore. It then invokes validate(Address aFileAddress, Version aFileVersion) {800} on the file access delegate. If the version matches the delegate version, the file access object just returns {860} null to the client. If its version is stale, the file access object invokes retrieve(Address aFileAddress, StoreAccess aStoreAccess) on the file access delegate. The delegate later invokes store(Address aFileAddress, File aFile) {810} to forward the file. The file access object then invokes store (Address aFileAddress, Version aFileVersion) on the VersionStore and store(Address aFileAddress, File aFile) {820} on FileStore before it returns {860} null to the client.

If the file access delegate supports the retrieve( ) and detects version changes, the file access object invokes validate(Address aFileAddress) {830} on the VersionStore. If the version is current, the file access object just returns {860} null to the client. If its version is stale, the file access object invokes retrieve(Address aFileAddress, StoreAccess aStoreAccess) on the file access delegate. The delegate later invokes store(Address aFileAddress, File aFile) {840} to forward the file. The file access object then invokes store (Address aFileAddress, Version aFileVersion) on the VersionStore and store(Address aFileAddress, File aFile) {850} on FileStore before it returns {860} null to the client.

Figure 20:
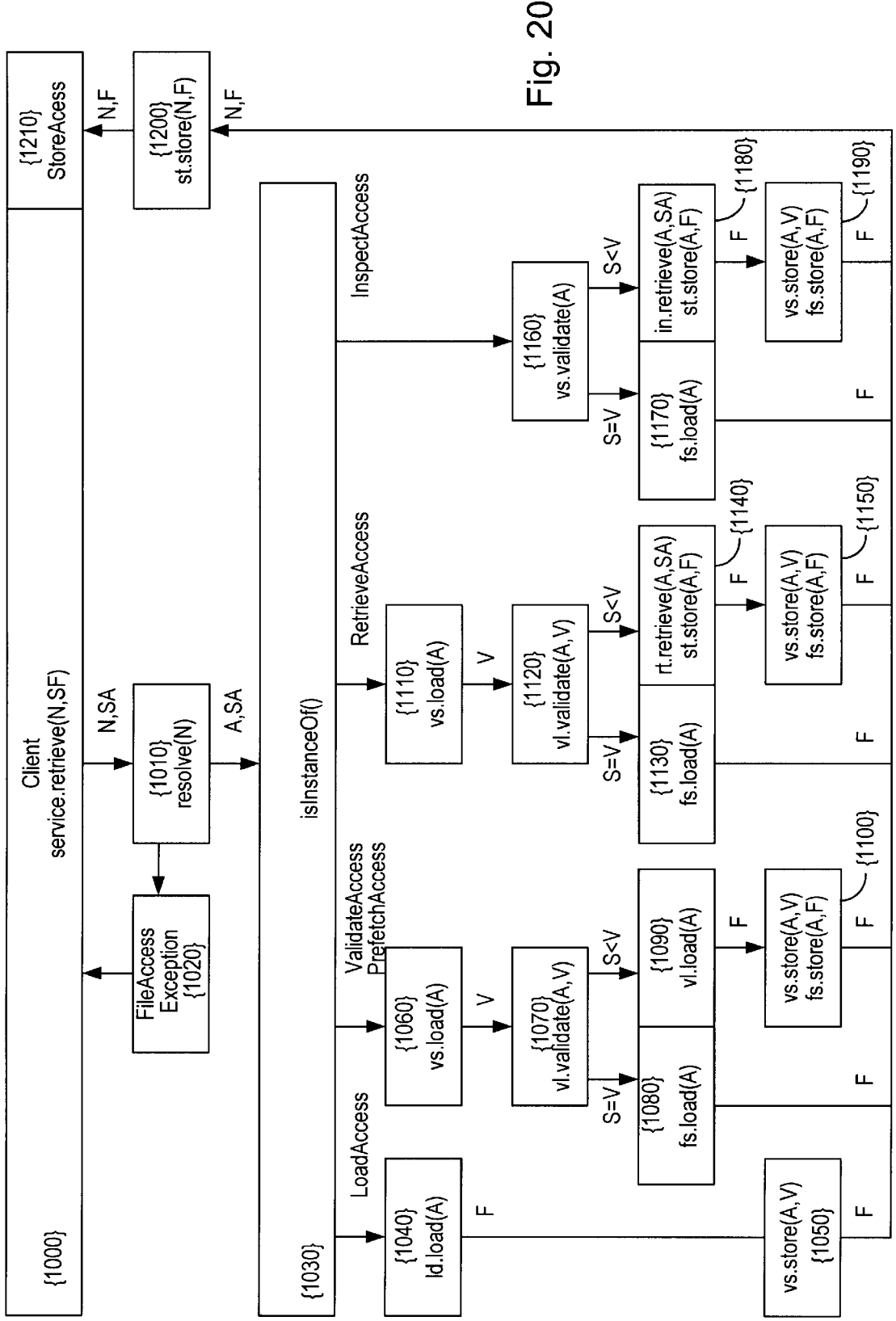
FIG. 20 describes the execution logic for the retrieve( ) function in accordance with an embodiment of the invention.

FIG. 20 describes the execution logic for the retrieve( ) function in accordance with an embodiment of the invention. To initiate the sequence, the client invokes retrieve (String aFileName, StoreAccess aStoreAccess) {1000} on the file access object. The first step is to resolve( ) {1010} the file name to the file address. If the file access object can not resolve( ) the file name, it raises the FileAccessException {1020}. If the file access object can resolve( ) the file name, the file access object (in concept) invokes isInstanceOf( ) {1030} on the file access delegate. The operation confirms which of the five interfaces the delegate exports. (The file access object, in practice, performs this operation just once, after it creates the file access delegate. The logic diagrams include the step to reinforce the adaptation to the specific file access delegate.)

If the file access delegate supports the load( ) function, but does not support the validate( ) function, the file access object invokes load(Address aFileAddress) {1040} on the file access delegate. The delegate returns the file. The file access object then invokes store(Address aFileAddress, Version aFileVersion) {1050} on the VersionStore. (The operation is not critical to the retrieves function, but anticipates subsequent validate( ) operations). The file access object then invokes store(String aFileName, File aFile) {1200} on the client StoreAccess object so as to forward the file.

If the file access delegate supports the validate( ) function (or the prefetch( ) function), the file access object first invokes load(Address aFileAddress) {1060} on its version store to recover the file version. It then invokes validate (Address aFileAddress, Version aFileVersion) {1070} on the file access delegate. If the version matches the delegate version, the file access object invokes load(Address aFileAddress) {1080} on the FileStore to recover the file. The file store object invokes store(String aFileName, File aFile) {1200} on the client StoreAccess object to forward the file. If the version is stale, the file access object then invokes load(Address aFileAddress) {1090} on the file access delegate. The delegate returns the file. The file access object invokes store(Address aFileAddress, Version aFileVersion) on the VersionStore and store(Address aFileAddress, File aFile) {1100} on the FileStore. The file access object then invokes store(String aFileName, File aFile) {1200} on the client StoreAccess object to forward the file.

If the file access delegate supports the retrieves function, the file access object first invokes load(Address aFileAddress) {1110} on the VersionStore. It then invokes validate(Address aFileAddress, Version aFileVersion) {1120} on the file access delegate. If the version matches the delegate version, the file access object invokes load(Address aFileAddress) {1130} on the FileStore to recover the file. The file store object then invokes store(String aFileName, File aFile) {1200} on the client StoreAccess object to forward the file. If the version is stale, the file access object invokes retrieve(Address aFileAddress, StoreFile aStoreFile) on the file access delegate. The delegate later invokes store(Address aFileAddress, File aFile) {1140} to forward the file. The file access object invokes store(Address aFileAddress, Version aFileVersion) on the VersionStore and store(Address aFileAddress, File aFile) {1150} on the FileStore. The file access object then invokes store(String aFileName, File aFile) {1200} on the client StoreAccess object to forward the file.

If the file access delegate supports the retrieve( ) function and detects version changes, the file access object first invokes validate(Address aFileAddress) {1170} on the VersionStore. If the version is current, the file access object invokes load(Address aFileAddress) {1170} on the FileStore to recover the file. The file store object then invokes store(String aFileName, File aFile) {1200} on the client StoreAccess object to forward the file. If the version is stale, the file access object invokes retrieve(Address aFileAddress, StoreFile aStoreFile) on the file access delegate. The delegate later invokes store(Address aFileAddress, File aFile) {1180} to forward the file. The file access object invokes store(Address aFileAddress, Version aFileVersion) on the VersionStore and store(Address aFileAddress, File aFile) {1190} on the FileStore. The file access object then invokes store(String aFileName, File aFile) {1200} on the client StoreAccess object to forward the file.

Figure 21:
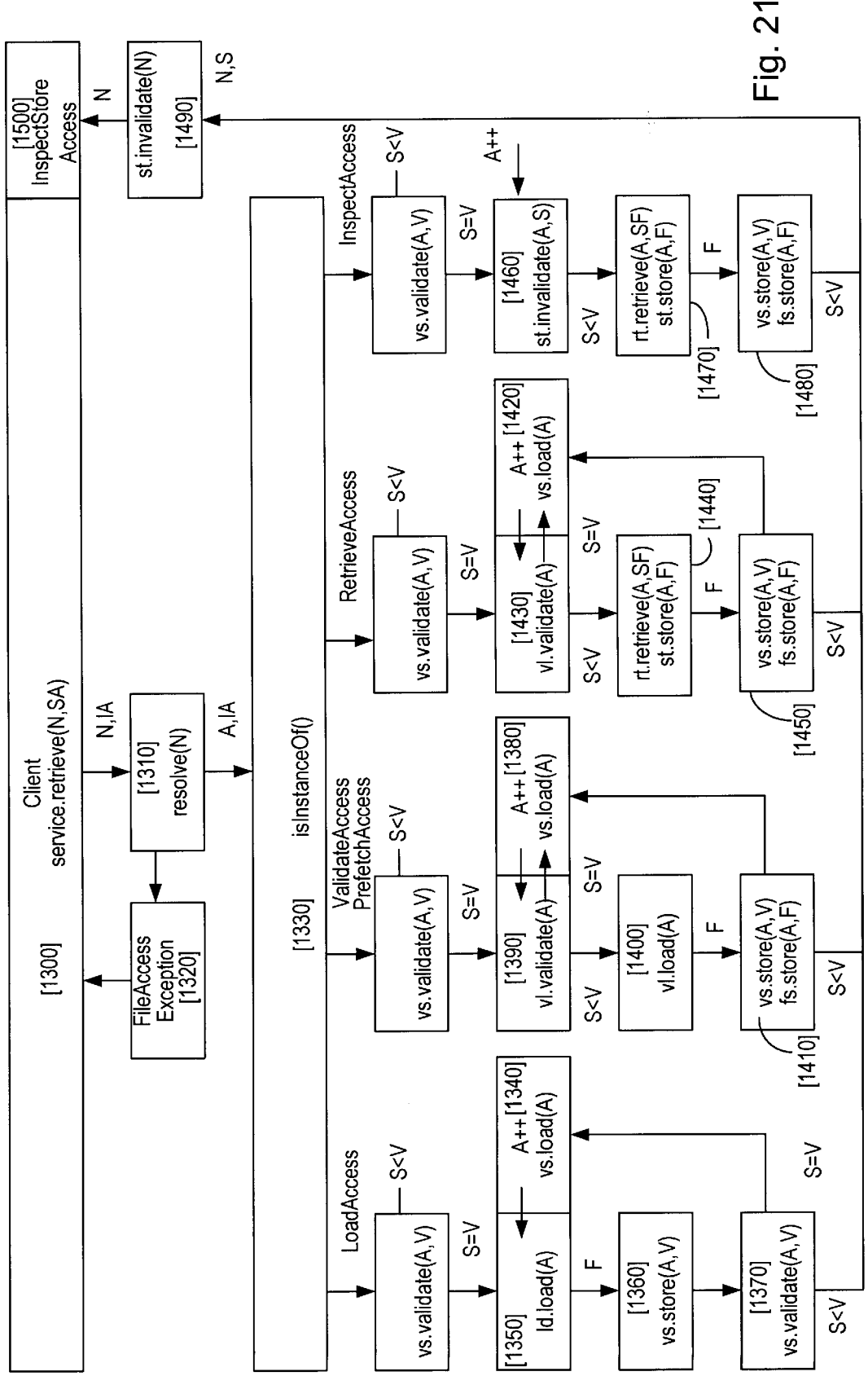
FIG. 21 describes the execution logic for the invalidate( ) function in accordance with an embodiment of the invention.

FIG. 21 describes the execution logic for the invalidate( ) function in accordance with an embodiment of the invention. The function differs from other functions. The client does not invoke invalidate( ) on the file access object; rather the file access object invokes invalidate( ) on the Inspect- StoreAccess of the client. The concept is that if the client invokes retrieve( ) on the file access object, the file access object later forwards the file itself, but thereafter detects and reports when the version becomes stale.

To initiate the sequence, the client invokes retrieve(String aFileName, InspectStoreAccess aInspectStoreAccess) on the file access object. The file access object later invokes store(Name, aFileName, File aFile) on the client InspectStoreAccess object to forward the file. The file access object thereafter detects and reports when the version becomes stale.

The execution logic depends on the interface that the file access delegate exports. If the file access delegate supports just the load( ) function, the file access object emulates the validate( ) function for those files that relate to the retrieve( ) operation. The file access object invokes load(Address aFileAddress) {1340} on the VersionStore to recover the (perhaps stale) version. The file access object then executes a fraction of the validate( ) logic. The file access object invokes load(Address aFileAddress) {1350} on the file access delegate to recover the current file. The file access object next invokes store(Address aFileAddress, Version aFileVersion) {1360} and then invokes validate(Address aFileAddress, Version aPreviousVersion) {1370} on the VersionStore. If the previous version is stale, the file access object invokes invalidate(String aFileName, Status aStatus) {1490} on client InspectStoreAccess object. The file access object excludes the file from subsequent iterations. If the previous version matches the delegate version, the file access object just advances {1340} to the next file to validate. The iteration continues until all versions that relate to client retrieve( ) are found to be stale.

If the file access delegate supports the validate( ) function (or the prefetch( ) function), the file access object first invokes load(Address aFileAddress) {1380} on the VersionStore to recover the version. It then invokes validate (Address aFileAddress, Version aFileVersion) {1390} on the file access delegate. If pervious version matches the delegate version, the file access object just advances {1380} to the next version to validate. If the previous version is stale, the file access object invokes load(Address aFileAddress) {1400} on the file access delegate. The delegate returns the file. The file access object invokes store(Address aFileAddress, Version aFileVersion) on the VersionStore and store(Address aFileAddress, File aFile) {1410} on the FileStore. The file access object then invokes invalidate (String aFileName, Status aStatus) {1490} on the client InspectStoreAccess object. The file access object excludes the version from subsequent iterations.

If the file access delegate supports the retrieve( ) function, the file access object first invokes load(Address aFileAddress) {1420} on the VersionStore to recover the version. It then invokes validate(Address aFileAddress, Version aFileVersion) {1430} on the file access delegate. If pervious version matches the delegate version, the file access object just advances {1420} to the next version to validate. If the previous version is stale, the file access object invokes retrieve(Address aFileAddress, StoreFile aStoreFile) on the file access delegate. The delegate later invokes store(Address aFileAddress, File aFile) {1440} on the StoreFile object to forward the file. The file access object invokes store(Address aFileAddress, Version aFileVersion) on the VersionStore and store(Address aFileAddress, File aFile) {1450} on the FileStore. The file access object then invokes invalidate(String aFileName, Status aStatus) {1490} on the client InspectStoreAccess object. The file access object excludes the version from subsequent iterations.

If the file access delegate supports the retrieve( ) function and detects version changes, the invalidate( ) function is simple to support. The file access object just listens for invalidate(Address aFileAddress, Status aStatus) {1460} on the InspectStoreAccess object to provides to the delegate. The file access object invokes retrieve(Address aFileAddress, StoreAccess aStoreAccess) on the file access delegate. The delegate later invokes store(Address aFileAddress, File aFile) {1470} on the StoreAccess object to forward the file. The file access object invokes store (Address aFileAddress, Version aFileVersion) on the VersionStore and store(Address aFileAddress, File aFile) {1470} on the FileStore before it invokes invalidate(String aFileName, Status aStatus) {1490} on the client InspectStoreAccess object to complete the operation.

Figure 22:
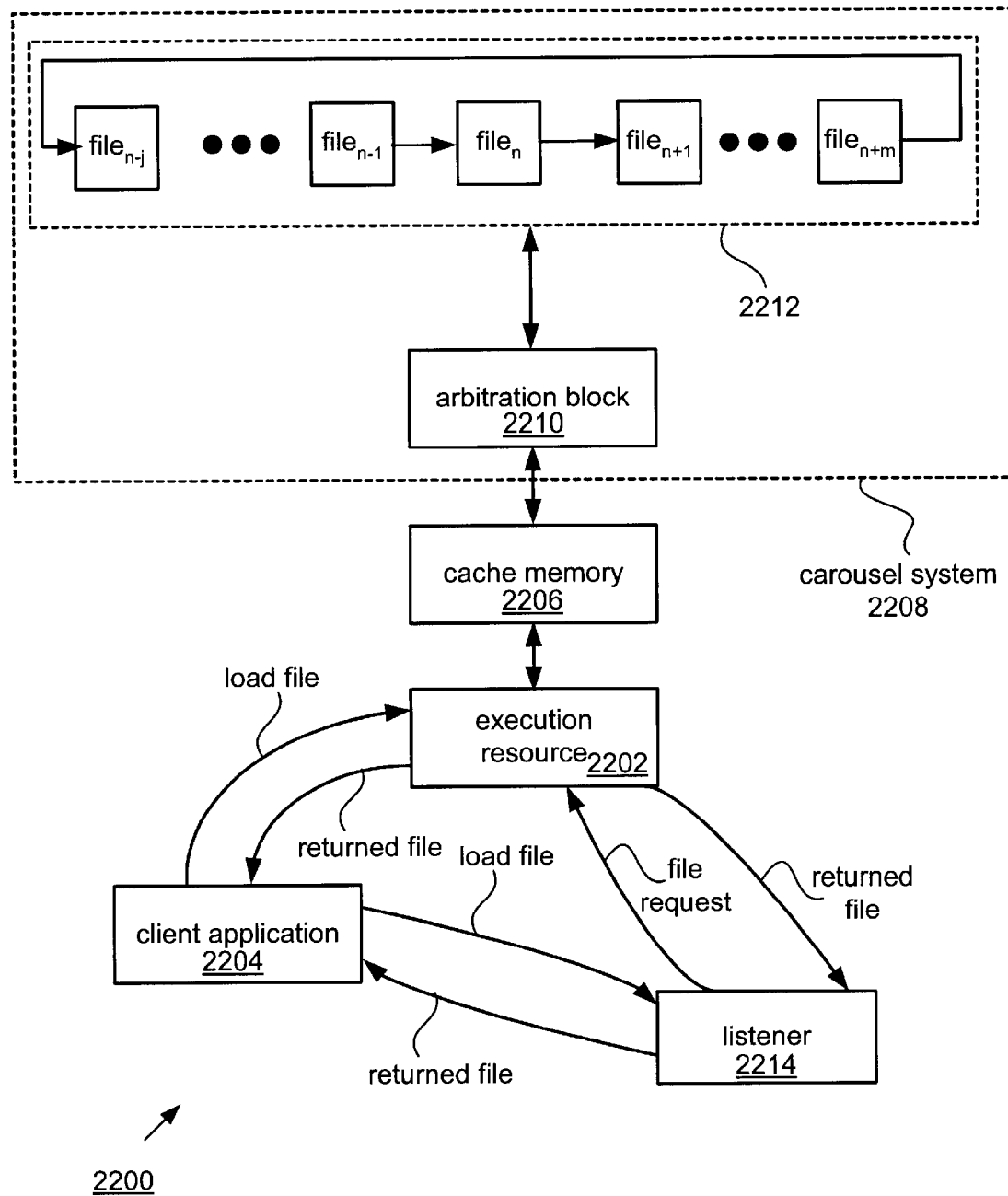
FIG. 22 illustrating a computing system in accordance with an embodiment of the invention.

A particular implementation of the invention is presented with reference to FIGS. 22–26. Referring now to FIG. 22 illustrating a computing system 2200 in accordance with an embodiment of the invention. In the described embodiment, the computing system 2200 includes an execution resource 2202 arranged to perform executable instructions included in a client application hosted by a client 2204 coupled thereto. Typically, the execution resource 2202 is a microprocessor type device such as those identified as belonging to, for example, the Pentium™ class of microprocessors manufactured by the Intel Corporation of Santa Clara, Calif.

In the computing system 2200, a cache memory device 2206 is suitably coupled to the execution resource 2202 capable of storing in what are referred to as cache lines (not shown for sake of clarity), recently requested instructions and/or data files. In some cases, the instructions and/or data stored in the cache memory device 2206 are those files and/or data pre-fetched from a data repository such as for example a hard drive or other such storage device (which is typically a random access type device). However, in the realm of sequential access memory devices for which the present invention is well suited, the data repository is typically a carousel type system 2208 having an arbitration block 2210 and a data carousel 2212 as described above. In the case of the data carousel 2212, files $file_{n-1}$ through $file_{n+m}$ are sequentially cycled over a period of time T which can be on the order of a few system clock cycles to many millions of system clock cycles. It is therefore of considerable importance to reduce any latency caused by the inherent sequential nature of the data carousel system 2212.

In order to reduce this latency, the arbitration block 2210 receives all data file requests for those data files that the execution resource has determined is not stored in the cache memory. The arbitration block 2210 then determines when a requested data file, such as a data file $f_n$ is available, and then proceeds to fetch the requested data file from the carousel system 2212 to the cache memory 2206. In small scale systems, such as cellular telephones and the like that receive sequentially broadcast data having only limited processing capabilities, the client application 2204 is blocked from executing until the requested file is fetched to the cache memory 2206 where it can be retrieved by the execution resource. It is one of the advantages of the present invention, however, that in addition to being able to pre-fetch a required data file, the client application is capable of invoking a listener object 2214 in those systems that can support multi-threaded processing. In this way, the client application can select from any of the following options depending upon the system on which the client application is running, (1) option of blocking execution until a requested file is retrieved (suitable for small scale systems incapable or otherwise not well suited for multi-threaded processing), (2)

invoking a pre-fetch of a requested file thereby reducing the possibility of blocking the client application, or (3) in those systems capable of multi-threaded processing, invoking a listener object arranged to request the required file while the client application continues to execute.

Figure 23:
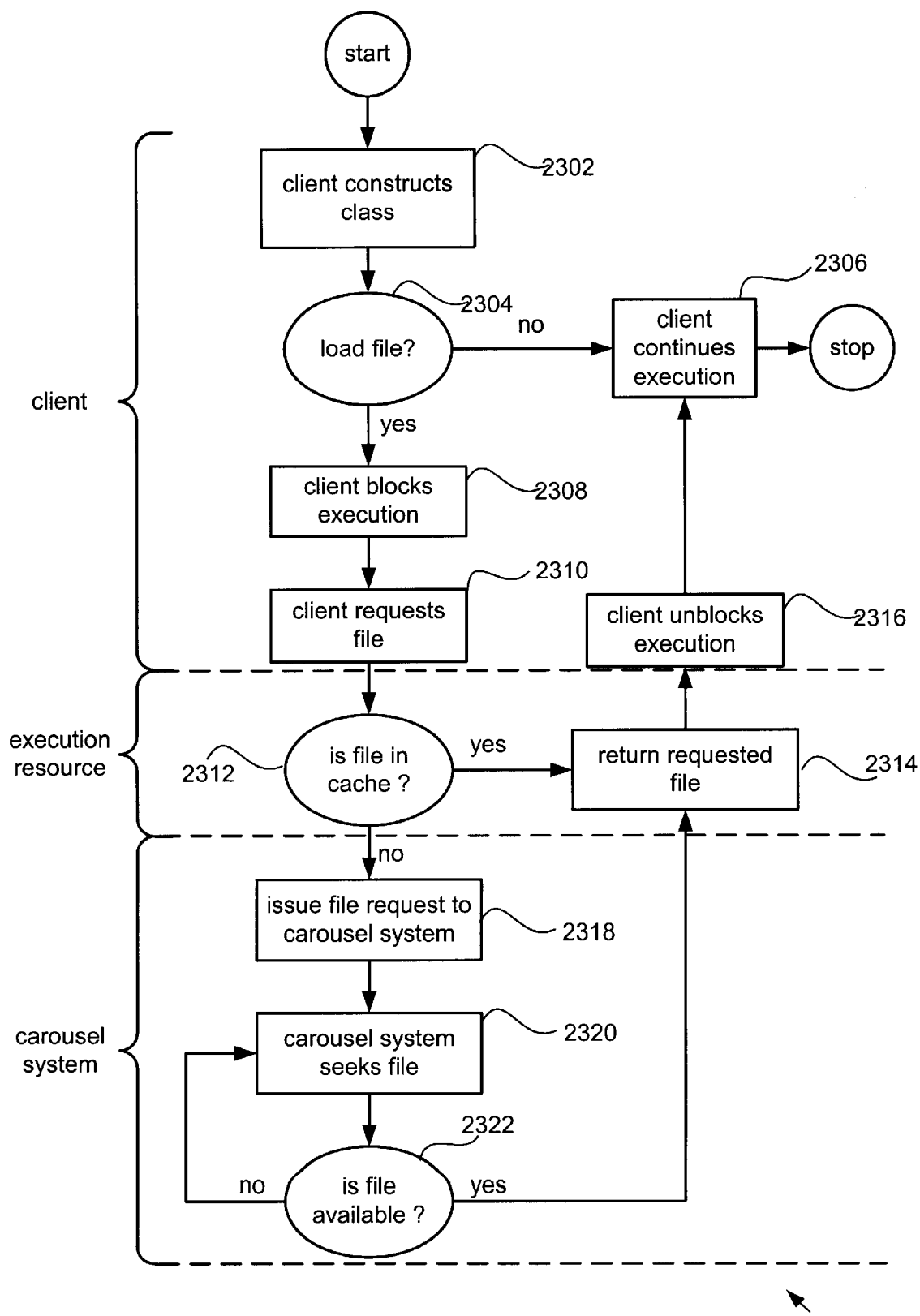
FIG. 23 illustrates a flowchart detailing an embodiment of the invention suitable for use in small scale systems.

Referring now to FIG. 23 illustrating a flowchart detailing a process 2300 for sequentially accessing a file in accordance with an embodiment of the invention. In the described embodiment, the process 2300 begins at 2302 when the client application constructs a class. Once the class has been constructed, a determination is made whether or not a file is to be loaded in order for the client application to continue to execute at 2304. If it has been determined that a file is not to be loaded, then the client application continues to execute at 2306. If, however, a file is to be loaded, then the client blocks further execution at 2308 and requests the file to be loaded at 2310. At this point, the execution resource then determines whether or not the requested file in stored in the local cache memory at 2312. If the requested file is stored in the cache memory, then the requested file is returned at 2314 and the client unblocks the execution at 2316 and the client then continues execution at 2306.

However, the execution resource determines that the requested file is not in the cache at 2312 then the execution resource provides a file request to the carousel system at 2318. The carousel system then seeks the requested file at 2320 and determines if the requested file is available at 2322 until such time as the file is available, the client application remains blocked. When the requested file is determined to be available, the requested file is returned at 2314 at which point the client application unblocks at 2316 and execution of the client application continues at 2306.

Figure 24:
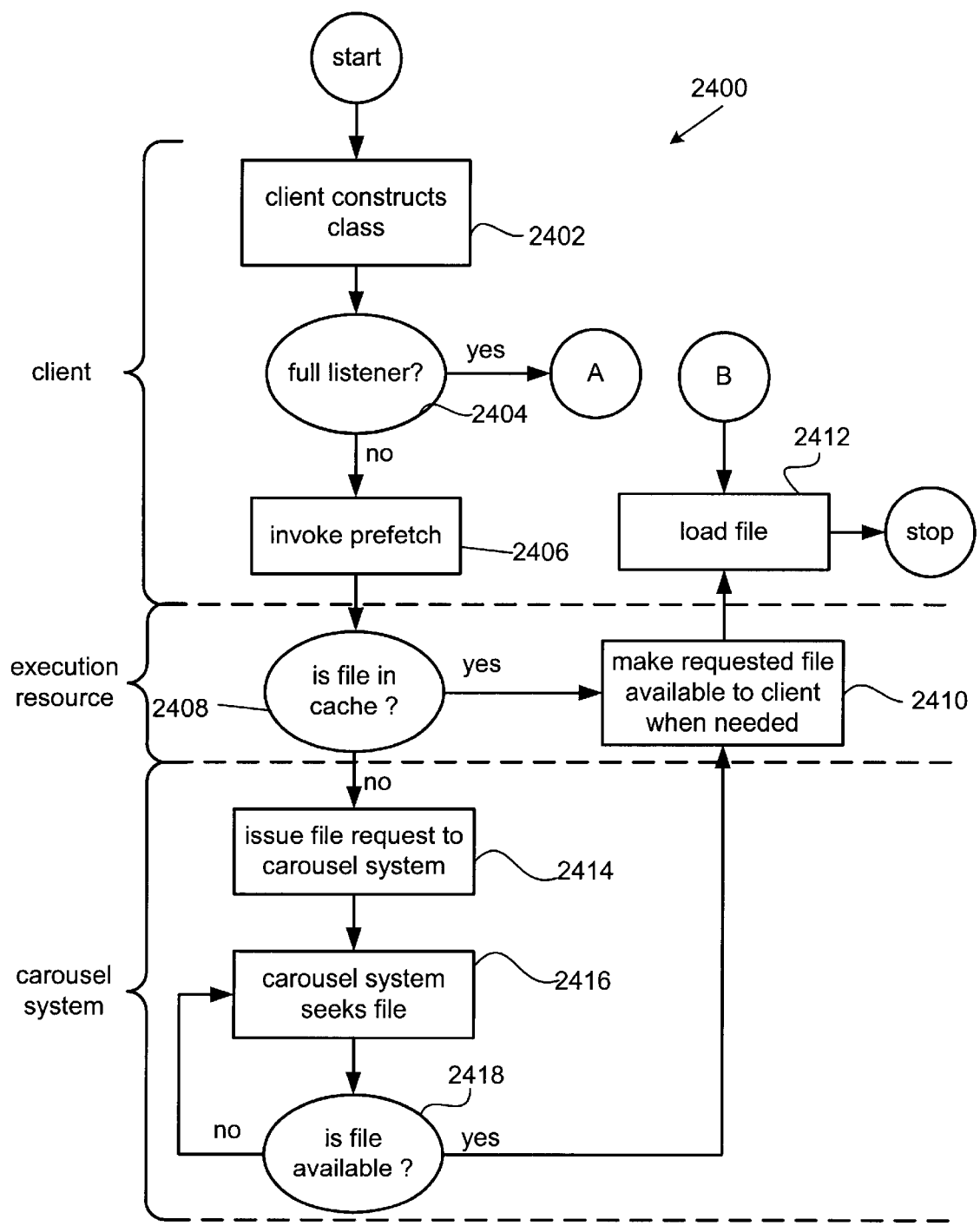
FIGS. 24–25 illustrates a flowchart detailing an embodiment of the invention suitable for use in systems capable of supporting multi-threaded processing.
Figure 25:
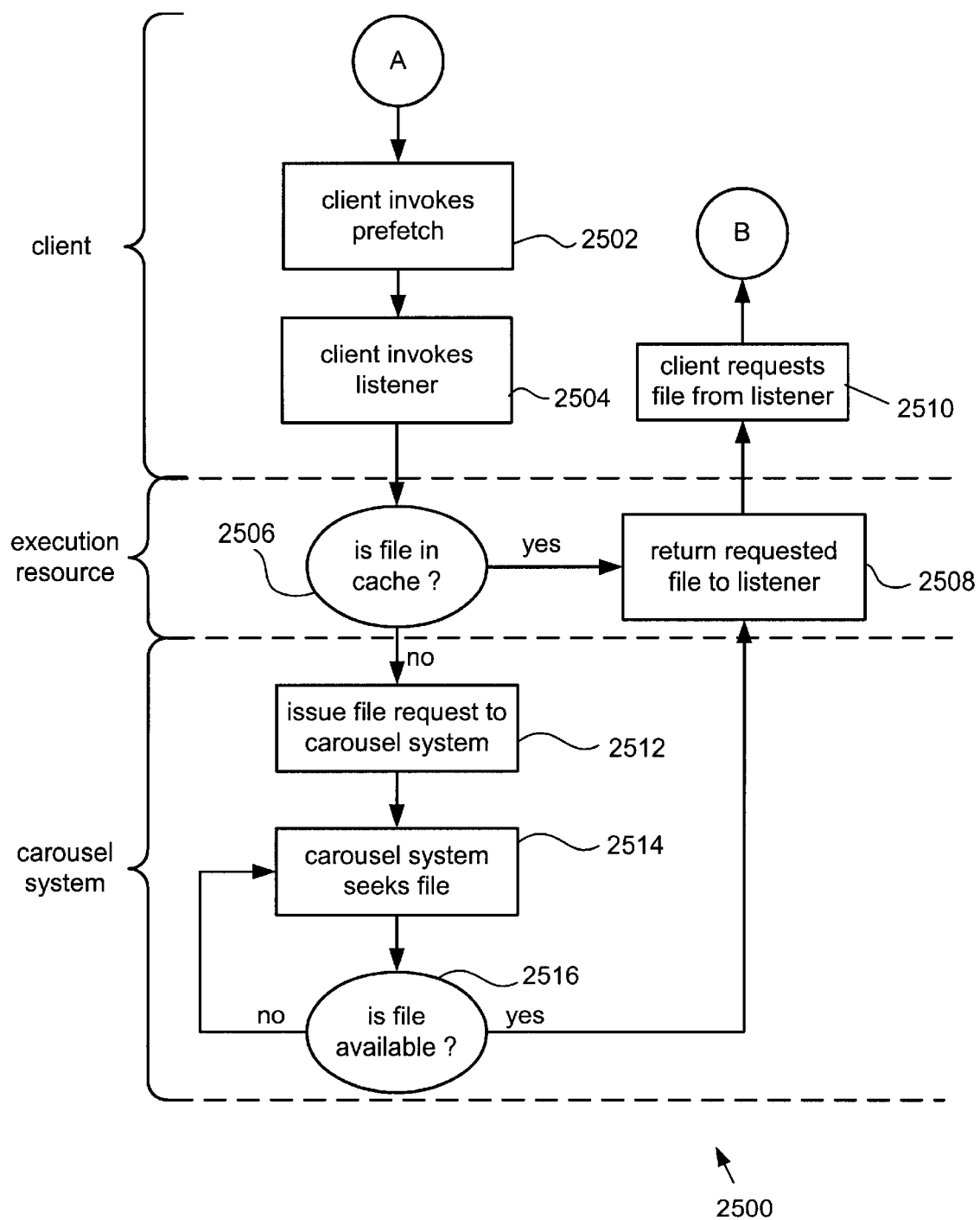

Turning now to FIGS. 24 and 25 illustrating a flowchart detailing a process 2400 for sequentially accessing a file in a multi-threaded environment in accordance with an embodiment of the invention. The process 2400 begins at 2402 by the client application constructing a class. Next, at 2404, a determination is made whether or not a full listener object is to be invoked by the client application. If a listener object is not to be invoked, then the client application invokes a pre-fetch command at 2406 while continuing to execute. The pre-fetch command is then interpreted by the execution resource at 2408 to determine whether or not the requested file is stored in the cache memory. If the requested file is stored in the cache memory, then the file is made available to the client application at 2410 and the file is then loaded by the client application, when needed, at 2412. However, if the execution resource determines that the requested file is not stored in the cache memory at 2408, then the execution resource issues a file request to the carousel system at 2414.

In the described embodiment, the carousel system then seeks the requested file at 2416 and determines if the requested file is available at 2418. It should be noted that during the pre-fetch, the client application continues to execute (except in those instances where the requested file can not be found prior to the particular file load command in the client application at which time the client application throws an error). When the requested file is determined to be available, the requested file is made available to the client application at 2410 and the file is then loaded by the client application, when needed, at 2412.

Returning to 2404, if it is determined that a full listener object is to be invoked, then turning now to FIG. 25, the client application invokes a pre-fetch at 2502 and the client invokes a full listener at 2504. The pre-fetch command is then interpreted by the execution resource at 2506 to determine whether or not the requested file is stored in the cache memory. If the requested file is stored in the cache memory, then the file is returned to the listener at 2508 until such time as the client application requests the file from the listener at 2510. However, if the execution resource determines that the requested file is not stored in the cache memory at 2506, then the execution resource issues a file request to the carousel system at 2512.

In the described embodiment, the carousel system then seeks the requested file at 2514 and determines if the requested file is available at 2516. It should be noted that the client application continues to execute (except in those instances where the requested file can not be found prior to the particular file load command in the client application at which time the client application throws an error). When the requested file is determined to be available, the requested file is made available to the listener at 2508 until such time as the client application requests the file from the listener at 2510.

Figure 26:
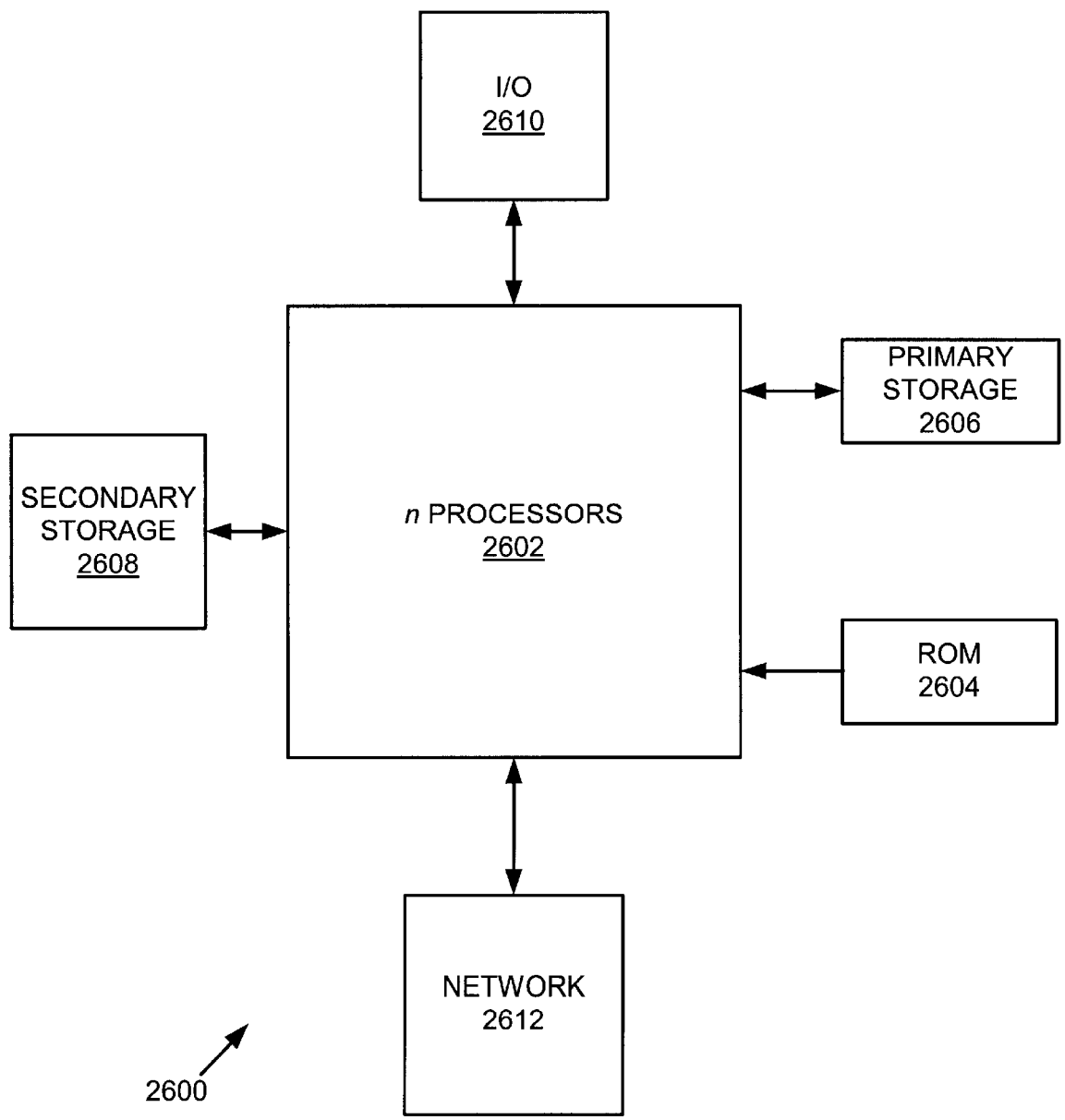
FIG. 26 illustrates a typical, general-purpose computer system suitable for implementing the present invention.

FIG. 26 illustrates a typical, general-purpose computer system 2600 suitable for implementing the present invention. The computer system 2600 includes any number of processors 2602 (also referred to as central processing units, or CPUs) that are coupled to memory devices including primary storage devices 2604 (typically a read only memory, or ROM) and primary storage devices 2606 (typically a random access memory, or RAM).

Computer system 2600 or, more specifically, CPUs 2602, may be arranged to support a virtual machine, as will be appreciated by those skilled in the art. As is well known in the art, ROM acts to transfer data and instructions uni-directionally to the CPUs 2602, while RAM is used typically to transfer data and instructions in a bi-directional manner. CPUs 2602 may generally include any number of processors. Both primary storage devices 2604, 2606 may include any suitable computer-readable media. A secondary storage medium 2608, which is typically a mass memory device, is also coupled bi-directionally to CPUs 2602 and provides additional data storage capacity. The mass memory device 2608 is a computer-readable medium that may be used to store programs including computer code, data, and the like. Typically, mass memory device 2608 is a storage medium such as a hard disk or a tape which generally slower than primary storage devices 2604, 2606. Mass memory storage device 2608 may take the form of a magnetic or paper tape reader or some other well-known device. It will be appreciated that the information retained within the mass memory device 2608, may, in appropriate cases, be incorporated in standard fashion as part of RAM 2606 as virtual memory. A specific primary storage device 2604 such as a CD-ROM may also pass data uni-directionally to the CPUs 2602.

CPUs 2602 are also coupled to one or more input/output devices 2610 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 2602 optionally may be coupled to a computer or telecommunications network, e.g., an internet network or an intranet network, using a network connection as shown generally at 2612. With such a network connection, it is contemplated that the CPUs 2602 might receive information from the network, or might output information to the network in the course of performing the above-described method steps. Such information, which is often represented as a sequence of instructions to be executed using CPUs 2602, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. Steps may also be removed or added without departing from the spirit or the scope of the present invention.

Although the methods of efficiently accessing sequentially broadcast data in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

It should be noted that the processes 300–500 can be implemented in an application program or applet running on an operating system. The application program or applet can initiate multiple threads of execution that are executed independently by the operating system. In one embodiment, the application program or applet uses a Java TV Application Programming Interface (API) to interface a Virtual Machine running a Real-Time Operating System. The Java TV API provides access to DSM-CC object and data carousels via use of data access mechanisms defined in the JAVA.IO package. The JAVA TV API is an extension of the JAVA platform developed by Sun Microsystems of Mountain View, Calif.

In this manner, given an instance of a carousel file an application may use available file accessing classes such as JAVA.IO package to access data from the carousel object. Reliance on familiar APIs facilities ease of use for applications developers and permits reuse of application code. Use of a high-level access mode also facilitates ease of use and permits implementation flexibility across receivers of different manufactures. This invention can be utilized in numerous application e.g., enhanced television, video on demand, electronic programming guides interactive multi camera angles for sporting event, etc.

Although only a few embodiments of the present invention have been described, it should be understood that the present invention may be embodied in many other specific forms without departing from the spirit or scope of the invention. By way of example, although the various inventive processes have been set forth in terms of a particular sequential order for the purposes of this explanation, it should be apparent that in many cases the ordering is not critical. Some operations may be combined or eliminated and others may be parsed into multiple operations.

The invention has numerous advantages. One advantage is that the delay time for accessing data in a broadcasting system is significantly reduced. Another advantage is that data access can be provided without requiring a receiver to know the exact location of data. Still another advantage is that cost effective and simple solutions can be implemented by using familiar file access facilities.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of efficiently accessing a sequentially broadcast data file, comprising:
    constructing a client class;
    if the sequentially broadcast data file is loaded, then blocking execution by the client;
    requesting the sequential broadcast data file by the client;
    if the sequentially broadcast data file is not in a cache memory, then issuing a file request to a carousel system; and
    if the sequentially broadcast data file is available to the carousel system, then returning the requested sequentially broadcast data file;
    else carousel system seeks file and determines if the sequentially broadcast data file is available to the carousel system;
    else if the sequentially broadcast data file is located in the cache memory, then returning requested sequentially broadcast file; and unblocking execution by the client;
    else if the sequentially broadcast data file is not loaded, then continuing execution by the client.

2. A method as recited in claim 1, wherein if the client is a full listener client, then invoking a prefetch operation by the client; and
    invoking a listener by the client.

3. A method as recited in claim 2, wherein if the client is not a full listener client, then invoking the prefetch operation.

4. An apparatus for efficiently accessing a sequentially broadcast data file, comprising:
    means for constructing a client class;
    means for blocking execution by the client when the sequentially broadcast data file is loaded;
    means for issuing a file request to a carousel system when the sequentially broadcast data file is not in a cache memory; and
    means for returning the requested data file when the sequentially broadcast data file is available to the carousel system;
    else means for carousel system to seek file and means to determine whether requested data file is available to the carousel system;
    else means for returning requested file when the sequentially broadcast data file is located in the cache memory; and unblocking execution by the client;
    else means for continuing execution by the client when the sequentially broadcast data file is not loaded.

5. An apparatus as recited in claim 4 further comprising:
    means for invoking a prefetch operation by the client when the client is a full listener client; and
    means for invoking a listener by the client.

6. An apparatus as recited in claim 5 further comprising:
    means for invoking the prefetch operation when the client is not a full listener client.

7. A computer program product that includes a computer usable medium having computer readable code embodied therein for efficiently accessing a sequentially broadcast data file, comprising:

constructing a client class;

if the sequentially broadcast data file is loaded, then a computer readable program code configured for blocking execution by the client;

a computer readable program code configured for requesting the sequentially broadcast data file by the client;

if the sequentially broadcast data file is not in a cache memory, then a computer readable program code configured for issuing a file request to a carousel system; and if the sequentially broadcast data file is available to the carousel system, then a computer readable program code configured for returning the requested sequentially broadcast data file;

else a computer readable program code configured for carousel system to seek file and computer readable program code configured to determine if the sequentially broadcast data file is available to the carousel system;

else a computer readable program code configured for returning requested file;

and a computer readable program code configured for unblocking execution by the client;

else a computer readable program code configured for execution by the client.

8. A computer program product as recited in claim 7 further comprising:

a computer readable program code configured for invoking a prefetch operation by the client; and invoking a listener by the client.

9. A computer program product as recited in claim 8 further comprising:

a computer readable program code configured for invoking the prefetch operation.

* * * * *

UNITED STATES PATENT AND TRADEMARK OFFICE
CERTIFICATE OF CORRECTION

PATENT NO.   : 6,748,372 B2
DATED        : June 8, 2004
INVENTOR(S)  : James T. Van Loo It is certified that error appears in the above-identified patent and that said Letters Patent is hereby corrected as shown below:

Column 1,
Line 20, change "xample" to -- example --.

Column 16,
Lines 3 and 26, change "retrieves" to -- retrive( ) --.

Signed and Sealed this

Thirty-first Day of August, 2004

JON W. DUDAS
*Director of the United States Patent and Trademark Office*